(12) United States Patent
Hankawa et al.

(10) Patent No.: US 7,471,459 B2
(45) Date of Patent: Dec. 30, 2008

(54) ZOOM LENS SYSTEM AND IMAGE PICKUP APPARATUS USING THE SAME

(75) Inventors: Masashi Hankawa, Hachioji (JP); Masahito Watanabe, Hachioji (JP); Kouki Hozumi, Hachioji (JP); Kazuya Nishimura, Akiruno (JP); Takahiro Amanai, Sagamihara (JP); Toru Miyajima, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 82 days.

(21) Appl. No.: 11/594,506

(22) Filed: Nov. 7, 2006

(65) Prior Publication Data
US 2007/0103791 A1      May 10, 2007

(30) Foreign Application Priority Data

Nov. 10, 2005  (JP) .............................. 2005-325911
May 25, 2006   (JP) .............................. 2006-145074

(51) Int. Cl.
*G02B 15/14* (2006.01)

(52) U.S. Cl. ...................................... 359/680; 359/689

(58) Field of Classification Search ......... 359/680–682, 359/689
See application file for complete search history.

(56) References Cited

U.S. PATENT DOCUMENTS

| | | |
|---|---|---|
| 6,191,896 B1 | 2/2001 | Itoh |
| 6,233,099 B1 | 5/2001 | Itoh |
| 6,351,337 B1 | 2/2002 | Tanaka |
| 6,611,386 B2 | 8/2003 | Tanaka |
| 2001/0022694 A1 | 9/2001 | Tanaka |
| 2004/0156121 A1* | 8/2004 | Ori et al. ..................... 359/689 |
| 2006/0221463 A1* | 10/2006 | Enomoto ..................... 359/689 |

* cited by examiner

*Primary Examiner*—Darryl J Collins
(74) *Attorney, Agent, or Firm*—Kenyon & Kenyon LLP

(57) ABSTRACT

A three-unit zoom lens system comprising, in order from an object side, a first lens unit having a negative refractive power; a second lens unit having a positive refractive power; and a third lens unit having a positive or negative refractive power, wherein during magnification change from a wide-angle end to a telephoto end, a space between the first lens unit and the second lens unit narrows, the second lens unit and the third lens unit move toward the only object side, and a space between the second lens unit and the third lens unit changes during a focusing operation.

27 Claims, 48 Drawing Sheets

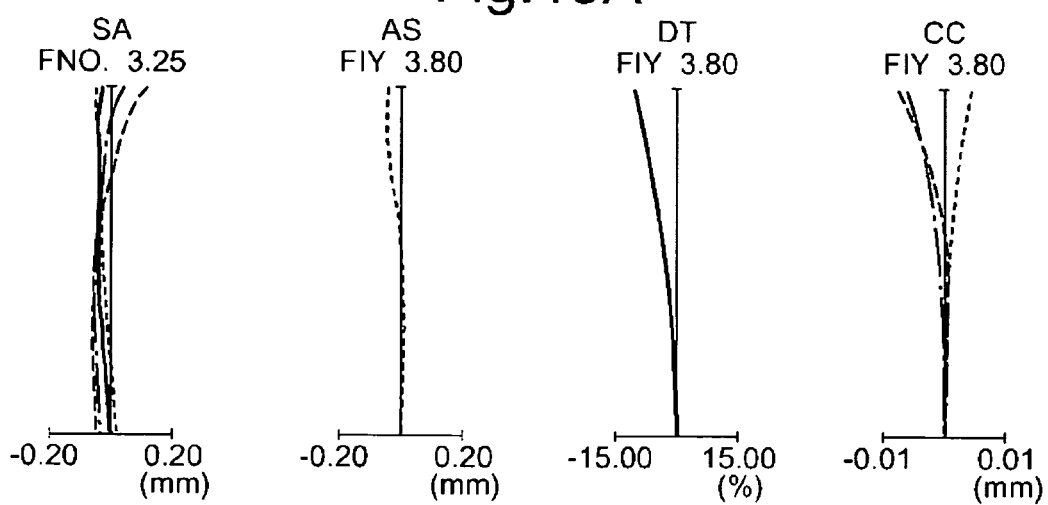
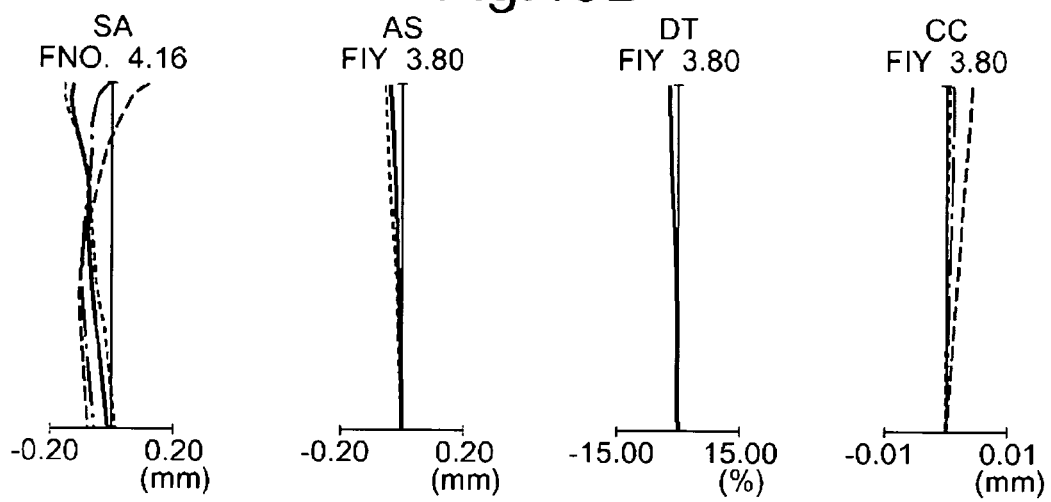
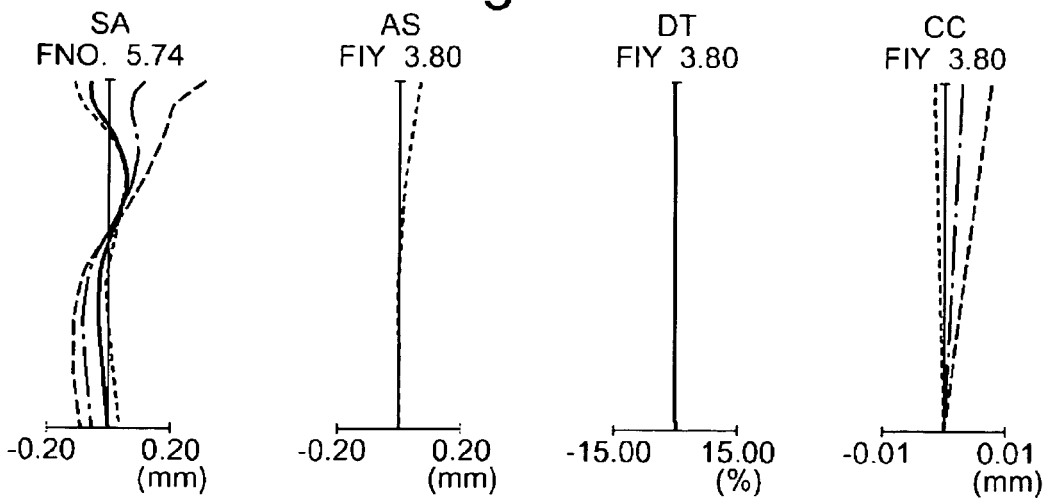

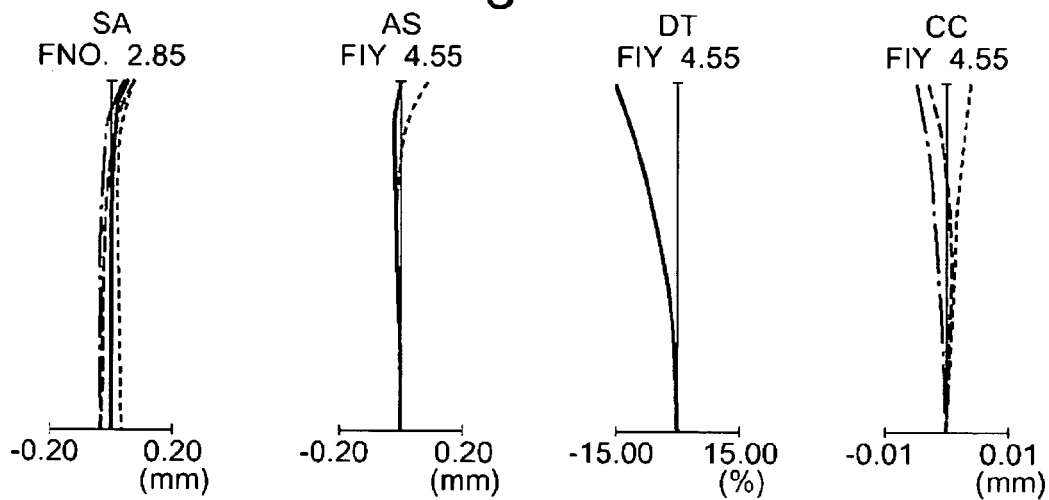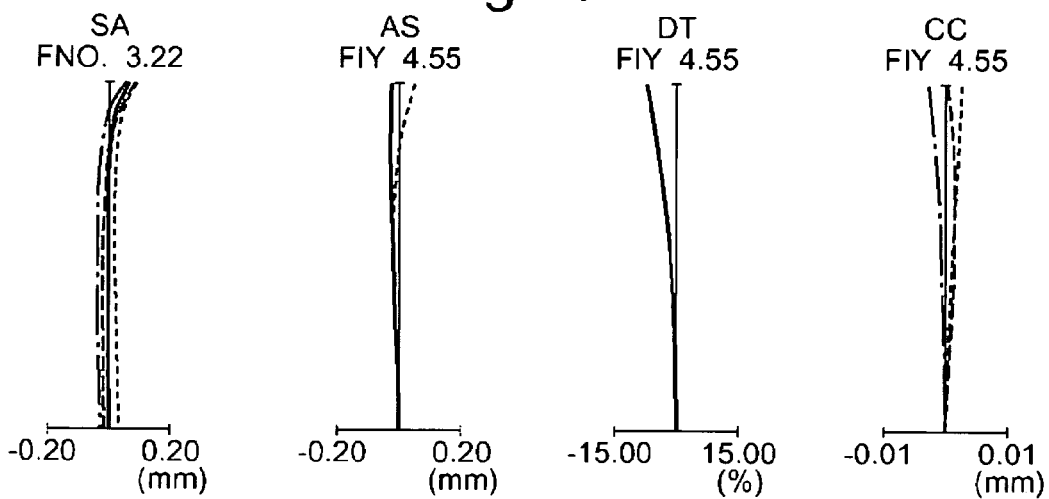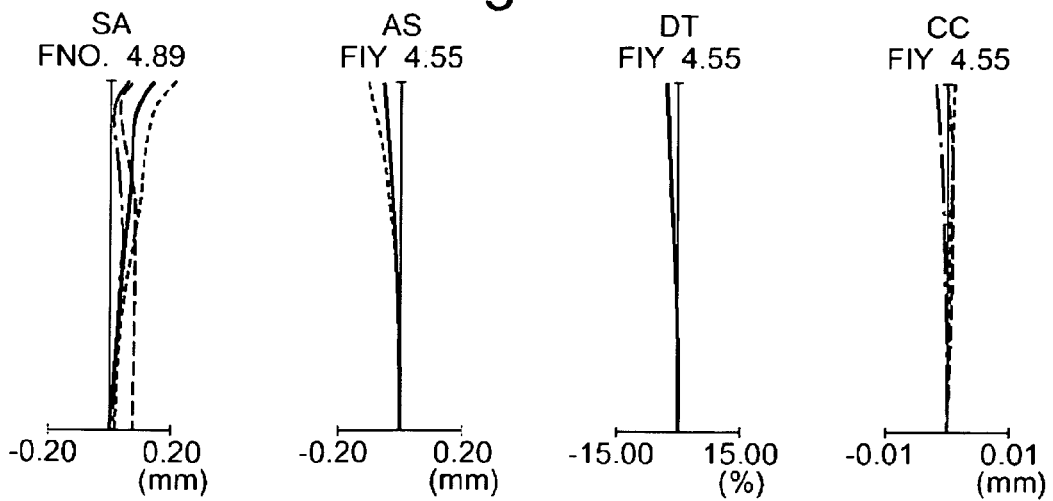

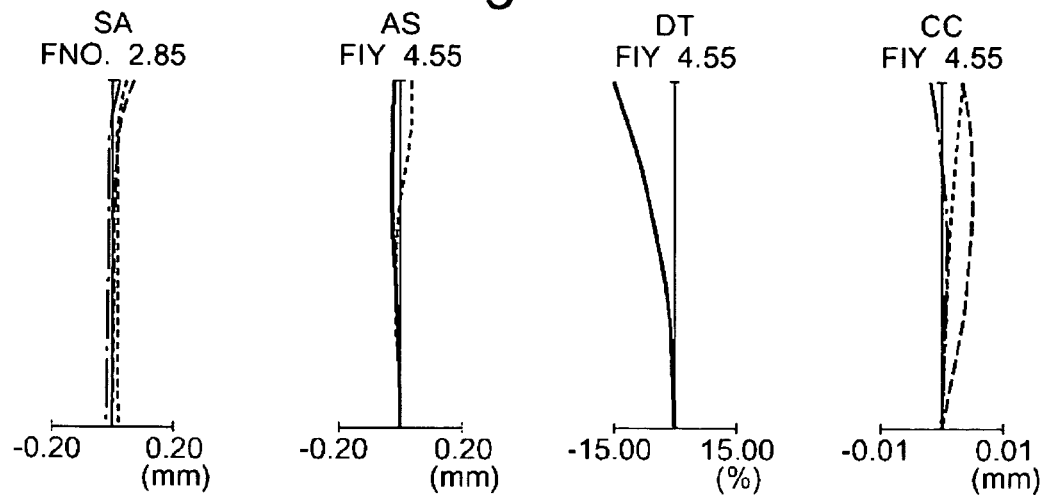
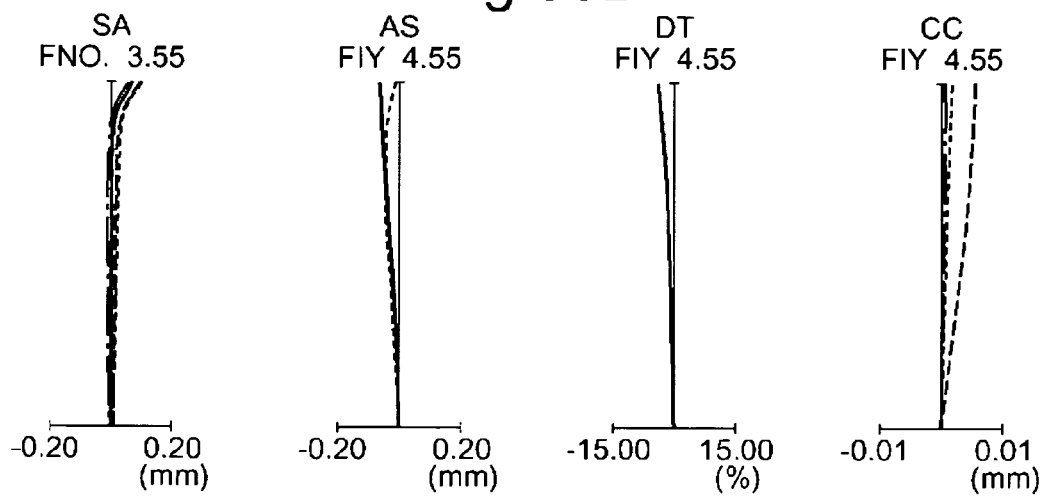
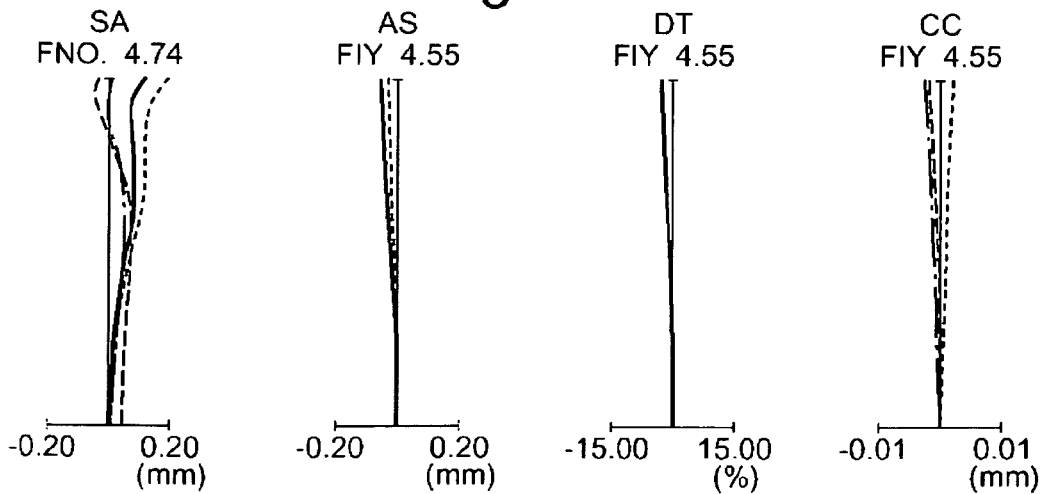

ing is moved for focusing, and an increase in total length of the lens barrel including a focusing mechanism is caused. As a result, this type is disadvantageous in thinning the lens system and securing the zoom ratio.

ZOOM LENS SYSTEM AND IMAGE PICKUP APPARATUS USING THE SAME

CROSS REFERENCE TO RELATED APPLICATION

This application claims benefit under 35 U.S.C. §119 of Japanese Patent Applications of No. 2005-325,911 filed on Nov. 10, 2005 and No. 2006-145,074 filed on May 25, 2006, the contents of which are incorporated herein by reference.

BACKGROUND OF THE INVENTION

1. Field of the Invention

The present invention relates to a zoom lens system, more particularly, to a zoom lens system having a refractive power layout of a negative-positive-positive type or a negative-positive-negative type, and an image pickup apparatus using the same.

2. Description of the Related Art

In recent years, miniaturization of digital still cameras and mounting of image pickup functions onto cellular phones have been advanced. In consequence, it is demanded to further miniaturize and thin image pickup optical systems.

As these image pickup optical systems, zoom lens systems having a zoom ratio above 2.5× are demanded.

As methods for realizing the thin zoom lens systems, there are known a method of disposing a reflective member in the zoom lens system to bend the optical axis as much as 90 degrees, and a method of diverting a part of lens units constituting the zoom lens system to the outside of the optical axis during non-use.

However, the method of bending the optical axis by use of the reflective member requires a space for bending a ray and a space for moving the lens unit to secure the zoom ratio. Moreover, these spaces are not eliminated even when an image pickup apparatus such as the camera is not used, and in consequence, the method is disadvantageous to reduction of the volume of the image pickup apparatus when unused. In addition, owing to the bending of the optical axis, layout in the image pickup apparatus is limited.

On the other hand, in the method of diverting a part of the lens units when unused, a mechanism to divert the lens units is added. Therefore, it is difficult to suppress an adverse influence in a case where the lens unit is decentered from the optical axis. Since driving means for diverting a part of the lens units is required, it is difficult to suppress the volume of the apparatus when unused. This method is also disadvantageous in point of costs.

Furthermore, as types of refractive power layout of the lens units constituting the zoom lens system of a usual collapsible type in which the miniaturization is intended, there are known a zoom lens system of a negative-positive type; a zoom lens system of a negative-positive-negative type; and a zoom lens system of a negative-positive-positive type.

Among them, the zoom lens system of the negative-positive type has the reduced number of the lens units, and hence it is advantageous in reducing total thickness of the lens barrel which directly holds lenses. However, in order to secure the zoom ratio, the second lens unit is moved in the range where the image forming magnification of the second lens unit is one fold. In the case where the image forming magnification of the second lens unit is one fold, the image position moves toward the rear side even when the second lens unit moves toward the object side or the image side. Therefore, the second lens unit cannot be used as a focusing lens unit. In consequence, the first lens unit or the whole zoom lens system On the other hand, the zoom lens system of the negative-positive-negative type and the zoom lens system of the negative-positive-positive type are advantageous in that the increase of the total length can be suppressed by performing focusing by the third lens unit.

Furthermore, the zoom lens system of the negative-positive-negative type is advantageous to the miniaturization, because it is possible to reduce the diameter of the front lens (foremost lens of the zoom lens system).

In addition, the zoom lens system of the negative-positive-positive type has a merit that a stable optical performance can easily be obtained.

As the zoom lens system of the negative-positive-positive type or the negative-positive-negative type, a zoom lens system is known in which the third lens unit moves to a position closer to the image side in the telephoto end than in the wide-angle end or hardly moves. However, in such a mode of movement of the lens unit, since the third lens unit is positioned close to an image surface in the telephoto end, the height of off-axial rays increases in the third lens unit. Therefore, this system is disadvantageous to reduction of the diameter of each lens. Moreover, since the focusing sensitivity (the movement amount of the image surface position at a time when the focusing lens moves as much as a unit movement amount) easily drops, the third lens unit necessarily requires a strong power. Since the diameter of the lens is large, the thickness also easily increases.

Furthermore, examples of the zoom lens system in which the third lens unit moves toward the object side during zooming toward the telephoto end are disclosed in Japanese Patent Application Laid-Open Nos. 2000-284177 and 2001-242378, Japanese Patent Nos. 3,513,369 (Examples 3 and 4) and No. 3,606,548 (Example 2).

However, in the zoom lens system described in Japanese Patent No. 3,513,369, since the total length of the zoom lens system is large, and the thickness of each lens unit is also large, the constitution is disadvantageous in thinning the system in a collapsed state. Moreover, it is not possible to secure a sufficient space for moving the third lens unit to perform the focusing in the telephoto end.

Furthermore, in the zoom lens systems described in Japanese Patent Application Laid-Open Nos. 2000-284177 and 2001-242378 and Japanese Patent No. 3,606,548, the second and third lens units are integrally moved during magnification change, and the focusing is performed by moving third lens unit only. However, any of the lens systems is disadvantageous to the thinning, because the total length of the zoom lens system is large, and the thickness of each lens unit is also large.

Furthermore, in the zoom lens system of the negative-positive-positive type or the negative-positive-negative type, the angle of field is easily secured in the wide-angle end, an exit pupil is easily disposed away from an image sensor, and the digital camera can be constituted to be compact. Moreover, the focusing method of moving the third lens unit is usually used to miniaturize the zoom lens system.

In the compact digital camera, an image forming state (so-called contrast peak) in which a modulation transfer function (MTF) value becomes large is calculated from the degree of change of the image forming state on the image surface of the image sensor caused by movement of the focusing lens unit during the focusing operation.

On the other hand, when the third lens unit is moved to thereby perform the focusing operation, in the wide-angle end and the telephoto end, the focusing sensitivity changes with the position where the third lens unit is disposed (the higher the focusing sensitivity is, the faster the focusing operation becomes).

Furthermore, since the F-number in the wide-angle end is different from that in the telephoto end, the depth of focus differs (the smaller the depth of focus is, the faster the focusing operation becomes).

In general, in the compact zoom lens system, the closer to the telephoto end the position is, the larger the F-number becomes, the depth of focus increases, and the speed of the focusing operation lowers.

SUMMARY OF THE INVENTION

According to the present invention, there is provided a zoom lens system which can secure an appropriate zoom ratio and which is advantageously miniaturized and which is advantageous in securing an optical performance. In a first aspect of the present invention, the zoom lens system is a three-unit zoom lens system comprising, in order from an object side: a first lens unit having a negative refractive power; a second lens unit having a positive refractive power; and a third lens unit having a positive or negative refractive power, wherein a space between the first lens unit and the second lens unit changes during magnification change, a space between the second lens unit and the third lens unit changes during a focusing operation, the space between the first lens unit and the second lens unit is smaller in a telephoto end than in a wide-angle end, at least the second lens unit and the third lens unit move toward the only object side during the magnification change from the wide-angle end to the telephoto end, the second lens unit includes two or three lens elements in total, the two or three lens elements constitute a single cemented lens component, the cemented lens component includes a positive lens element and a negative lens element, the third lens unit includes one lens element in total, and the following condition is satisfied, $$0.4 < D_{ce}/D_{123G} < 0.6 \qquad (1A),$$

wherein $D_{ce}$ is a thickness of the cemented lens component of the second lens unit along an optical axis, and $D_{123G}$ is a sum of thicknesses of the lens units along the optical axis.

Furthermore, according to the present invention, there is provided a compact zoom lens system preferable for increasing a speed of a focusing operation. That is, in a second aspect of the present invention, the zoom lens system is a three-unit zoom lens system comprising, in order from an object side: a first lens unit having a negative refractive power; a second lens unit having a positive refractive power; and a third lens unit having a positive or negative refractive power, wherein a space between the first lens unit and the second lens unit is reduced during magnification change from a wide-angle end to a telephoto end, at least the second lens unit and the third lens unit move toward the only object side while changing a space between the second lens unit and the third lens unit, the third lens unit is moved in an optical-axis direction to perform focusing, and the following condition is satisfied, $$0.8 < \{d_W(2f_3-d_W)\}/\{d_T(2f_3-d_T)\}\cdot F_T/F_W < 1.1 \qquad (1B),$$

wherein $d_W$ is a distance from an image-side surface of the third lens unit to an image surface along an optical axis during focusing on the farthest object in the wide-angle end, $d_T$ is a distance from the image-side surface of the third lens unit to the image surface along the optical axis during the focusing on the farthest object in the telephoto end, $F_W$ is the F-number during a focusing operation of the zoom lens system in the wide-angle end, $F_T$ is the F-number during the focusing operation of the zoom lens system in the telephoto end, and $f_3$ is a focal length of the third lens unit.

Other features, examples, advantages and the like of the present invention will be clarified by the following detailed description, drawings and/or appended claims.

BRIEF DESCRIPTION OF THE DRAWINGS

FIGS. 19A to 19C are aberration diagrams in the wide-angle end (FIG. 19A), the intermediate state (FIG. 19B) and the telephoto end (FIG. 19C) of Example 2 when focused on the infinite object;

FIGS. 29A to 29C are aberration diagrams in the wide-angle end (FIG. 29A), the intermediate state (FIG. 29B) and the telephoto end (FIG. 29C) of Example 12 when focused on the infinite object;

FIGS. 30A to 30C are aberration diagrams in the wide-angle end (FIG. 30A), the intermediate state (FIG. 30B) and the telephoto end (FIG. 30C) of Example 13 when focused on the infinite object;

DETAILED DESCRIPTION

Figure 1A:
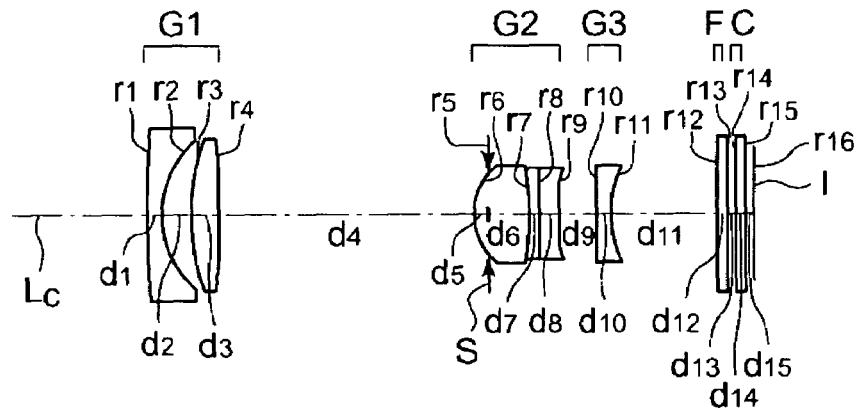
FIGS. 1A to 1C are sectional views in a wide-angle end (FIG. 1A), an intermediate state (FIG. 1B) and a telephoto end (FIG. 1C) of Example 1 of a zoom lens system of the present invention when focused on an infinite object.

First, a first aspect of the present invention will be described.

As described above, in the first aspect of the present invention, the zoom lens system is a three-unit zoom lens system comprising, in order from an object side, a first lens unit having a negative refractive power; a second lens unit having a positive refractive power; and a third lens unit having a positive or negative refractive power, wherein a space between the first lens unit and the second lens unit changes during magnification change, a space between the second lens unit and the third lens unit changes during a focusing operation;

the space between the first lens unit and the second lens unit is smaller in a telephoto end than in a wide-angle end, at least the second lens unit and the third lens unit move toward the only object side during the magnification change from the wide-angle end to the telephoto end, the second lens unit includes two or three lens elements in total, the two or three lens elements constitute a single cemented lens component, the cemented lens component includes a positive lens element and a negative lens element, the third lens unit includes one lens element in total, and the following condition is satisfied, $$0.4 < D_{ce}/D_{123G} < 0.6 \qquad (1A),$$

wherein $D_{ce}$ is a thickness of the cemented lens component of the second lens unit along an optical axis, and $D_{123G}$ is a sum of thicknesses of the lens units along the optical axis.

In this zoom lens system, the third lens unit is constituted to move to the only object side during the magnification change from the wide-angle end to the telephoto end. Therefore, as compared with a case where the third lens unit is fixed or moves to an image side during the magnification change, the ray height in the third lens unit can be lowered. Therefore, the diameter of the third lens unit can be reduced.

Especially, since the third lens unit is constituted of one lens, the simplest constitution is achieved, and the constitution is advantageous to miniaturization of the zoom lens system when collapsed.

Furthermore, the second lens unit includes a positive lens and a negative lens, the unit is constituted of two or three lenses in total, and the lenses are cemented on the optical axis and constitute a cemented lens. The second lens unit includes the positive lens and the negative lens in this manner. Therefore, although the number of the lenses is small, generation of an aberration in the second lens unit can easily be inhibited. Moreover, since these lenses constitute the cemented lens, an air space in the second lens unit is eliminated, the second lens unit itself is miniaturized, and the constitution is advantageous in securing a space for movement of the third lens unit. This constitution can also reduce an influence of decentering on the aberration.

Furthermore, since the second lens unit is constituted of the cemented lens only, at least one portion of any of the lenses of the second lens unit may be held, and the thickness of the lens holding frame can be reduced. Therefore, this constitution is advantageous in thinning the zoom lens system when collapsed.

In addition, this zoom lens system satisfies the condition (1A). To enhance a yield during production while securing the thinned system when collapsed, it is preferable that the ratio of the thickness of the cemented lens of the second lens unit to the sum $D_{123G}$ of the thicknesses of the lens units along the optical axis is in a range of the condition (1A).

To obtain an excellent curvature of field, it is general that the sum of the thickness of the second lens unit is increased to thereby reduce the difference between the sagittal image surface and the meridional image surface. It is also general that the length of the second lens unit is secured to thereby mainly correct the spherical aberration by the object side surface of the second lens unit and mainly correct the curvature of field by the image side surface of the second lens unit. However, when the total length of the second lens unit is increased, it is difficult to set the zoom lens system to be compact when collapsed.

On the other hand, when shapes and materials of the lenses of the second lens unit are devised to acquire an aberration balance, it is possible to reduce the length of the second lens unit while maintaining a designed performance. However, in this case, the second lens unit is sensitive to an influence of an error of the shape or the thickness of each lens on an optical performance. Therefore, an allowable range of a manufacturing error is reduced.

The condition (1A) is a condition for reducing the length of the second lens unit while securing the allowable range of the manufacturing error. When $D_{ce}/D_{123G}$ in the condition (1A) falls below the lower limit of 0.4, the thickness of the cemented lens is reduced, the manufacturing error of the thickness influences the spherical aberration and the curvature of field, and it becomes difficult to maintain the optical performance. When $D_{ce}/D_{123G}$ exceeds the upper limit of 0.6, the thickness of the second lens unit becomes excessively large with respect to the thickness of the zoom lens system, and it becomes difficult to thin the zoom lens system when collapsed.

The focusing is performed by changing the space between the second lens unit and the third lens unit.

It is to be noted that it is further preferable that the third lens unit is constituted of a single plastic lens to reduce the weight.

Furthermore, it is preferable that the focusing is performed by movement of the only third lens unit.

Furthermore, when this zoom lens system is brought closer to the telephoto end, the third lens unit is positioned closer to the object side. In this case, the focusing sensitivity of the third lens unit becomes high, and the power of the third lens unit can be weakened. Therefore, the thickness of the third lens unit can be reduced, and this is advantageous in thinning the zoom lens system when collapsed.

In a case where the third lens unit is used as a focusing lens unit, since the third lens unit includes only one lens, and further the weight of the lens is suppressed, the driving system can be simplified, and this contributes to miniaturization of the lens barrel.

Furthermore, when the system is constituted so that the space between the second lens unit and the third lens unit changes during the magnification change, the image position during the magnification change is effectively adjusted, and the aberration fluctuation due to the magnification change is effectively suppressed.

Furthermore, in a case where the space between the second lens unit and the third lens unit changes during the magnification change, when movement amounts of the units are mutually adjusted, the aberration fluctuation due to the magnification change is also suppressed.

In addition, when the first lens unit is constituted to reciprocate in the optical-axis direction during the magnification change, the first lens unit is provided with a main image position adjustment function.

Furthermore, it is preferable that the first lens unit is constituted of two lenses of a negative lens and a positive lens in order from the object side.

According to such a constitution, while the principal point of the first lens unit is disposed close to the object side to miniaturize the system in a used state, the aberration balance of the chromatic aberration or the like can easily be acquired. The constitution is also effective in both maintaining the optical performance and thinning the lens barrel when collapsed.

It is preferable to satisfy the following condition (2A), $$-0.005<\{D_2(t)-D_2(w)\}/f_w<0.5 \tag{2A},$$

wherein $D_2(w)$ is an air space between the second lens unit and the third lens unit along the optical axis in the wide-angle end, $D_2(t)$ is an air space between the second lens unit and the third lens unit along the optical axis in the telephoto end, and $f_w$ is a focal length of the zoom lens system in the wide-angle end.

The condition (2A) defines to the difference of the space between the second lens unit and the third lens unit between the telephoto end and the wide-angle end normalized by the focal length in the wide-angle end, and is a condition for setting ease of adjustment of the image position to be consistent with the miniaturization. When $\{D_2(t)-D_2(w)\}/f_w$ in the condition (2A) does not fall below the lower limit of −0.005, it is easy to secure a space necessary for adjustment of the positional deviation of the image surface by positional adjustment of the third lens unit. When the focusing is performed by the third lens unit, it is easy to secure a space necessary for the focusing in the telephoto end. When $\{D_2(t)-D_2(w)\}/f_w$ does not exceed the upper limit of 0.5, the ray height in the first lens unit in the wide-angle end can be inhibited from being increased, and the increase of the diameter of the front lens is easily suppressed. Alternatively, in the telephoto end, the off-axial ray height in the third lens unit, which is the final lens in the zoom lens system, can be inhibited from being increased, and the constitution is advantageous to the reduction of the lens diameter.

In order to hold a holding frame which holds the third lens unit, in a case where a shaft is disposed on a holding frame of the second lens unit to hold the third lens unit, a length of this shaft increases in accordance with a movement amount of the third lens unit. Therefore, when the condition (2A) is satisfied, the zoom lens system can easily be thinned when collapsed.

Furthermore, it is preferable that the second lens unit is constituted of one cemented lens including three lenses of a positive lens, a negative lens and a positive lens in order from the object side.

When the second lens unit is constituted of three lenses of a positive lens, a negative lens and a positive lens, the generation of the aberration in the second lens unit is easily reduced. When these three lenses are cemented to constitute the second lens unit of one cemented lens, the constitution is advantageous to the miniaturization of the second lens unit itself and the securing of the movement space of the third lens unit.

Furthermore, the entrance surface of the cemented lens is formed into such a shape that the refractive power has a positive value on the optical axis and the refractive power in a portion on the surface becomes smaller as the portion comes farther from the optical axis. In consequence, the positive refractive power of the second lens unit can be secured. Since the principal point can be disposed close to the object side, it is possible to secure the zoom ratio. In addition, the spherical aberration easily generated in this surface is advantageously corrected.

Furthermore, the exit surface of the cemented lens is formed into such a shape that the refractive power in a portion on the surface becomes smaller (the positive refractive power is weakened or the negative refractive power is strengthened) as the portion comes closer to the periphery of the surface. In consequence, the curvature of field is advantageously corrected.

In addition, in a case where the refractive index of each lens is selected so that the Abbe number of the negative lens of the cemented lens is smaller than that of any positive lens of the cemented lens, and a concave surface of the negative lens of the cemented lens has a negative refractive power, the chromatic aberration can satisfactorily be corrected.

That is, the spherical aberration can be controlled mainly by the object side surface of the cemented lens. The chromatic aberration can be controlled by mainly controlling the power and the Abbe number of the central negative lens rather than the surface shape of the lens. An off-axial aberration can be controlled mainly by the image side surface of the cemented lens. Needless to say, there is also an effect of controlling the aberration on the cemented surface. Therefore, it is preferable that this effect is used together with the above-described main effect.

Furthermore, it is preferable to satisfy the following condition (3A), $$1.2<C_j(t)/f_t<1.8 \tag{3A},$$

wherein $C_j(t)$ is a distance from an entrance surface of the first lens unit to the image surface of the zoom lens system in the telephoto end, and $f_t$ is a focal length of the zoom lens system in the telephoto end.

This condition (3A) defines the total length of the zoom lens system in the telephoto end normalized by the focal length of the telephoto end, and is a condition for reducing the total length to thereby further simplify the constitution of the lens barrel. In a case where $C_j(t)/f_t$ in the condition (3A) does not fall below the lower limit of 1.2, an increase of the total length in the wide-angle end is easily suppressed. Alternatively, a desired zoom ratio is easily obtained. When $C_j(t)/f_t$ does not exceed the upper limit of 1.8, the increase of the total length of the lens barrel is easily suppressed, and the condition is advantageous to the miniaturization.

Furthermore, it is preferable that the third lens unit moves for the focusing, and the third lens unit is a positive lens which satisfies the following condition (4A), $$3.0<f_3/f_w<15.0 \tag{4A},$$

wherein $f_3$ is a focal length of the third lens unit, and $f_w$ is a focal length of the zoom lens system in the wide-angle end.

This condition (4A) defines the focal length of the third lens unit normalized by the focal length of the zoom lens system in the wide-angle end. In this zoom lens system, especially the mode of movement of the third lens unit is advantageous to the miniaturization of the third lens unit. Especially when the third lens unit is used as the focusing lens unit, as compared with another focusing method, the burden on the driving mechanism can be reduced. Further in this zoom lens system, since the focusing sensitivity of the third lens unit in the telephoto end is easily increased, the refractive power of the third lens unit can appropriately be reduced so as to satisfy the condition (4A), and the constitution is more advantageous to the miniaturization.

When $f_3/f_w$ in the condition (4A) does not fall below the lower limit of 3.0, the ray height in the first lens unit in the wide-angle end is easily suppressed, and the diameter of the first lens unit is easily reduced. Alternatively, the influence of the aberration in the third lens unit is suppressed, the increase of the thickness of the third lens unit is suppressed, and the constitution is advantageous to the thinning of the lens barrel. In a case where $f_3/f_w$ does not exceed the upper limit of 15.0, the movement amount of the third lens unit during the focusing is suppressed and this is advantageous to the thinning.

Furthermore, it is preferable that the third lens unit moves for the focusing, and the third lens unit is a negative lens which satisfies the following condition (5A), $$1.5 < |f_3/f_w| < 15.0 \tag{5A}$$

wherein $f_3$ is a focal length of the third lens unit, and $f_w$ is a focal length of the zoom lens system in the wide-angle end.

This condition (5A) defines the absolute value of the focal length of the third lens unit normalized by the focal length of the zoom lens system in the wide-angle end. In this zoom lens system, especially the mode of movement of the third lens unit is advantageous to the miniaturization of the third lens unit. Especially, the constitution in which this third lens unit is the negative lens is advantageous to the miniaturization of the zoom lens system in the diametrical direction. Moreover, when the third lens unit is a focusing lens unit, the focusing sensitivity of the third lens unit in the telephoto end is easily increased. Therefore, the refractive power of the third lens unit can appropriately be reduced so as to satisfy the condition (5A), and the constitution becomes more advantageous to the miniaturization.

When $|f_3/f_w|$ in the condition (5A) does not fall below the lower limit of 1.5, the refractive power of the third lens unit is suppressed, and the influence on the aberration can easily be reduced. An increase of the thickness of the edge of the third lens unit can be suppressed, and the constitution is advantageous to the thinning of the lens barrel. When $|f_3/f_w|$ does not exceed the upper limit of 15.0, the movement amount of the third lens unit during the focusing can be suppressed, and this is advantageous to the thinning.

Furthermore, it is preferable to satisfy the following condition (6A) so that the third lens unit is a positive lens having an appropriate thickness, $$0.03 < D_{3G}/f_t < 0.09 \tag{6A}$$

wherein $D_{3G}$ is the thickness of the third lens unit along the optical axis, and $f_t$ is a focal length of the zoom lens system in the telephoto end.

When $D_{3G}/f_t$ in the condition (6A) does not fall below the lower limit of 0.03, the condition is advantageous to the securing of the positive refractive power necessary for the third lens unit. When $D_{3G}/f_t$ does not exceed the upper limit of 0.09, the thickness of the third lens unit along the optical axis can be suppressed, and the condition is advantageous to the miniaturization of the zoom lens system when collapsed.

Furthermore, it is preferable to satisfy the following condition (7A) so that the third lens unit is a negative lens having an appropriate thickness, $$0.01 < D_{3G}/f_t < 0.09 \tag{7A}$$

wherein $D_{3G}$ is the thickness of the third lens unit along the optical axis, and $f_t$ is the focal length of the zoom lens system in the telephoto end.

When $D_{3G}/f_t$ in the condition (7A) does not fall below the lower limit of 0.01, the condition is advantageous to the securing of the strength of the negative lens of the third lens unit. When $D_{3G}/f_t$ does not exceed the upper limit of 0.09, the thickness of the third lens unit along the optical axis is suppressed, and the condition is advantageous to the miniaturization of the zoom lens system when collapsed.

Moreover, when the third lens unit moves to thereby perform the focusing, the focusing sensitivity of the third lens unit depends on the image forming magnification of the third lens unit. Therefore, when the third lens unit is a positive lens, it is preferable to satisfy the following condition (8A-1) so that the focusing sensitivity of the third lens unit in the telephoto end is appropriate, $$0.35 < 1 - \beta_{3T}^2 < 0.98 \tag{8A-1}$$

wherein $\beta_{3T}$ is a lateral magnification of the third lens unit in the telephoto end.

When $1-\beta_{3T}^2$ in the condition (8A-1) does not fall below the lower limit of 0.35, the movement amount of the third lens unit is suppressed, or the increase of the space for the focusing operation is suppressed, and the condition is advantageous to the miniaturization of the whole zoom lens system when used. When $1-\beta_{3T}^2$ does not exceed the upper limit of 0.98, the lateral magnification of the third lens unit is reduced. Therefore, the condition is advantageous in suppressing the distance from the unit to the image surface to miniaturize the unit.

Moreover, when the third lens unit is a negative lens, it is preferable to satisfy the following condition (8A-2) so that the focusing sensitivity of the third lens unit in the telephoto end is appropriate, $$-3.5 < 1 - \beta_{3T}^2 < -0.6 \tag{8A-2}$$

wherein $\beta_{3T}$ is a lateral magnification of the third lens unit in the telephoto end.

When $1-\beta_{3T}^2$ in the condition (8A-2) does not fall below the lower limit of -3.5, the absolute value of the lateral magnification of the third lens unit is reduced. Therefore, the focusing sensitivity is inhibited from being excessively increased, and the condition is advantageous in securing precision of the focusing. When $1-\beta_{3T}^2$ does not exceed the upper limit of -0.6, the focusing sensitivity can be secured. Therefore, the space of the movement for the focusing operation is suppressed, and the condition is advantageous to the miniaturization of the driving mechanism.

Furthermore, it is preferable to satisfy the following condition (9A), $$2.5 \leq f_t/f_w < 5.5 \tag{9A}$$

wherein $f_t$ is a focal length of the zoom lens system in the telephoto end, and $f_w$ is a focal length of the zoom lens system in the wide-angle end.

This condition (9A) defines the zoom ratio of the zoom lens system. When the zoom ratio of the zoom lens system has an appropriate value of 2.5 or more, a balance between the size and the optical performance of the zoom lens system is preferably easily acquired. When $f_t/f_w$ in the condition (9A) does not fall below the lower limit of 2.5, a sufficient zoom ratio for general use is obtained. When $f_t/f_w$ does not exceed the upper limit of 5.5, an increase of the number of the lenses for correcting the aberration is suppressed, and the condition is advantageous to reduction of costs.

Furthermore, it is preferable that an aperture stop is disposed immediately before the second lens unit, and the aperture stop moves integrally with the second lens unit during the magnification change.

According to such a constitution, enlargement of the diameter of the first lens unit is prevented, and an off-axial chief ray exit from the third lens unit is easily brought into a nearly parallel state with respect to the optical axis. Further, since the lenses of the second lens unit are disposed on the image side of the aperture stop, it is possible to reduce an aberration deterioration due to relative decentering between the lenses of the second lens unit. A moving mechanism of the aperture stop can be shared by that of the second lens unit, and the constitution is easily simplified.

Moreover, when the above-described zoom lens system is used as an image pickup optical system of an image pickup apparatus, it is preferable to dispose an image sensor which converts an optical image into an electric signal on the image side of the zoom lens system.

The zoom lens system can be constituted so as to simultaneously satisfy a plurality of arbitrarily combined constitutions and/or conditions described above. In consequence, a more satisfactory effect can be obtained.

Moreover, the conditions can be modified as follows.

In the condition (1A), to acquire a satisfactory balance between the influence of the manufacturing error and the length of the second lens unit, it is more preferable to set the lower limit value to 0.46, further 0.48. Furthermore, it is more preferable to set the upper limit value to 0.55, further 0.52.

In the condition (2A), it is more preferable to set the lower limit value to 0.01, further 0.03. Furthermore, it is more preferable to set the upper limit value to 0.4, further 0.35.

In the condition (3A), when the third lens unit is a positive lens, to acquire a balance between the aberration balance and the reduction of the total length, it is more preferable to set the lower limit value to 1.4, further 1.5. Furthermore, it is more preferable to set the upper limit value to 1.76, further 1.7.

When the third lens unit is a negative lens, to acquire the balance between the aberration balance and the reduction of the total length, it is more preferable to set the lower limit value to 1.3, further 1.35. Furthermore, it is more preferable to set the upper limit value to 1.7, further 1.5.

In the condition (4A), it is more preferable to set the lower limit value to 3.4. It is more preferable to set the upper limit value to 10.0, further 8.0.

In the condition (5A), it is more preferable to set the lower limit value to 1.8, further 2.0. Furthermore, it is more preferable to set the upper limit value to 10.0, further 7.0.

In the condition (6A), it is more preferable to set the lower limit value to 0.04, further 0.05. Furthermore, it is more preferable to set the upper limit value to 0.084, further 0.077.

In the condition (7A), it is more preferable to set the lower limit value to 0.02, further 0.03. Furthermore, it is more preferable to set the upper limit value to 0.07, further 0.055.

In the condition (9A), it is more preferable to set the lower limit value to 2.6, further 2.7. Furthermore, it is more preferable to set the upper limit value to 4.5, further 3.5.

NUMERICAL EXAMPLES

Examples 1 to 17 of the zoom lens system according to the present invention will be described hereinafter.

FIGS. 1A to 17C are sectional views of Examples 1 to 17 each including an optical axis during focusing on an infinite object. Among these drawings, FIGS. 1A, 2A, 3A . . . show sections in wide-angle ends, FIGS. 1B, 2B, 3B . . . show sections in intermediate states, and FIGS. 1C, 2C, 3C . . . show sections in telephoto ends, respectively. In the drawings, the first lens unit is denoted with G1, the aperture stop (brightness stop) is denoted with S, the second lens unit is denoted with G2, the third lens unit is denoted with G3, a plane parallel plate which includes a low pass filter coated with an IR cut coating is denoted with F, a plane parallel plate which is a cover glass of an electronic image sensor (a CCD image sensor or a CMOS image sensor) is denoted with C, and the image surface is denoted with I. When these zoom lens systems are used as image pickup optical systems of image pickup apparatuses, the light receiving surface of each electronic image sensor is disposed on each image surface I. It is to be noted that a multilayered film for restricting a wavelength region may be disposed on the surface of the cover glass C. The cover glass C may be provided with a low pass filter function.

Figure 1B:
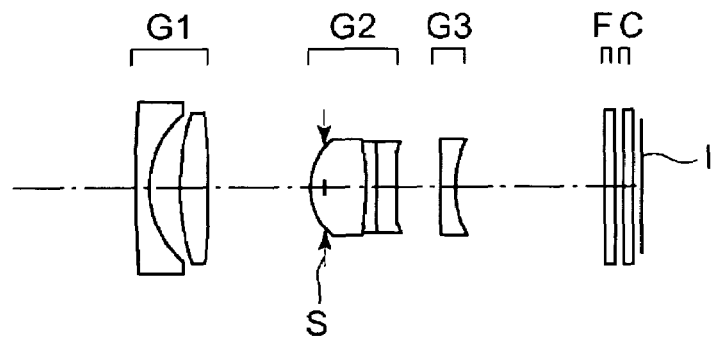
Figure 1C:
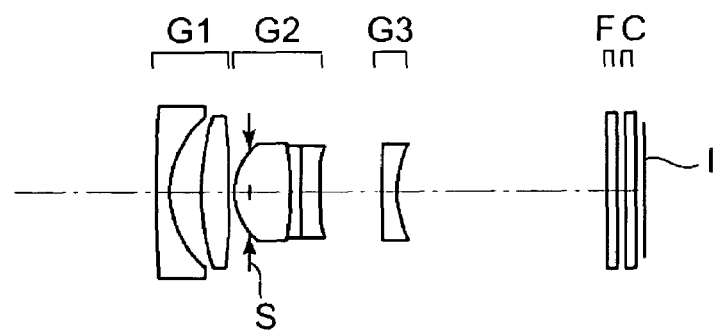

As shown in FIG. 1A, Example 1 is constituted of, in order from the object side, the first lens unit G1 having a positive refractive power, the aperture stop S, the second lens unit G2 having a positive refractive power and the third lens unit G3 having a negative refractive power. When magnification change is performed from the wide-angle end to the telephoto end, the first lens unit G1 moves toward the image side. The aperture stop S and the second lens unit G2 integrally monotonously moves toward the object side while reducing the space between the second lens unit and the first lens unit G1. The third lens unit G3 moves toward the object side while enlarging the space between the third lens unit and the second lens unit G2.

The first lens unit G1 is constituted of, in order from the object side, a negative meniscus lens whose convex surface faces the object side and a positive meniscus lens whose convex surface faces the object side. The second lens unit G2 is constituted of a cemented triplet including, in order from the object side, a double-convex positive lens, a negative meniscus lens whose convex surface faces the image side and a positive meniscus lens whose convex surface faces the image side. The third lens unit G3 is constituted of one double-concave negative lens. The aperture stop is positioned on the image side of the vertex (intersection between the surface of the cemented triplet closest to the object side and the optical axis) of the surface of the cemented triplet of the second lens unit G2 closest to the object side.

Aspherical surfaces are used on six surfaces including opposite surfaces of the positive meniscus lens of the first lens unit G1; the surfaces of the cemented triplet of the second lens unit G2 closest to the object side and the image side; and opposite surfaces of the double-concave negative lens of the third lens unit G3.

Figure 2A:
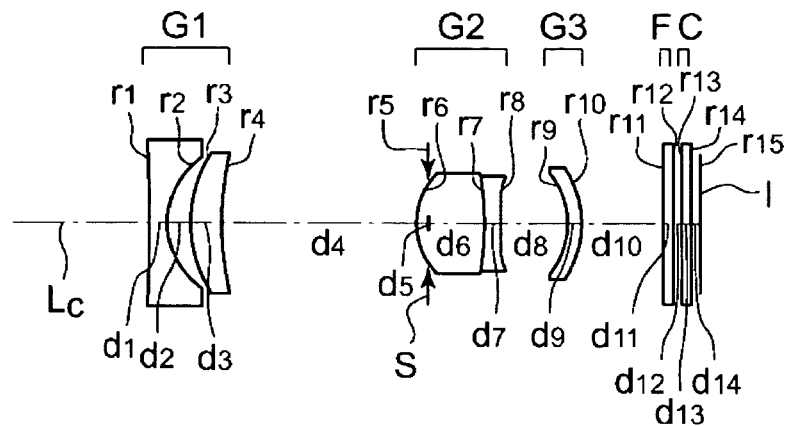
FIGS. 2A to 2C are sectional views in a wide-angle end (FIG. 2A), an intermediate state (FIG. 2B) and a telephoto end (FIG. 2C) of Example 2 of the zoom lens system of the present invention when focused on an infinite object.
Figure 2B:
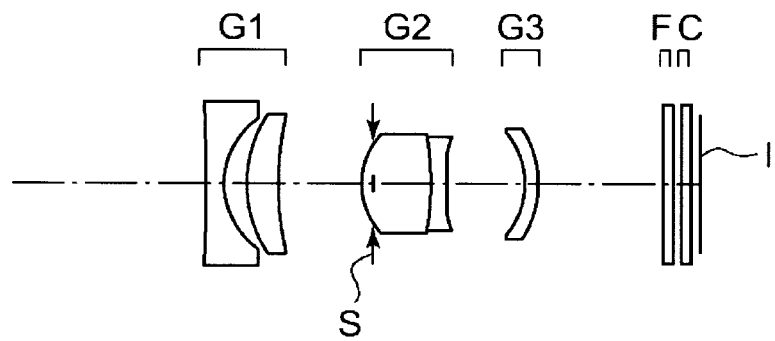
Figure 2C:
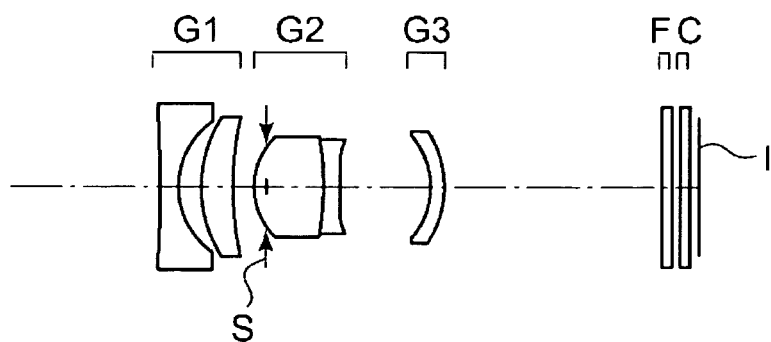

As shown in FIG. 2A, Example 2 is constituted of, in order from the object side, the first lens unit G1 having a negative refractive power, the aperture stop S, the second lens unit G2 having a positive refractive power and the third lens unit G3 having a negative refractive power. When magnification change is performed from the wide-angle end to the telephoto end, the first lens unit G1 moves along a locus of movement concave toward the object side, and is arranged closer to an image side in the telephoto end than in the wide-angle end. The aperture stop S and the second lens unit G2 integrally monotonously moves toward the object side while reducing the space between the second lens unit and the first lens unit G1. The third lens unit G3 moves toward the object side while enlarging the space between the third lens unit and the second lens unit G2.

The first lens unit G1 is constituted of, in order from the object side, a double-concave negative lens and a positive meniscus lens whose convex surface faces the object side.

The second lens unit G2 is constituted of a cemented doublet including, in order from the object side, a double-convex positive lens and a negative meniscus lens whose convex surface faces the image side. The third lens unit G3 is constituted of one negative meniscus lens whose convex surface faces the image side. The aperture stop S is positioned on the image side of the vertex of the surface of the cemented doublet of the second lens unit G2 closest to the object side.

Aspherical surfaces are used on three surfaces including the image-side surface of the double-concave negative lens of the first lens unit G1; and the surfaces of the cemented doublet of the second lens unit G2 closest to the object side and the image side.

Figure 3A:
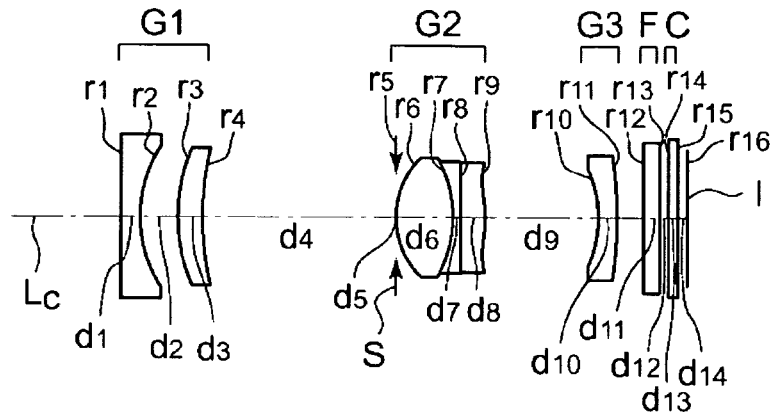
FIGS. 3A to 3C are sectional views in a wide-angle end (FIG. 3A), an intermediate state (FIG. 3B) and a telephoto end (FIG. 3C) of Example 3 of the zoom lens system of the present invention when focused on an infinite object.
Figure 3B:
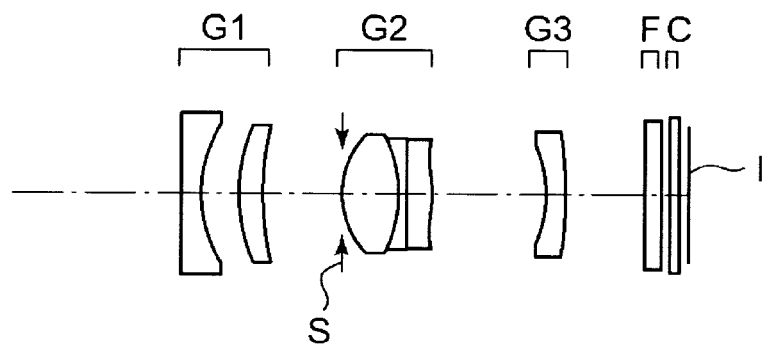
Figure 3C:
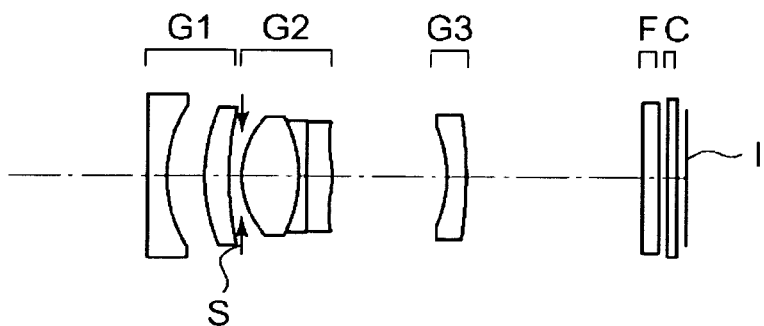

As shown in FIG. 3A, Example 3 is constituted of, in order from an object side, the first lens unit G1 having a negative refractive power, the aperture stop S, the second lens unit G2 having a positive refractive power and a third lens unit G3 having a negative refractive power. When magnification change is performed from the wide-angle end to the telephoto end, the first lens unit G1 moves along a locus of movement concave toward the object side, and is arranged closer to the image side in the telephoto end than in the wide-angle end. The aperture stop S and the second lens unit G2 integrally monotonously moves toward the object side while reducing the space between the second lens unit and the first lens unit G1. The third lens unit G3 moves toward the object side while enlarging the space between the third lens unit and the second lens unit G2.

The first lens unit G1 is constituted of, in order from the object side, a negative meniscus lens whose convex surface faces the object side and a positive meniscus lens whose convex surface faces the object side. The second lens unit G2 is constituted of a cemented triplet including, in order from the object side, a double-convex positive lens, a negative meniscus lens whose convex surface faces the image side and a positive meniscus lens whose convex surface faces the image side. The third lens unit G3 is constituted of one double-concave negative lens. The aperture stop S is positioned on the same position as that of the vertex of the surface of the cemented triplet of the second lens unit G2 closest to the object side.

Aspherical surfaces are used on five surfaces including the surface of the negative meniscus lens of the first lens unit G1; the surfaces of the cemented triplet of the second lens unit G2 closest to the object side and the image side; and opposite surfaces of the double-concave negative lens of the third lens unit G3.

Figure 4A:
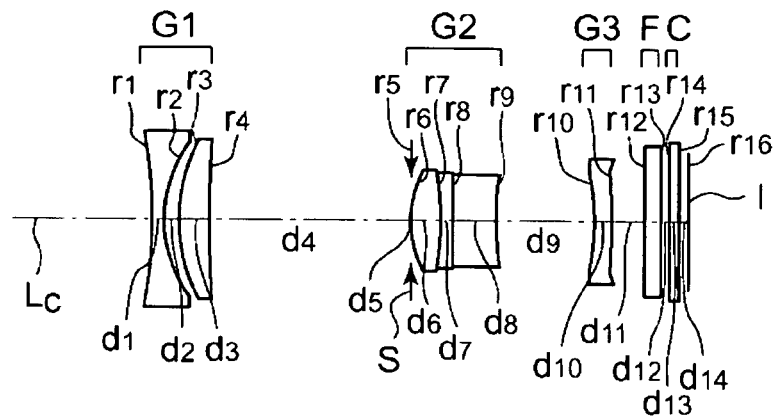
FIGS. 4A to 4C are sectional views in a wide-angle end (FIG. 4A), an intermediate state (FIG. 4B) and a telephoto end (FIG. 4C) of Example 4 of the zoom lens system of the present invention when focused on an infinite object.
Figure 4B:
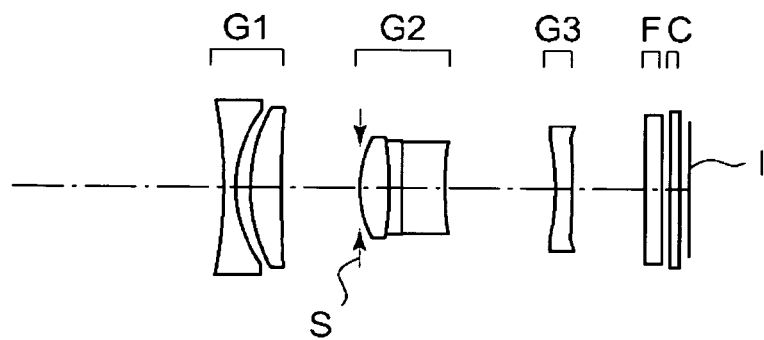
Figure 4C:
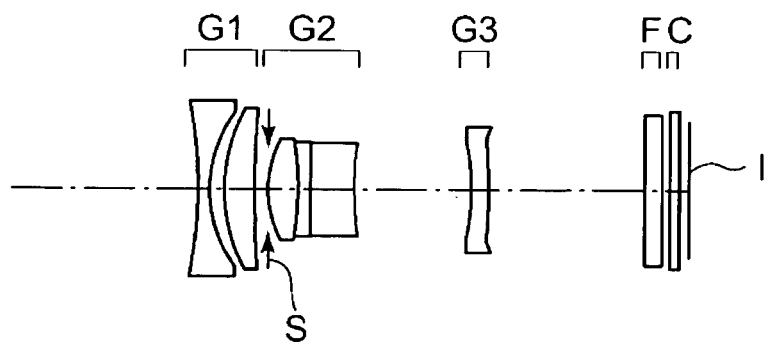

As shown in FIG. 4A, Example 4 is constituted of, in order from the object side, the first lens unit G1 having a negative refractive power, the aperture stop S, the second lens unit G2 having a positive refractive power and the third lens unit G3 having a negative refractive power. When magnification change is performed from the wide-angle end to the telephoto end, the first lens unit G1 moves along a locus of movement concave toward the object side, and is arranged closer to an image side in the telephoto end than in the wide-angle end. The aperture stop S and the second lens unit G2 integrally monotonously moves toward the object side while reducing the space between the second lens unit and the first lens unit G1. The third lens unit G3 moves toward the object side while enlarging the space between the third lens unit and the second lens unit G2.

The first lens unit G1 is constituted of, in order from the object side, a double-concave negative lens and a positive meniscus lens whose convex surface faces the object side. The second lens unit G2 is constituted of a cemented triplet including, in order from the object side, a double-convex positive lens, a double-concave negative lens and a double-convex positive lens. The third lens unit G3 is constituted of one double-concave negative lens. The aperture stop S is positioned on the image side of the vertex of the surface of the cemented triplet of the second lens unit G2 closest to the object side.

Aspherical surfaces are used on five surfaces including the object-side surface of the positive meniscus lens of the first lens unit G1; the surfaces of the cemented triplet of the second lens unit G2 closest to the object side and the image side; and opposite surfaces of the double-concave negative lens of the third lens unit G3.

Figure 5A:
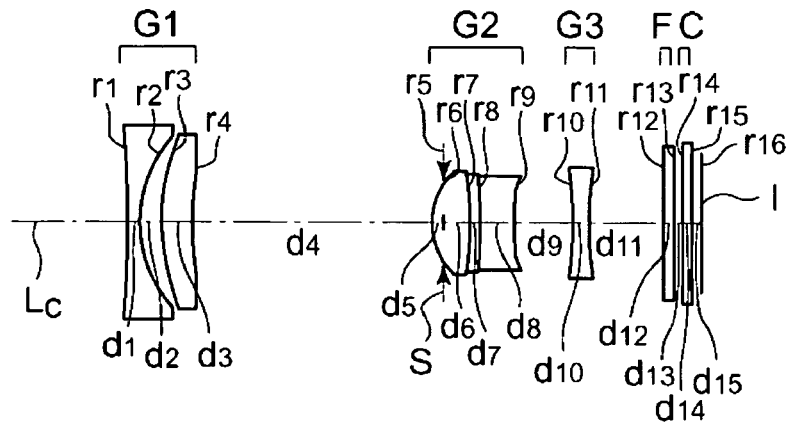
FIGS. 5A to 5C are sectional views in a wide-angle end (FIG. 5A), an intermediate state (FIG. 5B) and a telephoto end (FIG. 5C) of Example 5 of the zoom lens system of the present invention when focused on an infinite object.
Figure 5B:
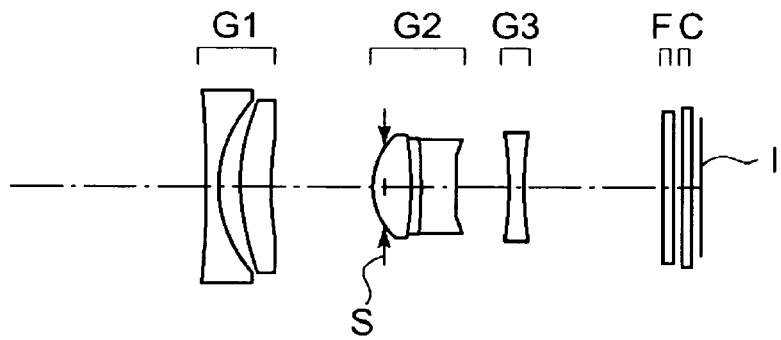
Figure 5C:
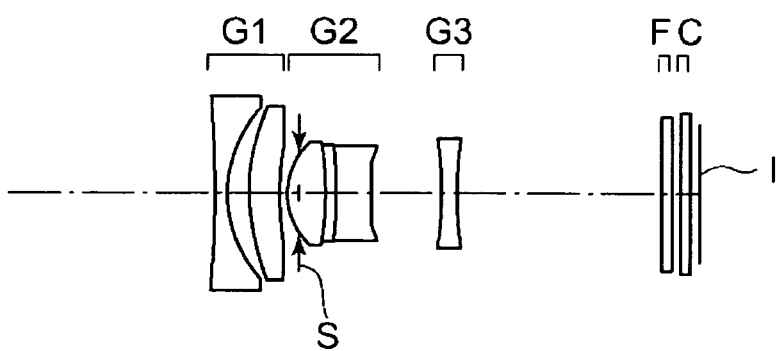

As shown in FIG. 5A, Example 5 is constituted of, in order from the object side, the first lens unit G1 having a negative refractive power, the aperture stop S, the second lens unit G2 having a positive refractive power and the third lens unit G3 having a negative refractive power. When magnification change is performed from the wide-angle end to the telephoto end, the first lens unit G1 moves toward the image side. The aperture stop S and the second lens unit G2 integrally monotonously moves toward the object side while reducing the space between the second lens unit and the first lens unit G1. The third lens unit G3 moves toward the object side while once reducing the space between the third lens unit and the second lens unit G2 and then enlarging the space.

The first lens unit G1 is constituted of, in order from the object side, a double-concave negative lens and a positive meniscus lens whose convex surface faces the object side. The second lens unit G2 is constituted of a cemented triplet including, in order from the object side, a double-convex positive lens, a negative meniscus lens whose convex surface faces the image side and a negative meniscus lens whose convex surface faces the image side. The third lens unit G3 is constituted of one double-concave negative lens. The aperture stop S is positioned on the image side of the vertex of the surface of the cemented triplet of the second lens unit G2 closest to the object side.

Aspherical surfaces are used on six surfaces including opposite surfaces of the positive meniscus lens of the first lens unit G1; the surfaces of the cemented triplet of the second lens unit G2 closest to the object side and the image side; and opposite surfaces of the double-concave negative lens of the third lens unit G3.

Figure 6A:
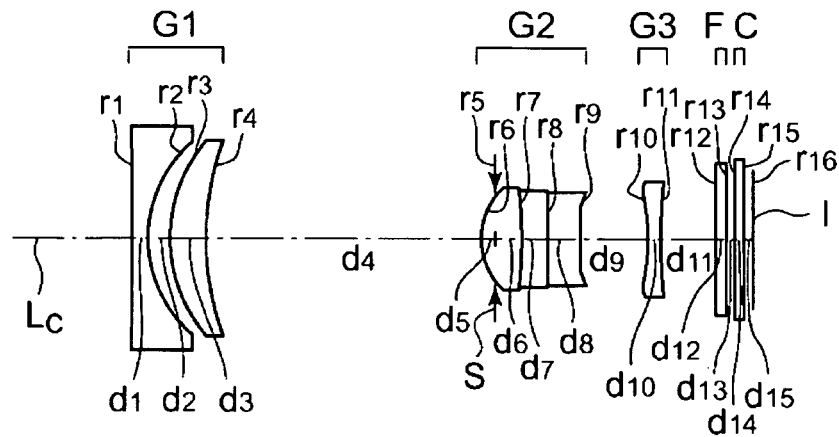
FIGS. 6A to 6C are sectional views in a wide-angle end (FIG. 6A), an intermediate state (FIG. 6B) and a telephoto end (FIG. 6C) of Example 6 of the zoom lens system of the present invention when focused on an infinite object.
Figure 6B:
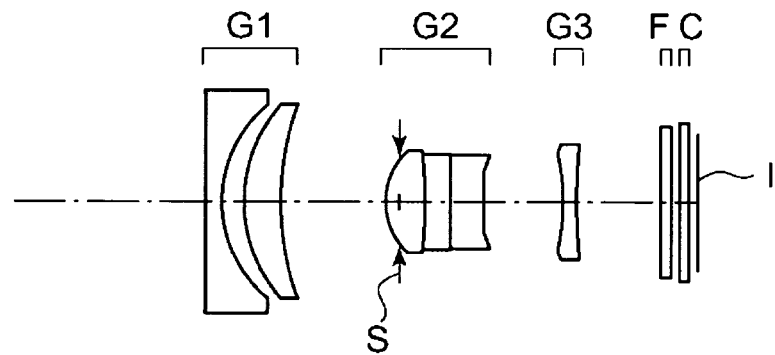
Figure 6C:
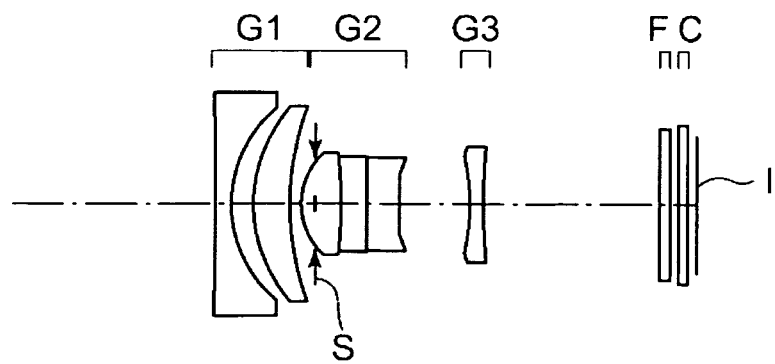

As shown in FIG. 6A, Example 6 is constituted of, in order from the object side, a first lens unit G1 having a negative refractive power, the aperture stop S, the second lens unit G2 having a positive refractive power and the third lens unit G3 having a negative refractive power. When magnification change is performed from the wide-angle end to the telephoto end, the first lens unit G1 moves toward an image side. The aperture stop S and the second lens unit G2 integrally monotonously moves toward the object side while reducing the space between the second lens unit and the first lens unit G1. The third lens unit G3 moves toward the object side while once enlarging the space between the third lens unit and the second lens unit G2 and then reducing the space.

The first lens unit G1 is constituted of, in order from the object side, a double-concave negative lens and a positive meniscus lens whose convex surface faces the object side. The second lens unit G2 is constituted of a cemented triplet including, in order from the object side, a double-convex positive lens, a negative meniscus lens whose convex surface faces the image side and a double-concave negative lens. The third lens unit G3 is constituted of one double-concave negative lens. The aperture stop S is positioned on the image side of the vertex of the surface of the cemented triplet of the second lens unit G2 closest to the object side.

Aspherical surfaces are used on five surfaces including the image-side surface of the double-concave negative lens of the first lens unit G1; the surfaces of the cemented triplet of the second lens unit G2 closest to the object side and the image side; and opposite surfaces of the double-concave negative lens of the third lens unit G3.

Figure 7A:
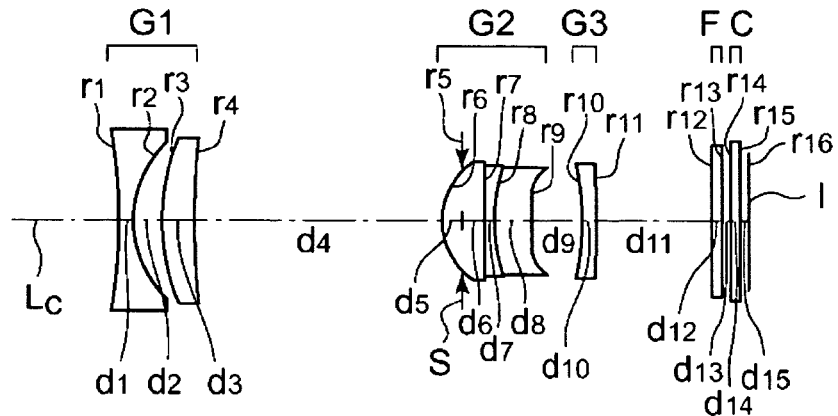
FIGS. 7A to 7C are sectional views in a wide-angle end (FIG. 7A), an intermediate state (FIG. 7B) and a telephoto end (FIG. 7C) of Example 7 of the zoom lens system of the present invention when focused on an infinite object.
Figure 7B:
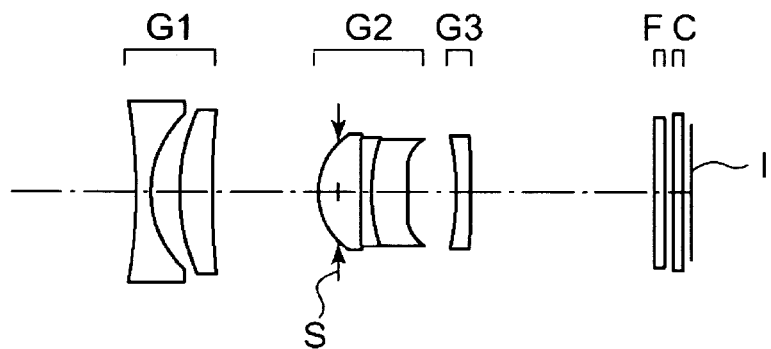
Figure 7C:
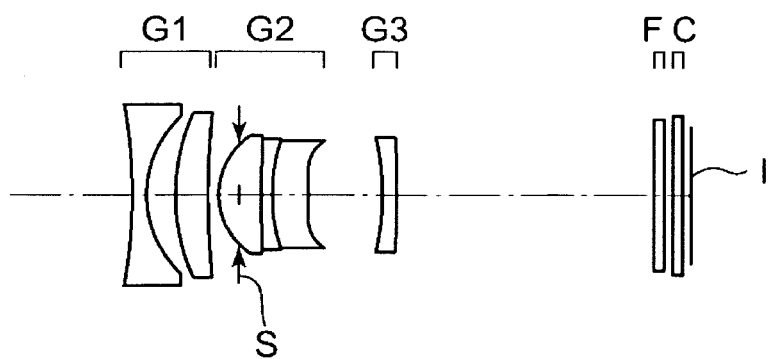

As shown in FIG. 7A, Example 7 is constituted of, in order from the object side, the first lens unit G1 having a positive refractive power, the aperture stop S, the second lens unit G2 having a positive refractive power and the third lens unit G3 having a negative refractive power. When magnification change is performed from the wide-angle end to the telephoto end, the first lens unit G1 moves along a locus of movement concave toward the object side. The second lens unit is arranged slightly closer to the object side in the telephoto end than in the intermediate state, and arranged closer to the image side in the telephoto end than in the wide-angle end. The aperture stop S and the second lens unit G2 integrally monotonously moves toward the object side while reducing the space between the second lens unit and the first lens unit G1. The third lens unit G3 moves toward the object side while once reducing the space between the third lens unit and the second lens unit G2 and then enlarging the space.

The first lens unit G1 is constituted of, in order from the object side, a double-concave negative lens and a positive meniscus lens whose convex surface faces the object side. The second lens unit G2 is constituted of a cemented triplet including a positive meniscus lens whose convex surface faces the object side, a negative meniscus lens whose convex surface faces the object side and a double-convex positive lens. The third lens unit G3 is constituted of one double-concave negative lens. The aperture stop S is positioned on the image side of the vertex of the surface of the cemented triplet of the second lens unit G2 closest to the object side.

Aspherical surfaces are used on five surfaces including the image-side surface of the double-concave negative lens of the first lens unit G1; the surfaces of the cemented triplet of the second lens unit G2 closest to the object side and the image side; and opposite surfaces of the double-concave negative lens of the third lens unit G3.

Figure 8A:
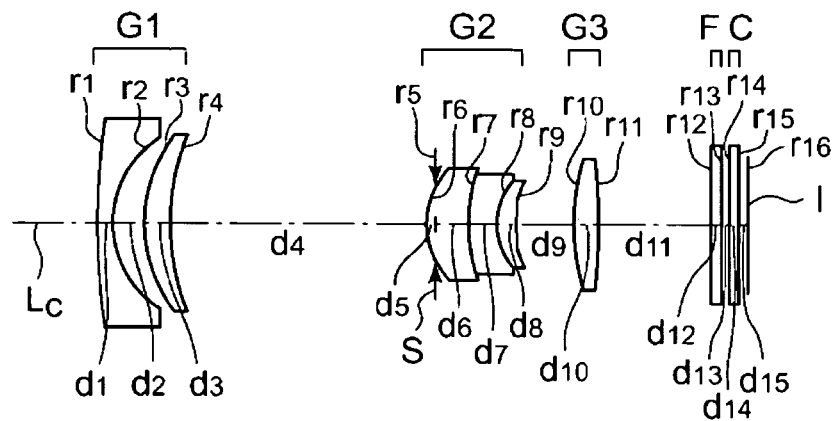
FIGS. 8A to 8C are sectional views in a wide-angle end (FIG. 8A), an intermediate state (FIG. 8B) and a telephoto end (FIG. 8C) of Example 8 of the zoom lens system of the present invention when focused on an infinite object.
Figure 8B:
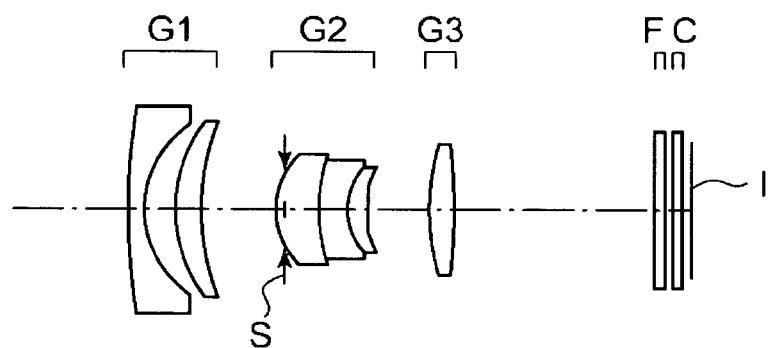
Figure 8C:
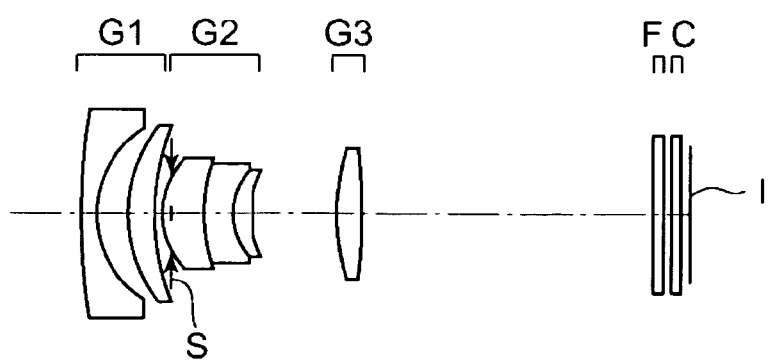

As shown in FIG. 8A, Example 8 is constituted of, in order from the object side, the first lens unit G1 having a negative refractive power, the aperture stop S, the second lens unit G2 having a positive refractive power and the third lens unit G3 having a positive refractive power. When magnification change is performed from the wide-angle end to the telephoto end, the first lens unit G1 moves along a locus of movement concave toward the object side, and is arranged closer to the image side in the telephoto end than in the wide-angle end. The aperture stop S and the second lens unit G2 integrally monotonously moves toward the object side while reducing the space between the second lens unit and the first lens unit G1. The third lens unit G3 moves toward the object side while enlarging the space between the third lens unit and the second lens unit G2.

The first lens unit G1 is constituted of, in order from the object side, a negative meniscus lens whose convex surface faces the object side and a positive meniscus lens whose convex surface faces the object side. The second lens unit G2 is constituted of a cemented triplet including, in order from the object side, a positive meniscus lens whose convex surface faces the object side, a negative meniscus lens whose convex surface faces the object side and a positive meniscus lens whose convex surface faces the object side. The third lens unit G3 is constituted of one double-convex positive lens. The aperture stop S is positioned on the image side of the vertex of the surface of the cemented triplet of the second lens unit G2 closest to the object side.

Aspherical surfaces are used on four surfaces including the image-side surface of the negative meniscus lens of the first lens unit G1; the surfaces of the cemented triplet of the second lens unit G2 closest to the object side and the image side; and an object-side surface of the double-convex positive lens of the third lens unit G3.

Figure 9A:
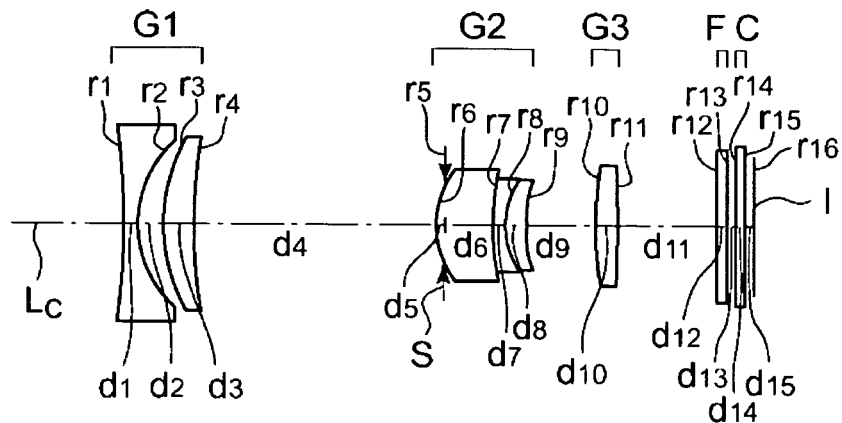
FIGS. 9A to 9C are sectional views in a wide-angle end (FIG. 9A), an intermediate state (FIG. 9B) and a telephoto end (FIG. 9C) of Example 9 of the zoom lens system of the present invention when focused on an infinite object.
Figure 9B:
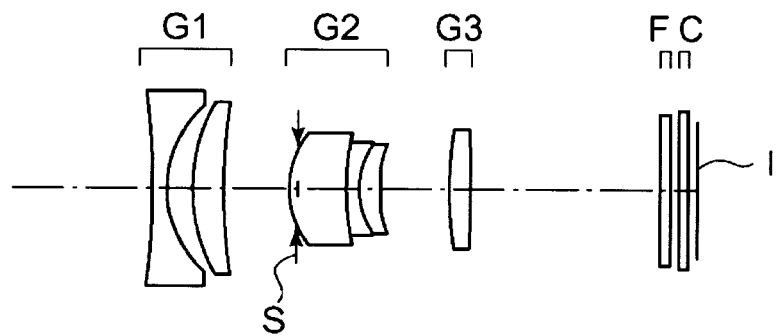
Figure 9C:
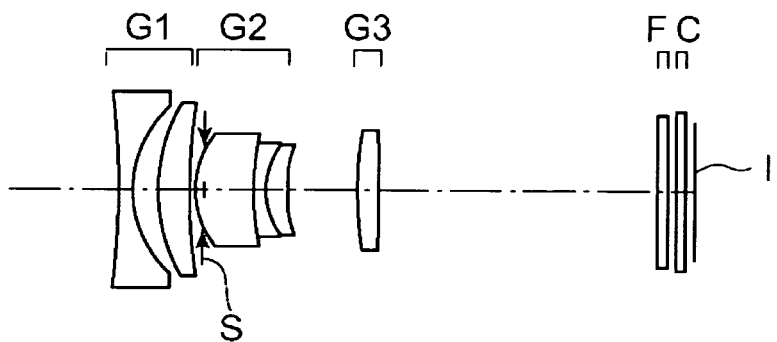

As shown in FIG. 9A, Example 9 is constituted of, in order from the object side, the first lens unit G1 having a negative refractive power, the aperture stop S, the second lens unit G2 having a positive refractive power and the third lens unit G3 having a positive refractive power. When magnification change is performed from the wide-angle end to the telephoto end, the first lens unit G1 moves along a locus of movement concave toward the object side, and is arranged closer to the image side in the telephoto end than in the wide-angle end. The aperture stop S and the second lens unit G2 integrally monotonously moves toward the object side while reducing the space between the second lens unit and the first lens unit G1. The third lens unit G3 moves toward the object side while enlarging the space between the third lens unit and the second lens unit G2.

The first lens unit G1 is constituted of, in order from the object side, a double-concave negative lens and a positive meniscus lens whose convex surface faces the object side. The second lens unit G2 is constituted of a cemented triplet including, in order from the object side, a positive meniscus lens whose convex surface faces the object side, a negative meniscus lens whose convex surface faces the object side and a positive meniscus lens whose convex surface faces the object side. The third lens unit G3 is constituted of one positive meniscus lens whose convex surface faces the object side. The aperture stop S is positioned on the image side of the vertex of the surface of the cemented triplet of the second lens unit G2 closest to the object side.

Aspherical surfaces are used on four surfaces including the image-side surface of the double-concave negative lens of the first lens unit G1; the surfaces of the cemented triplet of the second lens unit G2 closest to the object side and the image side; and the object-side surface of the positive meniscus lens of the third lens unit G3.

Figure 10A:
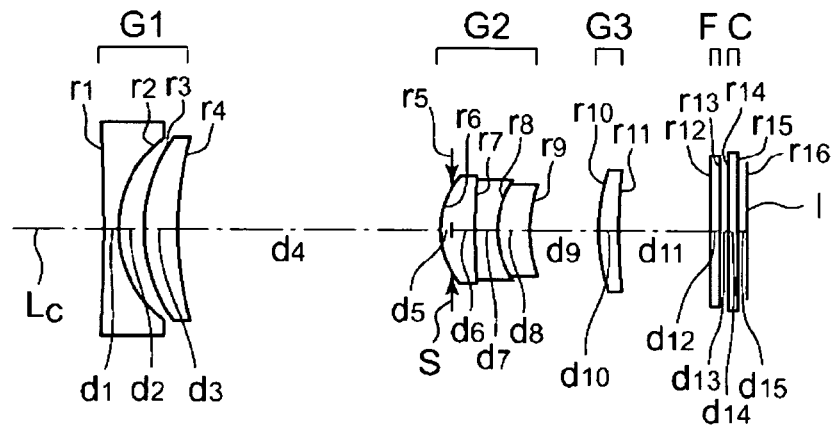
FIGS. 10A to 10C are sectional views in a wide-angle end (FIG. 10A), an intermediate state (FIG. 10B) and a telephoto end (FIG. 10C) of Example 10 of the zoom lens system of the present invention when focused on an infinite object.
Figure 10B:
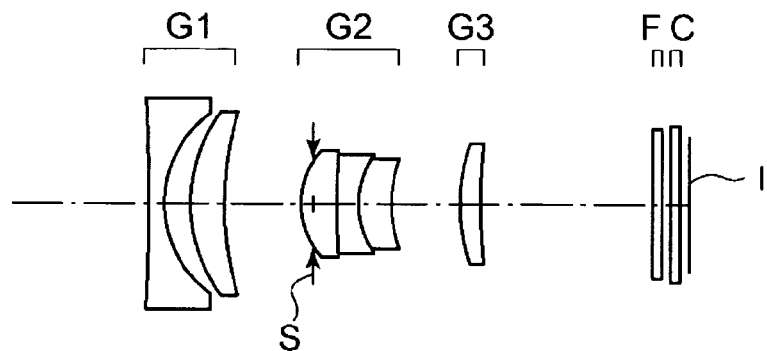
Figure 10C:
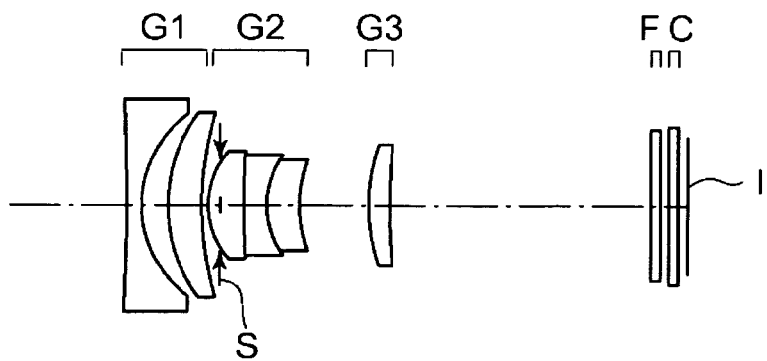

As shown in FIG. 10A, Example 10 is constituted of, in order from the object side, the first lens unit G1 having a negative refractive power, the aperture stop S, the second lens unit G2 having a positive refractive power and the third lens unit G3 having a positive refractive power. When magnification change is performed from the wide-angle end to the telephoto end, the first lens unit G1 moves along a locus of movement concave toward the object side, and is arranged closer to the image side in the telephoto end than in the wide-angle end. The aperture stop S and the second lens unit G2 integrally monotonously moves toward the object side while reducing the space between the second lens unit and the first lens unit G1. The third lens unit G3 moves toward the object side while enlarging the space between the third lens unit and the second lens unit G2.

The first lens unit G1 is constituted of, in order from the object side, a double-concave negative lens and a positive meniscus lens whose convex surface faces the object side. The second lens unit G2 is constituted of a cemented triplet including, in order from the object side, a positive meniscus lens whose convex surface faces the object side, a negative meniscus lens whose convex surface faces the object side and a positive meniscus lens whose convex surface faces the object side. The third lens unit G3 is constituted of one positive meniscus lens whose convex surface faces the object side. The aperture stop S is positioned on the image side of the vertex of the surface of the cemented triplet of the second lens unit G2 closest to the object side.

Aspherical surfaces are used on four surfaces including the image-side surface of the double-concave negative lens of the first lens unit G1; the surfaces of the cemented triplet of the second lens unit G2 closest to the object side and the image side; and the object-side surface of the positive meniscus lens of the third lens unit G3.

Figure 11A:
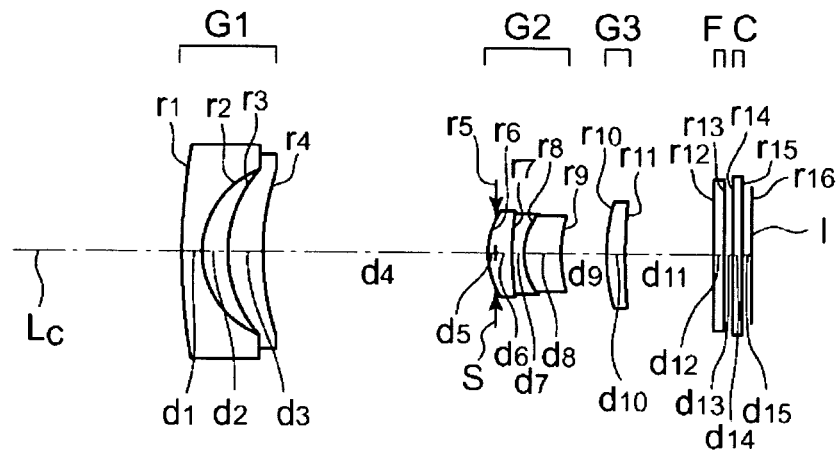
FIGS. 11A to 11C are sectional views in a wide-angle end (FIG. 11A), an intermediate state (FIG. 11B) and a telephoto end (FIG. 11C) of Example 11 of the zoom lens system of the present invention when focused on an infinite object.
Figure 11B:
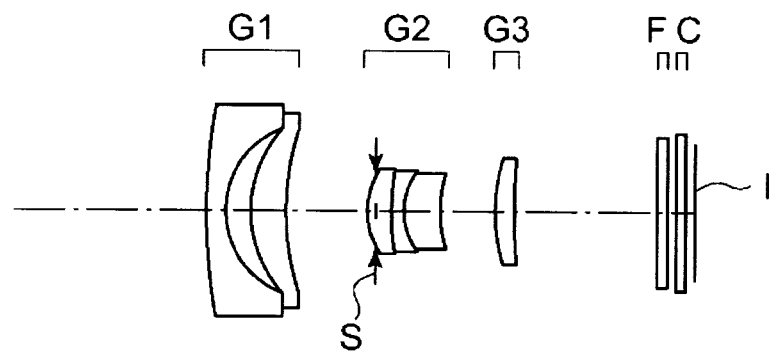
Figure 11C:
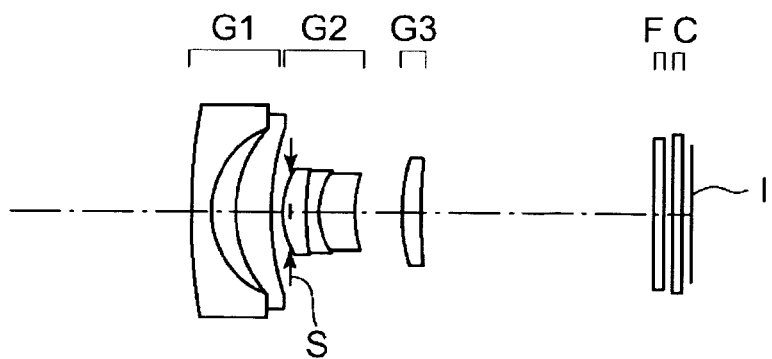

As shown in FIG. 11A, Example 11 is constituted of, in order from the object side, the first lens unit G1 having a negative refractive power, the aperture stop S, the second lens unit G2 having a positive refractive power and the third lens unit G3 having a positive refractive power. When magnification change is performed from the wide-angle end to the telephoto end, the first lens unit G1 moves along a locus of movement concave toward the object side. The first lens unit is arranged slightly closer to the object side in the telephoto end than in the intermediate state, and is arranged closer to the image side in the telephoto end than in the wide-angle end. The aperture stop S and the second lens unit G2 integrally monotonously moves toward the object side while reducing the space between the second lens unit and the first lens unit G1. The third lens unit G3 moves toward the object side while once enlarging the space between the third lens unit and the second lens unit G2.

The first lens unit G1 is constituted of, in order from the object side, a negative meniscus lens whose convex surface faces the object side and a positive meniscus lens whose convex surface faces the object side. The second lens unit G2 is constituted of a cemented triplet including, in order from the object side, a positive meniscus lens whose convex surface faces the object side, a negative meniscus lens whose convex surface faces the object side and a positive meniscus lens whose convex surface faces the object side. The third lens unit G3 is constituted of one double-convex positive lens. The aperture stop S is positioned on the image side of the vertex of the surface of the cemented triplet of the second lens unit G2 closest to the object side.

Aspherical surfaces are used on six surfaces including the image-side surface of the negative meniscus lens and the object-side surface of the positive meniscus lens of the first lens unit G1; the surfaces of the cemented triplet of the second lens unit G2 closest to the object side and the image side; and opposite surfaces of the double-convex positive lens of the third lens unit G3.

Figure 12A:
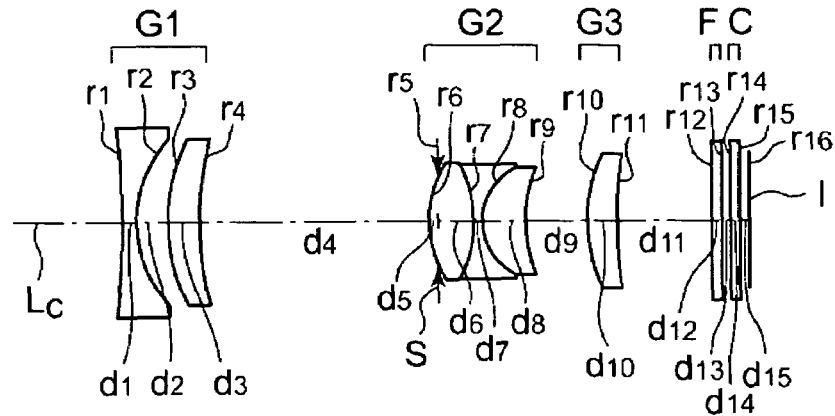
FIGS. 12A to 12C are sectional views in a wide-angle end (FIG. 12A), an intermediate state (FIG. 12B) and a telephoto end (FIG. 12C) of Example 12 of the zoom lens system of the present invention when focused on an infinite object.
Figure 12B:
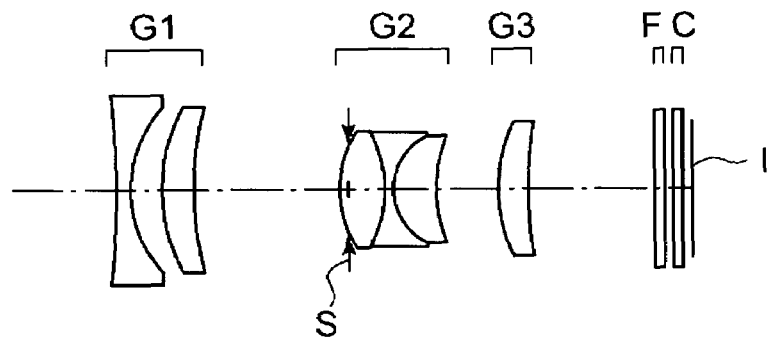
Figure 12C:
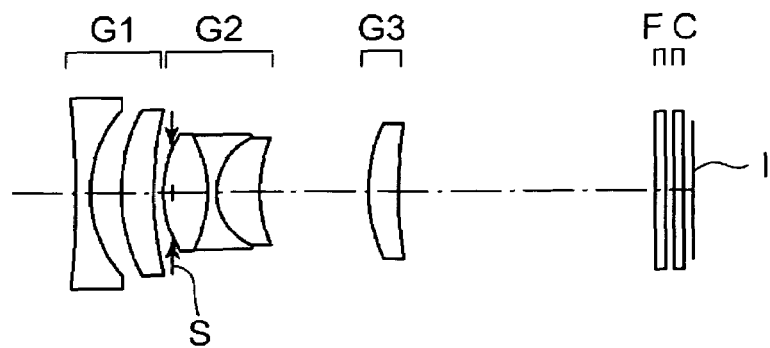

As shown in FIG. 12A, Example 12 is constituted of, in order from the object side, the first lens unit G1 having a negative refractive power, the aperture stop S, the second lens unit G2 having a positive refractive power and the third lens unit G3 having a positive refractive power. When magnification change is performed from the wide-angle end to the telephoto end, the first lens unit G1 moves along a locus of movement concave toward the object side. The first lens unit is arranged closer to the image side in the telephoto end than in the wide-angle end. The aperture stop S and the second lens unit G2 integrally monotonously moves toward the object side while reducing the space between the second lens unit and the first lens unit G1. The third lens unit G3 moves toward the object side while enlarging the space between the third lens unit and the second lens unit G2.

The first lens unit G1 is constituted of, in order from the object side, a double-concave negative lens and a positive meniscus lens whose convex surface faces the object side. The second lens unit G2 is constituted of a cemented triplet including a double-convex positive lens, a double-concave negative lens and a positive meniscus lens whose convex surface faces the object side. The third lens unit G3 is constituted of one positive meniscus lens whose convex surface faces the object side. The aperture stop S is positioned on the image side of the vertex of the surface of the cemented triplet of the second lens unit G2 closest to the object side.

Aspherical surfaces are used on three surfaces including the image-side surface of the double-concave negative lens of the first lens unit G1; and the surfaces of the cemented triplet of the second lens unit G2 closest to the object side and the image side.

Figure 13A:
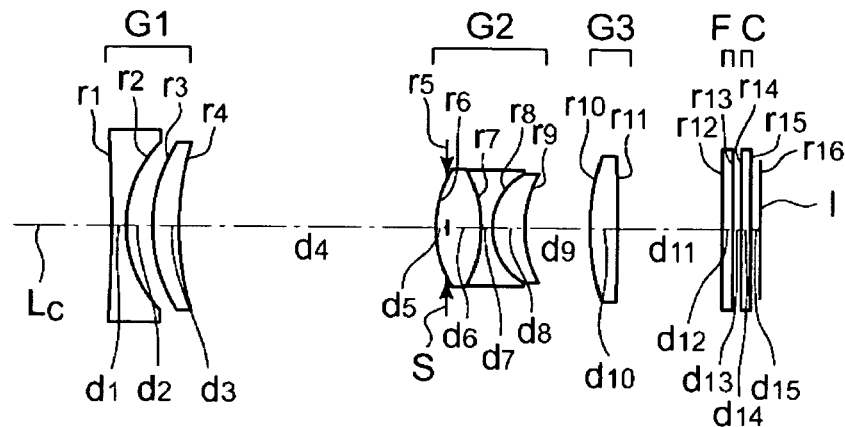
FIGS. 13A to 13C are sectional views in a wide-angle end (FIG. 13A), an intermediate state (FIG. 13B) and a telephoto end (FIG. 13C) of Example 13 of the zoom lens system of the present invention when focused on an infinite object.
Figure 13B:
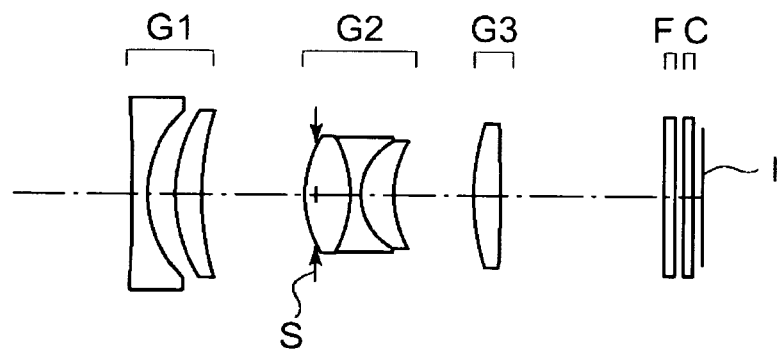
Figure 13C:
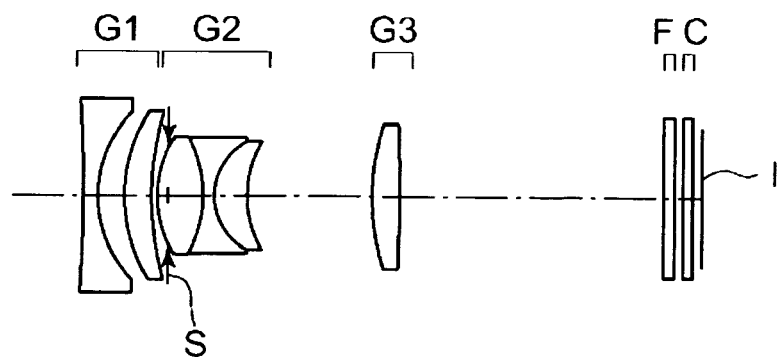

As shown in FIG. 13A, Example 13 is constituted of, in order from the object side, the first lens unit G1 having a negative refractive power, the aperture stop S, the second lens unit G2 having a positive refractive power and the third lens unit G3 having a positive refractive power. When magnification change is performed from the wide-angle end to the telephoto end, the first lens unit G1 moves along a locus of movement concave toward the object side. The first lens unit is arranged closer to the image side in the telephoto end than in the wide-angle end. The aperture stop S and the second lens unit G2 integrally monotonously moves toward the object side while reducing the space between the second lens unit and the first lens unit G1. The third lens unit G3 moves toward the object side while enlarging the space between the third lens unit and the second lens unit G2.

The first lens unit G1 is constituted of, in order from the object side, a double-concave negative lens and a positive meniscus lens whose convex surface faces the object side. The second lens unit G2 is constituted of a cemented triplet including a double-convex positive lens, a double-concave negative lens and a positive meniscus lens whose convex surface faces the object side. The third lens unit G3 is constituted of one positive meniscus lens whose convex surface faces the object side. The aperture stop S is positioned on the image side of the vertex of the surface of the cemented triplet of the second lens unit G2 closest to the object side.

Aspherical surfaces are used on three surfaces including the image-side surface of the double-concave negative lens of the first lens unit G1; and the surfaces of the cemented triplet of the second lens unit G2 closest to the object side and the image side.

Figure 14A:
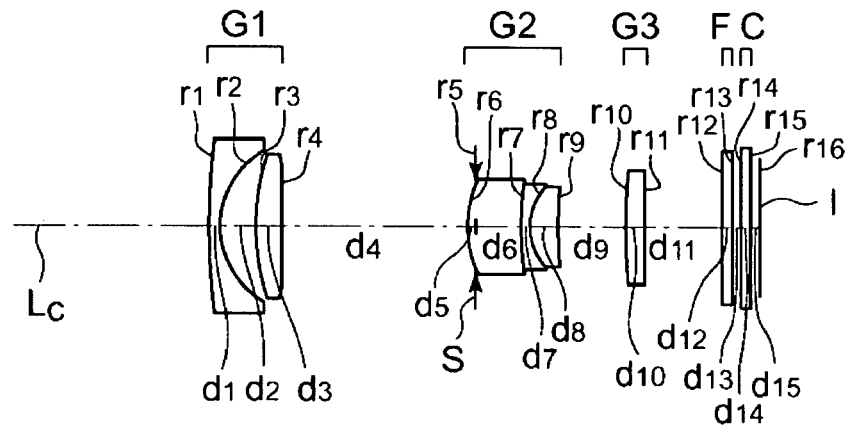
FIGS. 14A to 14C are sectional views in a wide-angle end (FIG. 14A), an intermediate state (FIG. 14B) and a telephoto end (FIG. 14C) of Example 14 of the zoom lens system of the present invention when focused on an infinite object.
Figure 14B:
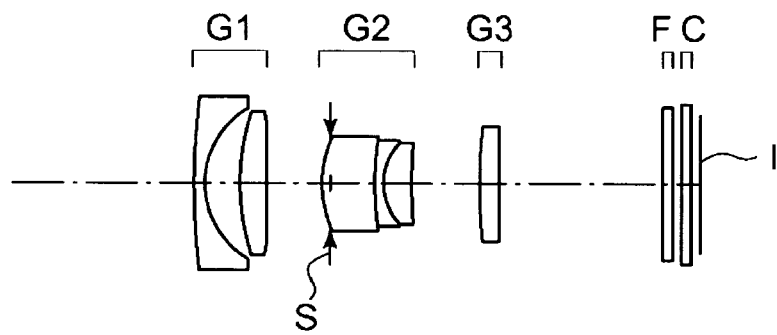
Figure 14C:
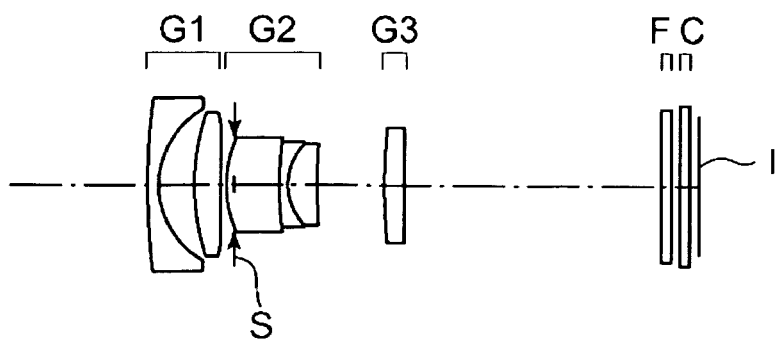

As shown in FIG. 14A, Example 14 is constituted of, in order from the object side, the first lens unit G1 having a negative refractive power, the aperture stop S, the second lens unit G2 having a positive refractive power and the third lens unit G3 having a positive refractive power. When magnification change is performed from the wide-angle end to the telephoto end, the first lens unit G1 moves along a locus of movement concave toward the object side. The second lens unit is arranged closer to the image side in the telephoto end than in the wide-angle end. The aperture stop S and the second lens unit G2 integrally monotonously moves toward the object side while reducing the space between the second lens unit and the first lens unit G1. The third lens unit G3 moves toward the object side while once enlarging the space between the third lens unit and the second lens unit G2 and then slightly reducing the space.

The first lens unit G1 is constituted of, in order from the object side, a negative meniscus lens whose convex surface faces the object side and a positive meniscus lens whose convex surface faces the object side. The second lens unit G2 is constituted of a cemented triplet including a positive meniscus lens whose convex surface faces the object side, a negative meniscus lens whose convex surface faces the object side and a double-convex positive lens. The third lens unit G3 is constituted of one positive meniscus lens whose convex surface faces the object side. The aperture stop S is positioned on the image side of the vertex of the surface of the cemented triplet of the second lens unit G2 closest to the object side.

Aspherical surfaces are used on four surfaces including opposite surfaces of the positive meniscus lens of the first lens unit G1; and the surfaces of the cemented triplet of the second lens unit G2 closest to the object side and the image side.

Figure 15A:
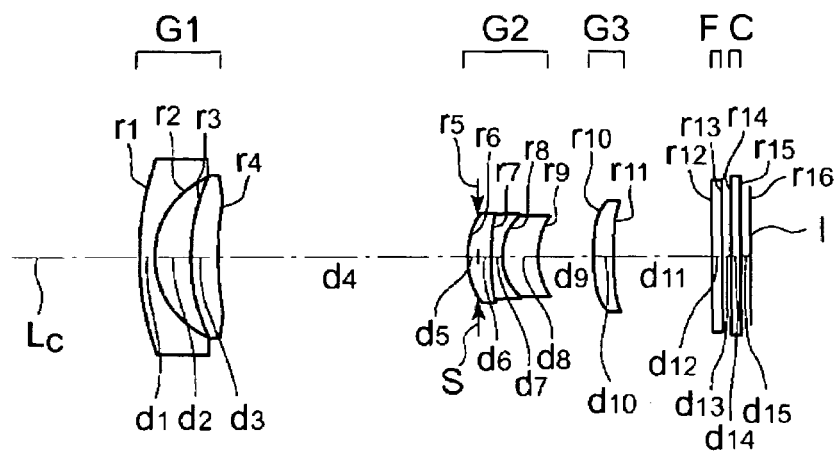
FIGS. 15A to 15C are sectional views in a wide-angle end (FIG. 15A), an intermediate state (FIG. 15B) and a telephoto end (FIG. 15C) of Example 15 of the zoom lens system of the present invention when focused on an infinite object.
Figure 15B:
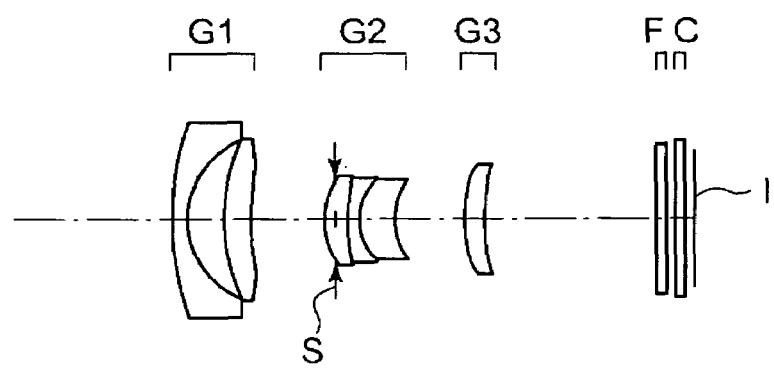
Figure 15C:
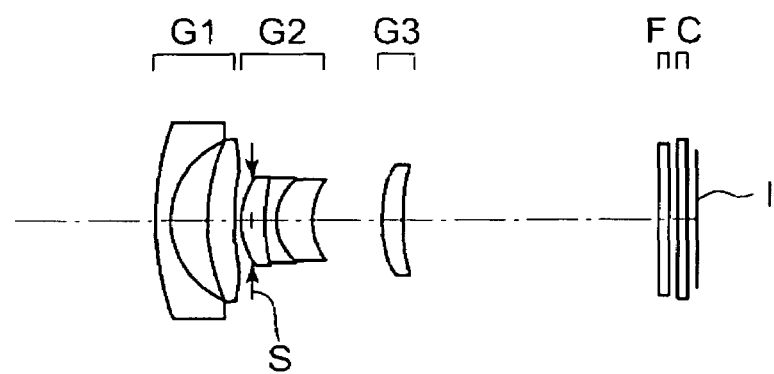

As shown in FIG. 15A, Example 15 is constituted of, in order from the object side, the first lens unit G1 having a negative refractive power, the aperture stop S, the second lens unit G2 having a positive refractive power and the third lens unit G3 having a positive refractive power. When magnification change is performed from the wide-angle end to the telephoto end, the first lens unit G1 moves along a locus of movement concave toward the object side. The first lens unit is arranged slightly closer to the object side in the telephoto end than in the intermediate state, and is arranged closer to an image side in the telephoto end than in the wide-angle end. The aperture stop S and the second lens unit G2 integrally monotonously moves toward the object side while reducing the space between the second lens unit and the first lens unit G1. The third lens unit G3 moves toward the object side while once enlarging the space between the third lens unit and the second lens unit G2.

The first lens unit G1 is constituted of, in order from the object side, a negative meniscus lens whose convex surface faces the object side and a positive meniscus lens whose convex surface faces the object side. The second lens unit G2 is constituted of a cemented triplet including a positive meniscus lens whose convex surface faces the object side, a negative meniscus lens whose convex surface faces the object side and a positive meniscus lens whose convex surface faces the object side. The third lens unit G3 is constituted of one positive meniscus lens whose convex surface faces the object side. The aperture stop S is positioned on the image side of the vertex of the surface of the cemented triplet of the second lens unit G2 closest to the object side.

Aspherical surfaces are used on six surfaces including opposite surfaces of the positive meniscus lens of the first lens unit G1; the surfaces of the cemented triplet of the second lens unit G2 closest to the object side and the image side; and opposite surfaces of the positive meniscus lens of the third lens unit G3.

Figure 16A:
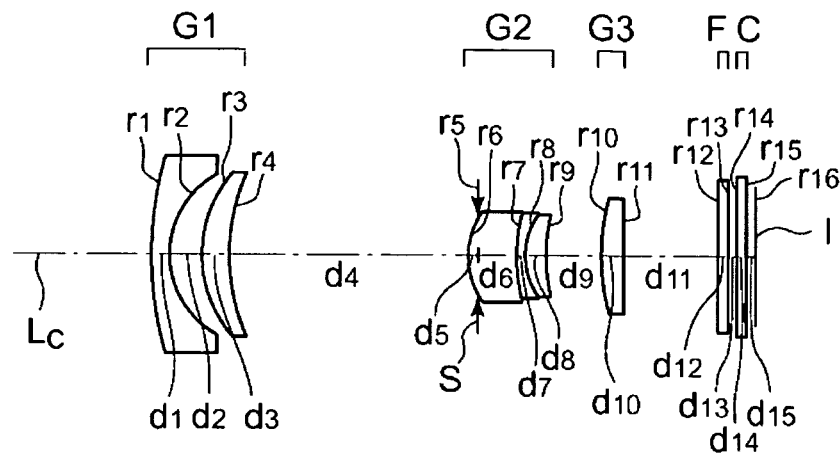
FIGS. 16A to 16C are sectional views in a wide-angle end (FIG. 16A), an intermediate state (FIG. 16B) and a telephoto end (FIG. 16C) of Example 16 of the zoom lens system of the present invention when focused on an infinite object.
Figure 16B:
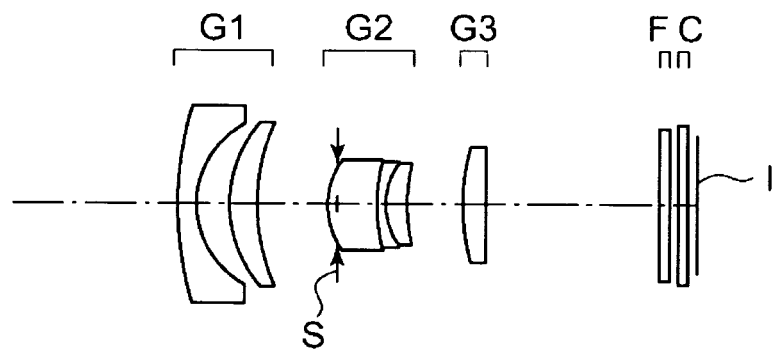
Figure 16C:
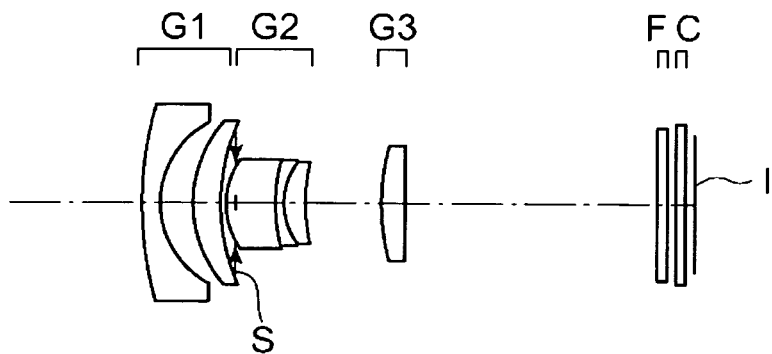

As shown in FIG. 16A, Example 16 is constituted of, in order from the object side, the first lens unit G1 having a negative refractive power, the aperture stop S, the second lens unit G2 having a positive refractive power and the third lens unit G3 having a positive refractive power. When magnification change is performed from the wide-angle end to the telephoto end, the first lens unit G1 moves along a locus of movement concave toward the object side, and is arranged closer to the image side in the telephoto end than in the wide-angle end. The aperture stop S and the second lens unit G2 integrally monotonously moves toward the object side while reducing the space between the second lens unit and the first lens unit G1. The third lens unit G3 moves toward the object side while once reducing the space between the third lens unit and the second lens unit G2 and then enlarging the space.

The first lens unit G1 is constituted of, in order from the object side, a negative meniscus lens whose convex surface faces the object side and a positive meniscus lens whose convex surface faces the object side. The second lens unit G2 is constituted of a cemented triplet including a positive meniscus lens whose convex surface faces the object side, a negative meniscus lens whose convex surface faces the object side and a positive meniscus lens whose convex surface faces the object side. The third lens unit G3 is constituted of one positive meniscus lens whose convex surface faces the object side. The aperture stop S is positioned on the image side of the vertex of the surface of the cemented triplet of the second lens unit G2 closest to the object side.

Aspherical surfaces are used on four surfaces including the image-side surface of the negative meniscus lens of the first lens unit G1; the surfaces of the cemented triplet of the second lens unit G2 closest to the object side and the image side; and the object-side surface of the positive meniscus lens of the third lens unit G3.

Figure 17A:
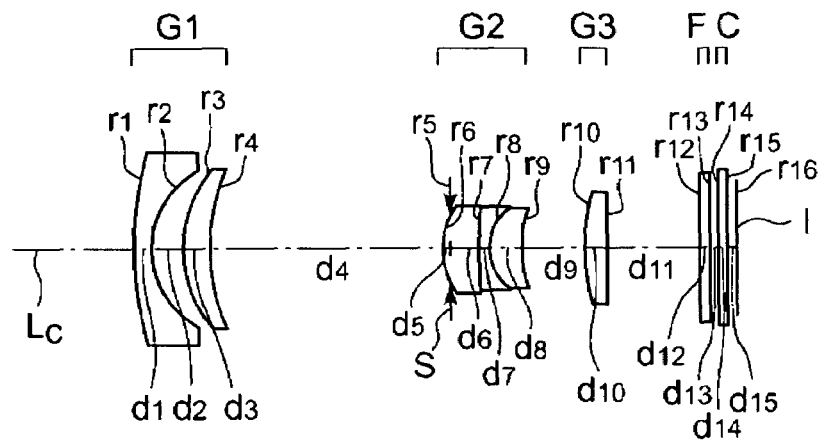
FIGS. 17A to 17C are sectional view in the wide-angle end (FIG. 17A), the intermediate state (FIG. 17B) and the telephoto end (FIG. 17C) of Example 17 of the zoom lens system of the present invention when focused on an infinite object.
Figure 17B:
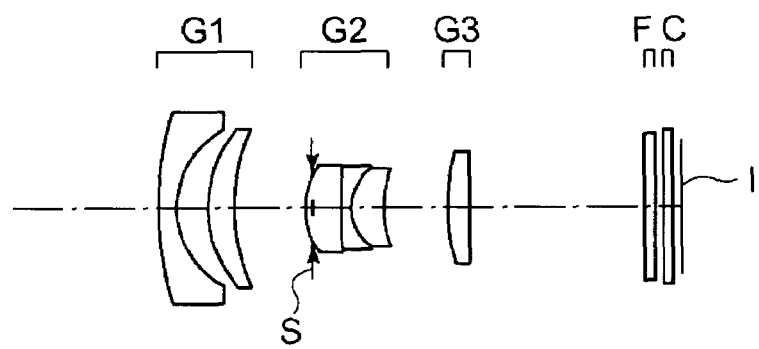
Figure 17C:
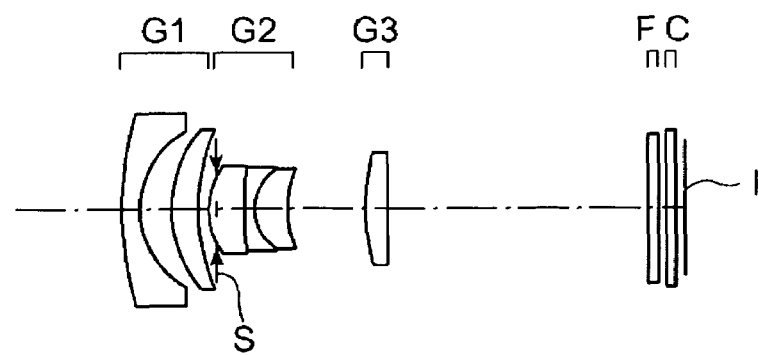

As shown in FIG. 17A, Example 17 is constituted of, in order from the object side, the first lens unit G1 having a negative refractive power, the aperture stop S, the second lens unit G2 having a positive refractive power and the third lens unit G3 having a positive refractive power. When magnification change is performed from the wide-angle end to the telephoto end, the first lens unit G1 moves along a locus of movement concave toward the object side, and is arranged closer to the image side in the telephoto end than in the wide-angle end. The aperture stop S and the second lens unit G2 integrally monotonously moves toward the object side while reducing the space between the second lens unit and the first lens unit G1. The third lens unit G3 moves toward the object side while enlarging the space between the third lens unit and the second lens unit G2.

The first lens unit G1 is constituted of, in order from the object side, a negative meniscus lens whose convex surface faces the object side and a positive meniscus lens whose convex surface faces the object side. The second lens unit G2 is constituted of a cemented triplet including a positive meniscus lens whose convex surface faces the object side, a negative meniscus lens whose convex surface faces the object side and a positive meniscus lens whose convex surface faces the object side. The third lens unit G3 is constituted of one positive meniscus lens whose convex surface faces the object side. The aperture stop S is positioned on the image side of the vertex of the surface of the cemented triplet of the second lens unit G2 closest to the object side.

Aspherical surfaces are used on four surfaces including the image-side surface of the negative meniscus lens of the first lens unit G1; the surfaces of the cemented triplet of the second lens unit G2 closest to the object side and the image side; and the object-side surface of the positive meniscus lens of the third lens unit G3.

There will be described hereinafter numerical data of the above examples. In addition to the above-described symbols, f is a focal length of the zoom lens system, $F_{NO}$ is the F-number, WE is the wide-angle end, ST is the intermediate state, TE is the telephoto end, $r_1, r_2 \ldots$ are paraxial radii of curvature of the lens surfaces, $d_1, d_2 \ldots$ are spaces between the lens surfaces, $n_{d1}, n_{d2} \ldots$ are refractive indices for the d-line of the lenses, and $V_{d1}, V_{d2} \ldots$ are Abbe numbers of the lenses. After the data of the paraxial radius of curvature, (AS) indicates that the surface is an aspherical surface and (S) indicates the surface is an aperture stop. It is to be noted that an aspherical shape is represented by the following equation in a coordinate system in which the intersection of the aspherical surface and the optical axis is set as an origin, the optical axis is set as an x-axis whose positive direction is coincide with the light traveling direction, and an arbitrary axis which passes the origin and is perpendicular to the x-axis is set as a y-axis:

$$x=(y^2/r)/[1+\{1-(K+1)(y/r)^2\}^{1/2}]+A_4 y^4+A_6 y^6+A_8 y^8+A_{10} y^{10}+A_{12} y^{12}$$

wherein r is a paraxial radius of curvature, K is a conic constant, and $A_4, A_6, A_8, A_{10}$ and $A_{12}$ are 4th-order, 6th-order, 8th-order, 10th-order and 12th-order aspherical coefficients.

Numerical Example 1

| | | | |
|---|---|---|---|
| $r_1 = 51.789$ | $d_1 = 0.70$ | $n_{d1} = 1.88300$ | $V_{d1} = 40.76$ |
| $r_2 = 5.837$ | $d_2 = 1.71$ | | |
| $r_3 = 13.554(AS)$ | $d_3 = 1.47$ | $n_{d2} = 1.82114$ | $V_{d2} = 24.06$ |
| $r_4 = 75.183(AS)$ | $d_4$ = variable | | |
| $r_5 = \infty(S)$ | $d_5 = -0.72$ | | |
| $r_6 = 3.826(AS)$ | $d_6 = 3.00$ | $n_{d3} = 1.49700$ | $V_{d3} = 81.54$ |
| $r_7 = -19.669$ | $d_7 = 0.50$ | $n_{d4} = 1.92286$ | $V_{d4} = 18.90$ |
| $r_8 = -133.221$ | $d_8 = 1.09$ | $n_{d5} = 1.69350$ | $V_{d5} = 53.21$ |
| $r_9 = -23.946(AS)$ | $d_9$ = variable | | |
| $r_{10} = -68.471(AS)$ | $d_{10} = 0.80$ | $n_{d6} = 1.52542$ | $V_{d6} = 55.78$ |
| $r_{11} = 7.284(AS)$ | $d_{11}$ = variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.05$ | $n_{d8} = 1.51633$ | $V_{d8} = 64.14$ |
| $r_{15} = \infty$ | $d_{15} = 0.41$ | | |
| $r_{16} = \infty$ (image surface) | | | |

Aspherical Surface Coefficient

TABLE 1-1

| | 3rd surface | 4th surface | 6th surface | 9th surface |
|---|---|---|---|---|
| K | 0.000 | 0.000 | 0.000 | 0.000 |
| $A_4$ | $-2.90406 \times 10^{-4}$ | $-6.25636 \times 10^{-4}$ | $-3.84634 \times 10^{-4}$ | $3.29823 \times 10^{-3}$ |
| $A_6$ | $-2.19067 \times 10^{-5}$ | $-1.55735 \times 10^{-5}$ | $-1.86499 \times 10^{-5}$ | $2.17032 \times 10^{-4}$ |
| $A_8$ | $1.93834 \times 10^{-6}$ | $1.40541 \times 10^{-6}$ | $9.97230 \times 10^{-6}$ | $-1.07505 \times 10^{-5}$ |
| $A_{10}$ | $-3.55926 \times 10^{-8}$ | $-3.74784 \times 10^{-8}$ | $-5.98509 \times 10^{-7}$ | $8.77866 \times 10^{-6}$ |

TABLE 1-2

| | 10th surface | 11th surface |
|---|---|---|
| K | 0.000 | 0.000 |
| $A_4$ | $9.19324 \times 10^{-4}$ | $1.04459 \times 10^{-3}$ |
| $A_6$ | $-7.15668 \times 10^{-4}$ | $-5.99256 \times 10^{-4}$ |
| $A_8$ | $2.38646 \times 10^{-4}$ | $2.45269 \times 10^{-4}$ |
| $A_{10}$ | $-2.14848 \times 10^{-5}$ | $-2.50329 \times 10^{-5}$ |

Zoom Data ($\infty$)

TABLE 2

| | WE | ST | TE |
|---|---|---|---|
| f(mm) | 6.795 | 11.618 | 19.666 |
| $F_{NO}$ | 3.43 | 4.34 | 5.81 |
| $d_4$ | 14.53 | 6.17 | 1.12 |
| $d_9$ | 1.97 | 2.41 | 3.21 |
| $d_{11}$ | 5.80 | 8.08 | 11.34 |

Numerical Example 2

| | | | |
|---|---|---|---|
| $r_1 = -68.489$ | $d_1 = 1.00$ | $n_{d1} = 1.80610$ | $V_{d1} = 40.92$ |
| $r_2 = 4.409(AS)$ | $d_2 = 1.19$ | | |
| $r_3 = 8.039$ | $d_3 = 1.67$ | $n_{d2} = 2.00069$ | $V_{d2} = 25.46$ |
| $r_4 = 23.572$ | $d_4$ = variable | | |
| $r_5 = \infty(S)$ | $d_5 = -0.50$ | | |
| $r_6 = 3.689(AS)$ | $d_6 = 3.79$ | $n_{d3} = 1.49700$ | $V_{d3} = 81.54$ |
| $r_7 = -10.025$ | $d_7 = 1.00$ | $n_{d4} = 1.84666$ | $V_{d4} = 23.78$ |
| $r_8 = -28.095(AS)$ | $d_8$ = variable | | |
| $r_9 = -4.148$ | $d_9 = 0.80$ | $n_{d5} = 1.88300$ | $V_{d5} = 40.76$ |
| $r_{10} = -5.287$ | $d_{10}$ = variable | | |
| $r_{11} = \infty$ | $d_{11} = 0.50$ | $n_{d6} = 1.51633$ | $V_{d6} = 64.14$ |
| $r_{12} = \infty$ | $d_{12} = 0.50$ | | |
| $r_{13} = \infty$ | $d_{13} = 0.50$ | $n_{d7} = 1.51633$ | $V_{d7} = 64.14$ |
| $r_{14} = \infty$ | $d_{14} = 0.59$ | | |
| $r_{15} = \infty$ (image surface) | | | |

Aspherical Surface Coefficient

TABLE 3

| | 2nd surface | 6th surface | 8th surface |
|---|---|---|---|
| K | $-0.549$ | $-0.795$ | 0.000 |
| $A_4$ | $-1.09327 \times 10^{-4}$ | $1.48463 \times 10^{-3}$ | $2.40186 \times 10^{-3}$ |
| $A_6$ | $-1.43880 \times 10^{-5}$ | $3.05264 \times 10^{-5}$ | $2.76882 \times 10^{-4}$ |
| $A_8$ | $1.34815 \times 10^{-7}$ | $1.15726 \times 10^{-5}$ | $-3.25134 \times 10^{-5}$ |
| $A_{10}$ | $-5.73863 \times 10^{-9}$ | $-1.32653 \times 10^{-7}$ | $9.56196 \times 10^{-6}$ |

Zoom Data ($\infty$)

TABLE 4

| | WE | ST | TE |
|---|---|---|---|
| f(mm) | 6.276 | 10.701 | 18.198 |
| $F_{NO}$ | 3.25 | 4.16 | 5.74 |
| $d_4$ | 11.19 | 4.99 | 1.50 |
| $d_8$ | 3.56 | 4.37 | 4.93 |
| $d_{10}$ | 4.21 | 6.63 | 11.70 |

Numerical Example 3

| | | | |
|---|---|---|---|
| $r_1 = 14898.846$ | $d_1 = 1.00$ | $n_{d1} = 1.88300$ | $V_{d1} = 40.76$ |
| $r_2 = 6.423(AS)$ | $d_2 = 2.11$ | | |
| $r_3 = 10.315$ | $d_3 = 1.30$ | $n_{d2} = 1.92286$ | $V_{d2} = 20.88$ |
| $r_4 = 20.902$ | $d_4$ = variable | | |
| $r_5 = \infty(S)$ | $d_5 = 0.00$ | | |
| $r_6 = 4.307(AS)$ | $d_6 = 3.06$ | $n_{d3} = 1.49700$ | $V_{d3} = 81.54$ |
| $r_7 = -7.020$ | $d_7 = 0.50$ | $n_{d4} = 1.67270$ | $V_{d4} = 32.10$ |
| $r_8 = -100.000$ | $d_8 = 1.27$ | $n_{d5} = 1.58913$ | $V_{d5} = 61.14$ |
| $r_9 = -15.900(AS)$ | $d_9$ = variable | | |
| $r_{10} = -20.236(AS)$ | $d_{10} = 1.00$ | $n_{d6} = 1.69350$ | $V_{d6} = 53.21$ |
| $r_{11} = 20.000(AS)$ | $d_{11}$ = variable | | |
| $r_{12} = \infty$ | $d_{12} = 0.91$ | $n_{d7} = 1.53996$ | $V_{d7} = 59.45$ |
| $r_{13} = \infty$ | $d_{13} = 0.28$ | | |
| $r_{14} = \infty$ | $d_{14} = 0.53$ | $n_{d8} = 1.51633$ | $V_{d8} = 64.14$ |
| $r_{15} = \infty$ | $d_{15} = 0.59$ | | |
| $r_{16} = \infty$ (image surface) | | | |

Aspherical Surface Coefficient

TABLE 5-1

|   | 2nd surface | 6th surface | 9th surface | 10th surface |
|---|---|---|---|---|
| K | 0.000 | 0.000 | 0.000 | −309.655 |
| $A_4$ | $-2.21409 \times 10^{-4}$ | $-5.81631 \times 10^{-4}$ | $1.51118 \times 10^{-3}$ | $-1.11996 \times 10^{-2}$ |
| $A_6$ | $1.77359 \times 10^{-6}$ | $7.05939 \times 10^{-6}$ | $1.78503 \times 10^{-4}$ | $1.06613 \times 10^{-3}$ |
| $A_8$ | $-8.59542 \times 10^{-7}$ | $7.18180 \times 10^{-7}$ | $-1.96850 \times 10^{-5}$ | $-1.64863 \times 10^{-4}$ |
| $A_{10}$ | $2.17513 \times 10^{-8}$ | $7.05689 \times 10^{-8}$ | $2.82432 \times 10^{-6}$ | $1.16951 \times 10^{-5}$ |

TABLE 5-2

|   | 11th surface |
|---|---|
| K | 0.000 |
| $A_4$ | $-5.95012 \times 10^{-3}$ |
| $A_6$ | $2.46173 \times 10^{-4}$ |
| $A_8$ | $-1.14677 \times 10^{-5}$ |
| $A_{10}$ | $1.07814 \times 10^{-6}$ |

Zoom Data (∞)

TABLE 6

|   | WE | ST | TE |
|---|---|---|---|
| f(mm) | 6.810 | 11.619 | 19.820 |
| $F_{NO}$ | 2.85 | 3.78 | 5.37 |
| $d_4$ | 10.21 | 4.20 | 0.66 |
| $d_9$ | 5.91 | 5.95 | 6.02 |
| $d_{11}$ | 1.41 | 4.34 | 9.31 |

Numerical Example 4

| | | | |
|---|---|---|---|
| $r_1 = -31.828$ | $d_1 = 0.70$ | $n_{d1} = 1.88300$ | $V_{d1} = 40.76$ |
| $r_2 = 7.165$ | $d_2 = 0.78$ | | |
| $r_3 = 9.148(AS)$ | $d_3 = 1.52$ | $n_{d2} = 1.84666$ | $V_{d2} = 23.78$ |
| $r_4 = 33.352$ | $d_4 = $ variable | | |
| $r_5 = \infty(S)$ | $d_5 = -0.18$ | | |
| $r_6 = 4.692(AS)$ | $d_6 = 1.67$ | $n_{d3} = 1.67790$ | $V_{d3} = 55.34$ |
| $r_7 = -12.027$ | $d_7 = 0.50$ | $n_{d4} = 2.00069$ | $V_{d4} = 25.46$ |
| $r_8 = 77.997$ | $d_8 = 2.59$ | $n_{d5} = 1.58313$ | $V_{d5} = 59.38$ |
| $r_9 = -55.116(AS)$ | $d_9 = $ variable | | |
| $r_{10} = -30.436(AS)$ | $d_{10} = 0.80$ | $n_{d6} = 1.50913$ | $V_{d6} = 56.20$ |
| $r_{11} = 23.726(AS)$ | $d_{11} = $ variable | | |
| $r_{12} = \infty$ | $d_{12} = 0.84$ | $n_{d7} = 1.53996$ | $V_{d7} = 59.45$ |
| $r_{13} = \infty$ | $d_{13} = 0.26$ | | |
| $r_{14} = \infty$ | $d_{14} = 0.49$ | $n_{d8} = 1.51633$ | $V_{d8} = 64.14$ |
| $r_{15} = \infty$ | $d_{15} = 0.59$ | | |
| $r_{16} = \infty$ (image surface) | | | |

Aspherical Surface Coefficient

TABLE 7-1

|   | 3rd surface | 6th surface | 9th surface | 10th surface |
|---|---|---|---|---|
| K | 0.000 | 0.000 | 0.000 | 0.000 |
| $A_4$ | $1.15680 \times 10^{-4}$ | $-1.51567 \times 10^{-4}$ | $2.49728 \times 10^{-3}$ | $-5.74352 \times 10^{-3}$ |
| $A_6$ | $-1.45503 \times 10^{-5}$ | $5.06933 \times 10^{-5}$ | $2.38997 \times 10^{-4}$ | $-5.59898 \times 10^{-4}$ |
| $A_8$ | $1.52852 \times 10^{-6}$ | $-3.20524 \times 10^{-6}$ | $-1.91765 \times 10^{-5}$ | $1.35762 \times 10^{-4}$ |
| $A_{10}$ | $-4.11662 \times 10^{-8}$ | $3.54327 \times 10^{-7}$ | $5.71179 \times 10^{-6}$ | $-3.60148 \times 10^{-6}$ |

TABLE 7-2

|   | 11th surface |
|---|---|
| K | 0.000 |
| $A_4$ | $-5.41979 \times 10^{-3}$ |
| $A_6$ | $-2.65317 \times 10^{-4}$ |
| $A_8$ | $7.68566 \times 10^{-5}$ |
| $A_{10}$ | $-1.65036 \times 10^{-6}$ |

Zoom Data (∞)

TABLE 8

|   | WE | ST | TE |
|---|---|---|---|
| f(mm) | 6.809 | 11.596 | 19.747 |
| $F_{NO}$ | 3.34 | 4.26 | 5.90 |
| $d_4$ | 10.75 | 4.21 | 0.58 |
| $d_9$ | 5.22 | 5.97 | 6.26 |
| $d_{11}$ | 1.86 | 3.91 | 8.41 |

Numerical Example 5

| | | | |
|---|---|---|---|
| $r_1 = -123.809$ | $d_1 = 0.70$ | $n_{d1} = 1.88300$ | $V_{d1} = 40.76$ |
| $r_2 = 6.941$ | $d_2 = 0.99$ | | |
| $r_3 = 9.801(AS)$ | $d_3 = 1.63$ | $n_{d2} = 1.84666$ | $V_{d2} = 23.78$ |
| $r_4 = 29.771(AS)$ | $d_4 = $ variable | | |
| $r_5 = \infty(S)$ | $d_5 = -0.52$ | | |
| $r_6 = 3.591(AS)$ | $d_6 = 1.97$ | $n_{d3} = 1.49700$ | $V_{d3} = 81.54$ |
| $r_7 = -23.495$ | $d_7 = 0.50$ | $n_{d4} = 1.92286$ | $V_{d4} = 18.90$ |
| $r_8 = -93.239$ | $d_8 = 1.79$ | $n_{d5} = 1.51633$ | $V_{d5} = 64.14$ |
| $r_9 = -160.642(AS)$ | $d_9 = $ variable | | |
| $r_{10} = -16.790(AS)$ | $d_{10} = 0.80$ | $n_{d6} = 1.50913$ | $V_{d6} = 56.20$ |
| $r_{11} = 22.686(AS)$ | $d_{11} = $ variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.40$ | | |
| $r_{16} = \infty$ (image surface) | | | |

Aspherical Surface Coefficient

TABLE 9-1

|   | 3rd surface | 4th surface | 6th surface | 9th surface |
|---|---|---|---|---|
| K | 0.000 | 0.000 | 0.000 | 0.000 |
| $A_4$ | $-2.75036 \times 10^{-4}$ | $-3.71542 \times 10^{-4}$ | $-4.17928 \times 10^{-4}$ | $4.85479 \times 10^{-3}$ |
| $A_6$ | $-3.07840 \times 10^{-5}$ | $-3.43210 \times 10^{-5}$ | $2.46517 \times 10^{-5}$ | $4.60043 \times 10^{-4}$ |
| $A_8$ | $1.58082 \times 10^{-6}$ | $2.04735 \times 10^{-6}$ | $2.80412 \times 10^{-6}$ | $-8.22251 \times 10^{-6}$ |
| $A_{10}$ | $-3.29070 \times 10^{-8}$ | $-5.01217 \times 10^{-8}$ | $-3.23125 \times 10^{-7}$ | $1.98515 \times 10^{-5}$ |

TABLE 9-2

|   | 10th surface | 11th surface |
|---|---|---|
| K | 0.000 | 0.000 |
| $A_4$ | $-2.47640 \times 10^{-3}$ | $-1.93357 \times 10^{-3}$ |
| $A_6$ | $-2.34974 \times 10^{-4}$ | $-1.52885 \times 10^{-4}$ |
| $A_8$ | $1.88850 \times 10^{-4}$ | $1.29934 \times 10^{-4}$ |
| $A_{10}$ | $-1.61128 \times 10^{-5}$ | $-1.10625 \times 10^{-5}$ |

Zoom Data ($\infty$)

TABLE 10

|   | WE | ST | TE |
|---|---|---|---|
| f(mm) | 6.812 | 11.596 | 19.749 |
| $F_{NO}$ | 3.33 | 4.32 | 5.80 |
| $d_4$ | 12.84 | 5.76 | 0.92 |
| $d_9$ | 3.15 | 2.84 | 3.65 |
| $d_{11}$ | 3.85 | 7.17 | 10.57 |

Numerical Example 6

| | | | |
|---|---|---|---|
| $r_1 = -21692.039$ | $d_1 = 1.00$ | $n_{d1} = 1.80610$ | $V_{d1} = 40.92$ |
| $r_2 = 8.032$(AS) | $d_2 = 1.37$ | | |
| $r_3 = 9.774$ | $d_3 = 2.22$ | $n_{d2} = 2.00069$ | $V_{d2} = 25.46$ |
| $r_4 = 16.834$ | $d_4$ = variable | | |
| $r_5 = \infty$(S) | $d_5 = -0.82$ | | |
| $r_6 = 4.180$(AS) | $d_6 = 2.46$ | $n_{d3} = 1.49700$ | $V_{d3} = 81.54$ |
| $r_7 = -32.928$ | $d_7 = 1.47$ | $n_{d4} = 1.92286$ | $V_{d4} = 18.90$ |
| $r_8 = -955.516$ | $d_8 = 1.93$ | $n_{d5} = 1.49700$ | $V_{d5} = 81.54$ |
| $r_9 = 163.416$(AS) | $d_9$ = variable | | |
| $r_{10} = -42.579$(AS) | $d_{10} = 0.80$ | $n_{d6} = 1.52511$ | $V_{d6} = 56.22$ |
| $r_{11} = 13.093$(AS) | $d_{11}$ = variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.41$ | | |
| $r_{16} = \infty$ (image surface) | | | |

Aspherical Surface Coefficient

TABLE 11-1

|   | 2nd surface | 6th surface | 9th surface | 10th surface |
|---|---|---|---|---|
| K | 0.000 | 0.000 | 0.000 | 0.000 |
| $A_4$ | $-9.38394 \times 10^{-6}$ | $-4.42518 \times 10^{-4}$ | $2.86385 \times 10^{-3}$ | $-5.63885 \times 10^{-3}$ |
| $A_6$ | $5.54741 \times 10^{-8}$ | $-2.07748 \times 10^{-5}$ | $3.70120 \times 10^{-4}$ | $5.08036 \times 10^{-4}$ |
| $A_8$ | $-3.54097 \times 10^{-9}$ | $2.18064 \times 10^{-6}$ | $-4.41500 \times 10^{-5}$ | $-4.05295 \times 10^{-5}$ |
| $A_{10}$ | $-4.67171 \times 10^{-10}$ | $-2.04579 \times 10^{-7}$ | $8.47589 \times 10^{-6}$ | $3.08061 \times 10^{-6}$ |

TABLE 11-2

|   | 11th surface |
|---|---|
| K | 0.000 |
| $A_4$ | $-5.20991 \times 10^{-3}$ |
| $A_6$ | $3.91246 \times 10^{-4}$ |
| $A_8$ | $-1.66900 \times 10^{-5}$ |
| $A_{10}$ | $6.24580 \times 10^{-7}$ |

Zoom Data ($\infty$)

TABLE 12

|   | WE | ST | TE |
|---|---|---|---|
| f(mm) | 8.160 | 13.643 | 23.512 |
| $F_{NO}$ | 2.88 | 3.56 | 4.96 |
| $d_4$ | 17.18 | 6.85 | 1.22 |
| $d_9$ | 3.96 | 4.61 | 4.33 |
| $d_{11}$ | 3.52 | 5.32 | 10.55 |

Numerical Example 7

| | | | |
|---|---|---|---|
| $r_1 = -34.705$ | $d_1 = 0.95$ | $n_{d1} = 1.80610$ | $V_{d1} = 40.92$ |
| $r_2 = 7.051$(AS) | $d_2 = 1.54$ | | |
| $r_3 = 12.304$ | $d_3 = 2.07$ | $n_{d2} = 2.00069$ | $V_{d2} = 25.46$ |
| $r_4 = 52.168$ | $d_4$ = variable | | |
| $r_5 = \infty$(S) | $d_5 = -1.18$ | | |
| $r_6 = 4.577$(AS) | $d_6 = 2.64$ | $n_{d3} = 1.49700$ | $V_{d3} = 81.54$ |
| $r_7 = 87.702$ | $d_7 = 0.60$ | $n_{d4} = 1.80810$ | $V_{d4} = 22.76$ |
| $r_8 = 14.053$ | $d_8 = 2.21$ | $n_{d5} = 1.49700$ | $V_{d5} = 81.54$ |
| $r_9 = -65.670$(AS) | $d_9$ = variable | | |
| $r_{10} = -22.159$(AS) | $d_{10} = 0.80$ | $n_{d6} = 1.52542$ | $V_{d6} = 55.78$ |
| $r_{11} = 130.774$(AS) | $d_{11}$ = variable | | |
| $r_{12} = \infty$ | $d_{12} = 0.50$ | $n_{d7} = 1.53996$ | $V_{d7} = 59.45$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.42$ | | |
| $r_{16} = \infty$ (image surface) | | | |

Aspherical Surface Coefficient

TABLE 13-1

|  | 2nd surface | 6th surface | 9th surface | 10th surface |
|---|---|---|---|---|
| K | 0.000 | 0.000 | 0.000 | 0.000 |
| $A_4$ | $-2.39358 \times 10^{-4}$ | $-2.30366 \times 10^{-4}$ | $2.56285 \times 10^{-3}$ | $1.96811 \times 10^{-4}$ |
| $A_6$ | $-5.68999 \times 10^{-6}$ | $8.36646 \times 10^{-7}$ | $2.19102 \times 10^{-5}$ | $-1.09241 \times 10^{-4}$ |
| $A_8$ | $1.10603 \times 10^{-7}$ | $9.08393 \times 10^{-8}$ | $4.74149 \times 10^{-5}$ | $9.88849 \times 10^{-6}$ |
| $A_{10}$ | $-4.44730 \times 10^{-9}$ | 0 | $-7.24474 \times 10^{-6}$ | $-2.12643 \times 10^{-7}$ |
| $A_{12}$ | 0 | 0 | 0 | $6.43200 \times 10^{-7}$ |

TABLE 13-2

|  | 11th surface |
|---|---|
| K | 0.000 |
| $A_4$ | $1.82798 \times 10^{-4}$ |
| $A_6$ | $-4.12618 \times 10^{-5}$ |
| $A_8$ | $-2.94854 \times 10^{-7}$ |
| $A_{10}$ | 0 |
| $A_{12}$ | 0 |

Zoom Data (∞)

TABLE 14

|  | WE | ST | TE |
|---|---|---|---|
| f(mm) | 8.157 | 13.668 | 23.513 |
| $F_{NO}$ | 2.88 | 3.70 | 5.04 |
| $d_4$ | 15.90 | 7.41 | 1.58 |
| $d_9$ | 3.13 | 2.89 | 4.38 |
| $d_{11}$ | 7.19 | 11.42 | 15.92 |

Numerical Example 8

$r_1 = 50.852$   $d_1 = 0.90$   $n_{d1} = 1.80610$   $V_{d1} = 40.92$
$r_2 = 5.799(AS)$   $d_2 = 1.89$
$r_3 = 9.201$   $d_3 = 1.76$   $n_{d2} = 2.00069$   $V_{d2} = 25.46$
$r_4 = 16.258$   $d_4 = $ variable
$r_5 = \infty(S)$   $d_5 = -0.60$
$r_6 = 5.636(AS)$   $d_6 = 2.63$   $n_{d3} = 1.74320$   $V_{d3} = 49.34$
$r_7 = 11.974$   $d_7 = 1.71$   $n_{d4} = 1.80518$   $V_{d4} = 25.42$
$r_8 = 4.090$   $d_8 = 1.25$   $n_{d5} = 1.58313$   $V_{d5} = 59.38$
$r_9 = 13.539(AS)$   $d_9 = $ variable
$r_{10} = 18.182(AS)$   $d_{10} = 1.50$   $n_{d6} = 1.52542$   $V_{d6} = 55.78$
$r_{11} = -61.937$   $d_{11} = $ variable
$r_{12} = \infty$   $d_{12} = 0.50$   $n_{d7} = 1.51633$   $V_{d7} = 64.14$
$r_{13} = \infty$   $d_{13} = 0.50$
$r_{14} = \infty$   $d_{14} = 0.50$   $n_{d8} = 1.51633$   $V_{d8} = 64.14$
$r_{15} = \infty$   $d_{15} = 0.49$
$r_{16} = \infty$ (image surface)

Aspherical Surface Coefficient

TABLE 15

|  | 2nd surface | 6th surface | 9th surface | 10th surface |
|---|---|---|---|---|
| K | $-1.118$ | $-0.831$ | 0.000 | 0.000 |
| $A_4$ | $4.40772 \times 10^{-4}$ | $5.53954 \times 10^{-4}$ | $1.86701 \times 10^{-3}$ | $-7.43754 \times 10^{-5}$ |
| $A_6$ | $-1.79165 \times 10^{-7}$ | $-6.08508 \times 10^{-7}$ | $9.48986 \times 10^{-5}$ | $7.82756 \times 10^{-6}$ |
| $A_8$ | $6.84992 \times 10^{-8}$ | $1.25836 \times 10^{-6}$ | $-1.36654 \times 10^{-7}$ | 0 |
| $A_{10}$ | $-4.27115 \times 10^{-10}$ | $-3.07335 \times 10^{-8}$ | $1.56679 \times 10^{-6}$ | 0 |

Zoom Data (∞)

TABLE 16

|  | WE | ST | TE |
|---|---|---|---|
| f(mm) | 7.904 | 15.227 | 22.840 |
| $F_{NO}$ | 2.97 | 3.93 | 4.95 |
| $d_4$ | 16.00 | 4.96 | 1.00 |
| $d_9$ | 3.47 | 3.89 | 5.15 |
| $d_{11}$ | 7.19 | 12.46 | 17.93 |

Numerical Example 9

| | | | |
|---|---|---|---|
| $r_1 = -55.947$ | $d_1 = 0.90$ | $n_{d1} = 1.80610$ | $V_{d1} = 40.92$ |
| $r_2 = 6.646(AS)$ | $d_2 = 1.62$ | | |
| $r_3 = 11.161$ | $d_3 = 1.82$ | $n_{d2} = 2.00069$ | $V_{d2} = 25.46$ |
| $r_4 = 30.512$ | $d_4 = $ variable | | |
| $r_5 = \infty(S)$ | $d_5 = -0.67$ | | |
| $r_6 = 5.808(AS)$ | $d_6 = 3.51$ | $n_{d3} = 1.74320$ | $V_{d3} = 49.34$ |
| $r_7 = 16.319$ | $d_7 = 0.60$ | $n_{d4} = 1.84666$ | $V_{d4} = 23.78$ |
| $r_8 = 5.200$ | $d_8 = 1.36$ | $n_{d5} = 1.58313$ | $V_{d5} = 59.38$ |
| $r_9 = 26.430(AS)$ | $d_9 = $ variable | | |
| $r_{10} = 24.745(AS)$ | $d_{10} = 1.24$ | $n_{d6} = 1.52542$ | $V_{d6} = 55.78$ |
| $r_{11} = 7929.558$ | $d_{11} = $ variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.46$ | | |
| $r_{16} = \infty$ (image surface) | | | |

Aspherical Surface Coefficient

TABLE 17

| | 2nd surface | 6th surface | 9th surface | 10th surface |
|---|---|---|---|---|
| K | −3.702 | −2.011 | 0.000 | 0.000 |
| $A_4$ | $1.29210 \times 10^{-3}$ | $1.29270 \times 10^{-3}$ | $1.94125 \times 10^{-3}$ | $-1.01517 \times 10^{-4}$ |
| $A_6$ | $-2.94031 \times 10^{-5}$ | $-8.81428 \times 10^{-6}$ | $3.03189 \times 10^{-5}$ | $5.70765 \times 10^{-6}$ |
| $A_8$ | $6.63852 \times 10^{-7}$ | $1.57107 \times 10^{-6}$ | $1.16357 \times 10^{-5}$ | 0 |
| $A_{10}$ | $-7.48401 \times 10^{-9}$ | $-3.88466 \times 10^{-8}$ | $1.55401 \times 10^{-7}$ | 0 |

Numerical Example 10

| | | | |
|---|---|---|---|
| $r_1 = -200.434$ | $d_1 = 0.90$ | $n_{d1} = 1.80610$ | $V_{d1} = 40.92$ |
| $r_2 = 6.474(AS)$ | $d_2 = 1.53$ | | |
| $r_3 = 9.933$ | $d_3 = 2.02$ | $n_{d2} = 2.00069$ | $V_{d2} = 25.46$ |
| $r_4 = 21.902$ | $d_4 = $ variable | | |
| $r_5 = \infty(S)$ | $d_5 = -0.63$ | | |
| $r_6 = 5.753(AS)$ | $d_6 = 2.06$ | $n_{d3} = 1.80610$ | $V_{d3} = 40.92$ |
| $r_7 = 35.230$ | $d_7 = 1.27$ | $n_{d4} = 1.84666$ | $V_{d4} = 23.78$ |
| $r_8 = 5.202$ | $d_8 = 2.06$ | $n_{d5} = 1.58313$ | $V_{d5} = 59.38$ |
| $r_9 = 16.552(AS)$ | $d_9 = $ variable | | |
| $r_{10} = 14.000(AS)$ | $d_{10} = 1.24$ | $n_{d6} = 1.52542$ | $V_{d6} = 55.78$ |
| $r_{11} = 41.056$ | $d_{11} = $ variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.43$ | | |
| $r_{16} = \infty$ (image surface) | | | |

Aspherical Surface Coefficient

Zoom Data (∞)

TABLE 18

|  | WE | ST | TE |
|---|---|---|---|
| f(mm) | 7.511 | 14.600 | 21.633 |
| $F_{NO}$ | 2.88 | 3.86 | 4.84 |
| $d_4$ | 15.42 | 4.74 | 1.07 |
| $d_9$ | 4.10 | 4.19 | 4.41 |
| $d_{11}$ | 6.28 | 11.59 | 16.78 |

TABLE 19

| | 2nd surface | 6th surface | 9th surface | 10th surface |
|---|---|---|---|---|
| K | −3.501 | −2.429 | −4.333 | 0.000 |
| $A_4$ | $1.39590 \times 10^{-3}$ | $1.61259 \times 10^{-3}$ | $2.27790 \times 10^{-3}$ | $-1.47199 \times 10^{-4}$ |
| $A_6$ | $-2.94154 \times 10^{-5}$ | $-1.94631 \times 10^{-5}$ | $1.03782 \times 10^{-5}$ | $5.67379 \times 10^{-6}$ |
| $A_8$ | $6.73010 \times 10^{-7}$ | $2.01443 \times 10^{-6}$ | $2.09837 \times 10^{-5}$ | $4.82046 \times 10^{-7}$ |
| $A_{10}$ | $-7.13429 \times 10^{-9}$ | $-5.44542 \times 10^{-8}$ | $-4.69417 \times 10^{-7}$ | $-1.84788 \times 10^{-8}$ |

Zoom Data (∞)

TABLE 20

|  | WE | ST | TE |
|---|---|---|---|
| f(mm) | 7.512 | 14.376 | 21.635 |
| $F_{NO}$ | 2.88 | 3.78 | 4.76 |
| $d_4$ | 16.35 | 5.11 | 1.03 |
| $d_9$ | 4.20 | 4.23 | 4.65 |
| $d_{11}$ | 5.83 | 10.66 | 15.58 |

Numerical Example 11

| | | | |
|---|---|---|---|
| $r_1 = 31.493$ | $d_1 = 1.00$ | $n_{d1} = 1.80610$ | $V_{d1} = 40.92$ |
| $r_2 = 4.015(AS)$ | $d_2 = 1.36$ | | |
| $r_3 = 6.467(AS)$ | $d_3 = 1.80$ | $n_{d2} = 1.84666$ | $V_{d2} = 23.78$ |
| $r_4 = 13.950$ | $d_4 = $ variable | | |
| $r_5 = \infty(S)$ | $d_5 = -0.45$ | | |
| $r_6 = 3.743(AS)$ | $d_6 = 1.30$ | $n_{d3} = 1.74320$ | $V_{d3} = 49.34$ |
| $r_7 = 20.976$ | $d_7 = 0.50$ | $n_{d4} = 1.71736$ | $V_{d4} = 29.52$ |
| $r_8 = 3.002$ | $d_8 = 2.03$ | $n_{d5} = 1.51633$ | $V_{d5} = 64.14$ |
| $r_9 = 9.297(AS)$ | $d_9 = $ variable | | |
| $r_{10} = 19.045(AS)$ | $d_{10} = 1.00$ | $n_{d6} = 1.52511$ | $V_{d6} = 56.23$ |
| $r_{11} = -241.584(AS)$ | $d_{11} = $ variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.42$ | | |
| $r_{16} = \infty$ (image surface) | | | |

Aspherical Surface Coefficient

TABLE 21-1

|  | 2nd surface | 3rd surface | 6th surface | 9th surface |
|---|---|---|---|---|
| K | −0.788 | 0.000 | −1.016 | 0.000 |
| $A_4$ | $5.88309 \times 10^{-4}$ | $2.80805 \times 10^{-10}$ | $2.19556 \times 10^{-3}$ | $6.49949 \times 10^{-3}$ |
| $A_6$ | $1.25094 \times 10^{-5}$ | $7.99547 \times 10^{-7}$ | $9.52058 \times 10^{-5}$ | $6.51196 \times 10^{-4}$ |
| $A_8$ | $-6.84764 \times 10^{-8}$ | $-3.58622 \times 10^{-12}$ | $2.20537 \times 10^{-6}$ | $8.19880 \times 10^{-5}$ |
| $A_{10}$ | $1.92475 \times 10^{-9}$ | 0 | $-7.19757 \times 10^{-8}$ | $1.62716 \times 10^{-5}$ |

TABLE 21-2

|  | 10th surface | 11th surface |
|---|---|---|
| K | 0.000 | 0.000 |
| $A_4$ | $-8.16440 \times 10^{-11}$ | $7.72945 \times 10^{-7}$ |
| $A_6$ | $4.00208 \times 10^{-5}$ | $5.03191 \times 10^{-5}$ |
| $A_8$ | $1.51332 \times 10^{-5}$ | $-1.14557 \times 10^{-5}$ |
| $A_{10}$ | $2.94028 \times 10^{-6}$ | $4.64487 \times 10^{-6}$ |

Zoom Data (∞)

TABLE 22

|  | WE | ST | TE |
|---|---|---|---|
| f(mm) | 5.530 | 10.000 | 16.036 |
| $F_{NO}$ | 3.48 | 4.49 | 5.80 |
| $d_4$ | 12.20 | 4.63 | 0.95 |
| $d_9$ | 2.50 | 3.01 | 2.50 |
| $d_{11}$ | 4.47 | 7.38 | 12.10 |

Numerical Example 12

| | | | |
|---|---|---|---|
| $r_1 = -64.454$ | $d_1 = 1.00$ | $n_{d1} = 1.80610$ | $V_{d1} = 40.92$ |
| $r_2 = 8.621(AS)$ | $d_2 = 1.73$ | | |
| $r_3 = 11.128$ | $d_3 = 2.00$ | $n_{d2} = 1.92286$ | $V_{d2} = 20.88$ |
| $r_4 = 19.611$ | $d_4 = $ variable | | |
| $r_5 = \infty(S)$ | $d_5 = -0.60$ | | |
| $r_6 = 6.134(AS)$ | $d_6 = 2.80$ | $n_{d3} = 1.80610$ | $V_{d3} = 40.92$ |
| $r_7 = -9.307$ | $d_7 = 0.50$ | $n_{d4} = 1.67270$ | $V_{d4} = 32.10$ |
| $r_8 = 3.844$ | $d_8 = 2.63$ | $n_{d5} = 1.48749$ | $V_{d5} = 70.23$ |
| $r_9 = 10.458(AS)$ | $d_9 = $ variable | | |
| $r_{10} = 11.453$ | $d_{10} = 1.80$ | $n_{d6} = 1.52542$ | $V_{d6} = 55.78$ |
| $r_{11} = 28.905$ | $d_{11} = $ variable | | |
| $r_{12} = \infty$ | $d_{12} = 0.60$ | $n_{d7} = 1.51633$ | $V_{d7} = 64.14$ |
| $r_{13} = \infty$ | $d_{13} = 0.60$ | | |
| $r_{14} = \infty$ | $d_{14} = 0.60$ | $n_{d8} = 1.51633$ | $V_{d8} = 64.14$ |
| $r_{15} = \infty$ | $d_{15} = 0.56$ | | |
| $r_{16} = \infty$ (image surface) | | | |

Aspherical Surface Coefficient

TABLE 23

|  | 2nd surface | 6th surface | 9th surface |
|---|---|---|---|
| K | −0.790 | −0.006 | −2.043 |
| $A_4$ | $1.13709 \times 10^{-4}$ | $-1.89441 \times 10^{-4}$ | $-1.74384 \times 10^{-3}$ |
| $A_6$ | $1.36096 \times 10^{-6}$ | $-6.95916 \times 10^{-6}$ | $3.87068 \times 10^{-5}$ |
| $A_8$ | $-5.03816 \times 10^{-8}$ | $1.29909 \times 10^{-7}$ | $2.76989 \times 10^{-6}$ |
| $A_{10}$ | $1.20255 \times 10^{-9}$ | $-1.96262 \times 10^{-8}$ | $-2.97263 \times 10^{-8}$ |

Zoom Data (∞)

TABLE 24

|  | WE | ST | TE |
|---|---|---|---|
| f(mm) | 8.257 | 11.083 | 23.726 |
| $F_{NO}$ | 2.85 | 3.22 | 4.89 |
| $d_4$ | 14.53 | 9.25 | 1.00 |
| $d_9$ | 3.91 | 4.26 | 6.65 |
| $d_{11}$ | 5.62 | 7.45 | 15.70 |

Numerical Example 13

| | | | |
|---|---|---|---|
| $r_1 = -120.395$ | $d_1 = 1.00$ | $n_{d1} = 1.80610$ | $V_{d1} = 40.92$ |
| $r_2 = 7.653(AS)$ | $d_2 = 1.60$ | | |
| $r_3 = 10.272$ | $d_3 = 1.60$ | $n_{d2} = 1.92286$ | $V_{d2} = 20.88$ |
| $r_4 = 19.021$ | $d_4 = $ variable | | |
| $r_5 = \infty(S)$ | $d_5 = -0.60$ | | |

-continued

| | | | |
|---|---|---|---|
| $r_6 = 6.092(AS)$ | $d_6 = 2.70$ | $n_{d3} = 1.80610$ | $V_{d3} = 40.92$ |
| $r_7 = -8.957$ | $d_7 = 0.50$ | $n_{d4} = 1.67270$ | $V_{d4} = 32.10$ |
| $r_8 = 3.826$ | $d_8 = 2.00$ | $n_{d5} = 1.49700$ | $V_{d5} = 81.54$ |
| $r_9 = 9.512(AS)$ | $d_9 =$ variable | | |
| $r_{10} = 14.529$ | $d_{10} = 1.60$ | $n_{d6} = 1.51633$ | $V_{d6} = 64.14$ |
| $r_{11} = 507.947$ | $d_{11} =$ variable | | |
| $r_{12} = \infty$ | $d_{12} = 0.60$ | $n_{d7} = 1.51633$ | $V_{d7} = 64.14$ |
| $r_{13} = \infty$ | $d_{13} = 0.60$ | | |
| $r_{14} = \infty$ | $d_{14} = 0.60$ | $n_{d8} = 1.51633$ | $V_{d8} = 64.14$ |
| $r_{15} = \infty$ | $d_{15} = 0.53$ | | |
| $r_{16} = \infty$ (image surface) | | | |

Aspherical Surface Coefficient

TABLE 25

| | 2nd surface | 6th surface | 9th surface |
|---|---|---|---|
| K | −0.481 | −0.117 | −0.377 |
| $A_4$ | $5.33432 \times 10^{-5}$ | $-9.87240 \times 10^{-5}$ | $1.63400 \times 10^{-3}$ |
| $A_6$ | $1.31789 \times 10^{-6}$ | $-5.15054 \times 10^{-6}$ | $3.97670 \times 10^{-5}$ |
| $A_8$ | $-1.87256 \times 10^{-8}$ | $1.80533 \times 10^{-7}$ | $2.09267 \times 10^{-6}$ |
| $A_{10}$ | $-4.79094 \times 10^{-11}$ | $-2.13356 \times 10^{-8}$ | $1.70358 \times 10^{-7}$ |

Zoom Data (∞)

TABLE 26

| | WE | ST | TE |
|---|---|---|---|
| f(mm) | 7.793 | 13.201 | 22.406 |
| $F_{NO}$ | 2.85 | 3.55 | 4.74 |
| $d_4$ | 15.60 | 6.42 | 1.00 |
| $d_9$ | 3.96 | 4.68 | 7.13 |
| $d_{11}$ | 6.15 | 9.71 | 15.76 |

Numerical Example 14

| | | | |
|---|---|---|---|
| $r_1 = 69.726$ | $d_1 = 0.50$ | $n_{d1} = 1.69350$ | $V_{d1} = 53.21$ |
| $r_2 = 4.746$ | $d_2 = 1.96$ | | |
| $r_3 = 12.885(AS)$ | $d_3 = 1.36$ | $n_{d2} = 1.84666$ | $V_{d2} = 23.78$ |
| $r_4 = 25.844(AS)$ | $d_4 =$ variable | | |
| $r_5 = \infty(S)$ | $d_5 = -0.50$ | | |
| $r_6 = 4.943(AS)$ | $d_6 = 3.04$ | $n_{d3} = 1.74320$ | $V_{d3} = 49.34$ |
| $r_7 = 25.950$ | $d_7 = 0.50$ | $n_{d4} = 1.71736$ | $V_{d4} = 29.52$ |
| $r_8 = 3.545$ | $d_8 = 1.57$ | $n_{d5} = 1.51633$ | $V_{d5} = 64.14$ |
| $r_9 = -140.225(AS)$ | $d_9 =$ variable | | |
| $r_{10} = 36.103$ | $d_{10} = 1.08$ | $n_{d6} = 1.58393$ | $V_{d6} = 30.21$ |
| $r_{11} = 157.196$ | $d_{11} =$ variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.60$ | | |
| $r_{16} = \infty$ (image surface) | | | |

Aspherical Surface Coefficient

TABLE 27

| | 3rd surface | 4th surface | 6th surface | 9th surface |
|---|---|---|---|---|
| K | 2.135 | −1.605 | −1.070 | 0.000 |
| $A_4$ | $-3.15464 \times 10^{-4}$ | $-6.13441 \times 10^{-4}$ | $9.28135 \times 10^{-4}$ | $2.77025 \times 10^{-3}$ |
| $A_6$ | $-1.04123 \times 10^{-5}$ | $-1.89803 \times 10^{-5}$ | $1.60749 \times 10^{-5}$ | $8.45677 \times 10^{-5}$ |
| $A_8$ | $-2.90693 \times 10^{-7}$ | $-5.74661 \times 10^{-7}$ | $9.55801 \times 10^{-7}$ | $2.81700 \times 10^{-5}$ |
| $A_{10}$ | 0 | 0 | 0 | 0 |

Zoom Data (∞)

TABLE 28

| | WE | ST | TE |
|---|---|---|---|
| f(mm) | 6.108 | 11.768 | 17.644 |
| $F_{NO}$ | 3.24 | 4.42 | 5.65 |
| $d_4$ | 10.68 | 3.49 | 0.90 |
| $d_9$ | 3.68 | 3.69 | 3.68 |
| $d_{11}$ | 4.04 | 8.76 | 13.77 |

Numerical Example 15

| | | | |
|---|---|---|---|
| $r_1 = 19.064$ | $d_1 = 0.80$ | $n_{d1} = 1.77250$ | $V_{d1} = 49.60$ |
| $r_2 = 5.104$ | $d_2 = 1.87$ | | |
| $r_3 = 10.613(AS)$ | $d_3 = 1.50$ | $n_{d2} = 1.82114$ | $V_{d2} = 24.06$ |
| $r_4 = 17.740(AS)$ | $d_4 =$ variable | | |
| $r_5 = \infty(S)$ | $d_5 = -0.50$ | | |
| $r_6 = 4.218(AS)$ | $d_6 = 1.25$ | $n_{d3} = 1.80610$ | $V_{d3} = 40.92$ |
| $r_7 = 16.475$ | $d_7 = 0.50$ | $n_{d4} = 1.72825$ | $V_{d4} = 28.46$ |
| $r_8 = 3.000$ | $d_8 = 1.98$ | $n_{d5} = 1.58313$ | $V_{d5} = 59.38$ |
| $r_9 = 6.705(AS)$ | $d_9 =$ variable | | |
| $r_{10} = 15.406(AS)$ | $d_{10} = 1.20$ | $n_{d6} = 1.52511$ | $V_{d6} = 56.22$ |
| $r_{11} = 679.942(AS)$ | $d_{11} =$ variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.40$ | | |
| $r_{16} = \infty$ (image surface) | | | |

Aspherical Surface Coefficient

TABLE 29-1

|   | 3rd surface | 4th surface | 6th surface | 9th surface |
|---|---|---|---|---|
| K | −13.399 | 4.762 | −1.661 | −1.556 |
| $A_4$ | $1.00692 \times 10^{-3}$ | $-9.39622 \times 10^{-4}$ | $2.81854 \times 10^{-3}$ | $5.79158 \times 10^{-3}$ |
| $A_6$ | $-5.17345 \times 10^{-5}$ | $1.08563 \times 10^{-5}$ | $3.99977 \times 10^{-5}$ | $5.27276 \times 10^{-4}$ |
| $A_8$ | $2.70682 \times 10^{-6}$ | $-5.52833 \times 10^{-7}$ | $1.43030 \times 10^{-6}$ | $2.64149 \times 10^{-7}$ |
| $A_{10}$ | $-8.69858 \times 10^{-8}$ | $-3.72262 \times 10^{-8}$ | $1.39779 \times 10^{-7}$ | $1.62265 \times 10^{-5}$ |

TABLE 29-2

|   | 10th surface | 11th surface |
|---|---|---|
| K | −14.699 | 0.000 |
| $A_4$ | $1.27364 \times 10^{-3}$ | $6.13478 \times 10^{-4}$ |
| $A_6$ | $1.39733 \times 10^{-4}$ | $1.52095 \times 10^{-4}$ |
| $A_8$ | $2.54309 \times 10^{-5}$ | $7.94767 \times 10^{-6}$ |
| $A_{10}$ | $-7.92228 \times 10^{-7}$ | $1.36613 \times 10^{-6}$ |

Zoom Data (∞)

TABLE 30

|   | WE | ST | TE |
|---|---|---|---|
| f(mm) | 6.610 | 12.752 | 19.108 |
| $F_{NO}$ | 3.48 | 4.64 | 5.80 |
| $d_4$ | 13.97 | 4.45 | 0.90 |
| $d_9$ | 2.98 | 3.71 | 3.63 |
| $d_{11}$ | 5.54 | 9.39 | 13.94 |

Numerical Example 16

| $r_1 = 23.044$ | $d_1 = 1.00$ | $n_{d1} = 1.80610$ | $V_{d1} = 40.92$ |
|---|---|---|---|
| $r_2 = 4.637(AS)$ | $d_2 = 1.67$ | | |
| $r_3 = 6.786$ | $d_3 = 1.58$ | $n_{d2} = 2.00069$ | $V_{d2} = 25.46$ |
| $r_4 = 10.000$ | $d_4$ = variable | | |
| $r_5 = \infty(S)$ | $d_5 = -0.50$ | | |
| $r_6 = 4.414(AS)$ | $d_6 = 2.63$ | $n_{d3} = 1.74320$ | $V_{d3} = 49.34$ |
| $r_7 = 10.000$ | $d_7 = 0.50$ | $n_{d4} = 1.80518$ | $V_{d4} = 25.42$ |
| $r_8 = 3.572$ | $d_8 = 1.06$ | $n_{d5} = 1.58313$ | $V_{d5} = 59.38$ |
| $r_9 = 9.779(AS)$ | $d_9$ = variable | | |
| $r_{10} = 12.767(AS)$ | $d_{10} = 1.20$ | $n_{d6} = 1.52511$ | $V_{d6} = 56.22$ |
| $r_{11} = 450.005$ | $d_{11}$ = variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.40$ | | |
| $r_{16} = \infty$ (image surface) | | | |

Aspherical Surface Coefficient

TABLE 31

|   | 2nd surface | 6th surface | 9th surface | 10th surface |
|---|---|---|---|---|
| K | −1.086 | −0.954 | 0.000 | 0.000 |
| $A_4$ | $9.62928 \times 10^{-4}$ | $1.31409 \times 10^{-3}$ | $3.73309 \times 10^{-3}$ | $-2.15582 \times 10^{-4}$ |
| $A_6$ | $5.95705 \times 10^{-6}$ | $2.98474 \times 10^{-5}$ | $5.31664 \times 10^{-4}$ | $2.64093 \times 10^{-5}$ |
| $A_8$ | $3.29554 \times 10^{-7}$ | $4.67221 \times 10^{-6}$ | $-3.88576 \times 10^{-5}$ | 0 |
| $A_{10}$ | $1.16736 \times 10^{-9}$ | $-3.77040 \times 10^{-7}$ | $1.32383 \times 10^{-5}$ | 0 |

Zoom Data (∞)

TABLE 32

|   | WE | ST | TE |
|---|---|---|---|
| f(mm) | 6.615 | 12.686 | 19.116 |
| $F_{NO}$ | 3.48 | 4.58 | 5.79 |
| $d_4$ | 13.28 | 4.15 | 0.90 |
| $d_9$ | 3.16 | 3.09 | 3.96 |
| $d_{11}$ | 5.29 | 9.64 | 13.97 |

Numerical Example 17

| $r_1 = 23.249$ | $d_1 = 1.00$ | $n_{d1} = 1.80610$ | $V_{d1} = 40.92$ |
|---|---|---|---|
| $r_2 = 4.545(AS)$ | $d_2 = 1.68$ | | |
| $r_3 = 6.745$ | $d_3 = 1.62$ | $n_{d2} = 2.00069$ | $V_{d2} = 25.46$ |
| $r_4 = 10.000$ | $d_4$ = variable | | |
| $r_5 = \infty$ (aperture) | $d_5 = -0.50$ | | |
| $r_6 = 4.591(AS)$ | $d_6 = 1.98$ | $n_{d3} = 1.80610$ | $V_{d3} = 40.92$ |
| $r_7 = 50.000$ | $d_7 = 0.55$ | $n_{d4} = 1.74000$ | $V_{d4} = 28.30$ |
| $r_8 = 3.147$ | $d_8 = 1.75$ | $n_{d5} = 1.58313$ | $V_{d5} = 59.38$ |
| $r_9 = 8.300(AS)$ | $d_9$ = variable | | |
| $r_{10} = 11.436(AS)$ | $d_{10} = 1.20$ | $n_{d6} = 1.52511$ | $V_{d6} = 56.22$ |
| $r_{11} = 85.514$ | $d_{11}$ = variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.40$ | | |
| $r_{16} = \infty$ (image surface) | | | |

Aspherical Surface Coefficient

TABLE 33

|     | 2nd surface | 6th surface | 9th surface | 10th surface |
|-----|-------------|-------------|-------------|--------------|
| K   | −1.069 | −1.111 | 0.000 | 0.000 |
| $A_4$ | $9.82367 \times 10^{-4}$ | $1.36092 \times 10^{-3}$ | $3.53310 \times 10^{-3}$ | $-2.73474 \times 10^{-4}$ |
| $A_6$ | $6.13229 \times 10^{-6}$ | $2.46840 \times 10^{-5}$ | $2.64589 \times 10^{-4}$ | $2.44609 \times 10^{-5}$ |
| $A_8$ | $4.16082 \times 10^{-7}$ | $1.69262 \times 10^{-6}$ | $2.99098 \times 10^{-5}$ | 0 |
| $A_{10}$ | $-1.47859 \times 10^{-9}$ | $-1.16420 \times 10^{-7}$ | $2.87001 \times 10^{-6}$ | 0 |

Zoom Data (∞)

TABLE 34

|       | WE | ST | TE |
|-------|-----|-----|-----|
| f(mm) | 6.621 | 12.744 | 19.118 |
| $F_{NO}$ | 3.44 | 4.57 | 5.76 |
| $d_4$ | 12.85 | 4.04 | 0.90 |
| $d_9$ | 3.39 | 3.50 | 4.15 |
| $d_{11}$ | 5.08 | 9.49 | 13.99 |

Figure 18A:
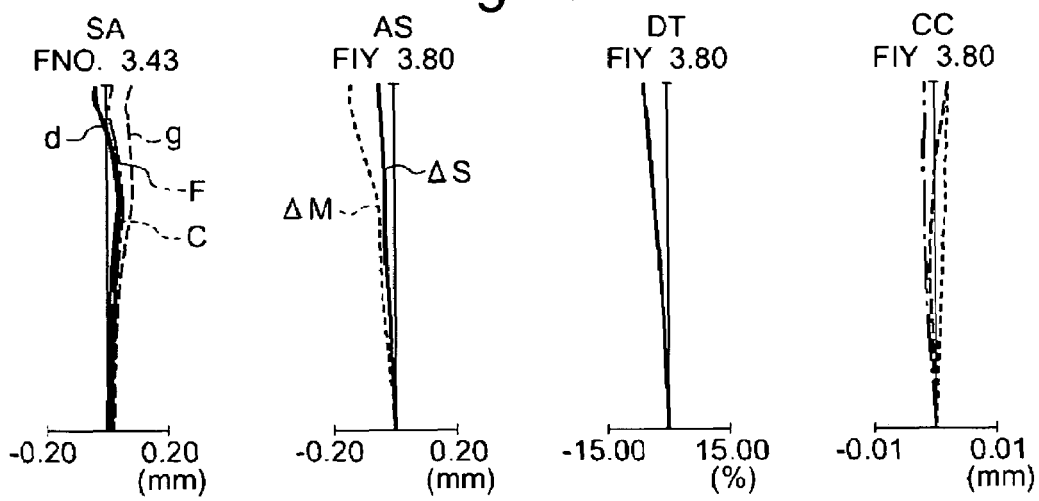
FIGS. 18A to 18C are aberration diagrams in the wide-angle end (FIG. 18A), the intermediate state (FIG. 18B) and the telephoto end (FIG. 18C) of Example 1 when focused on the infinite object.
Figure 18B:
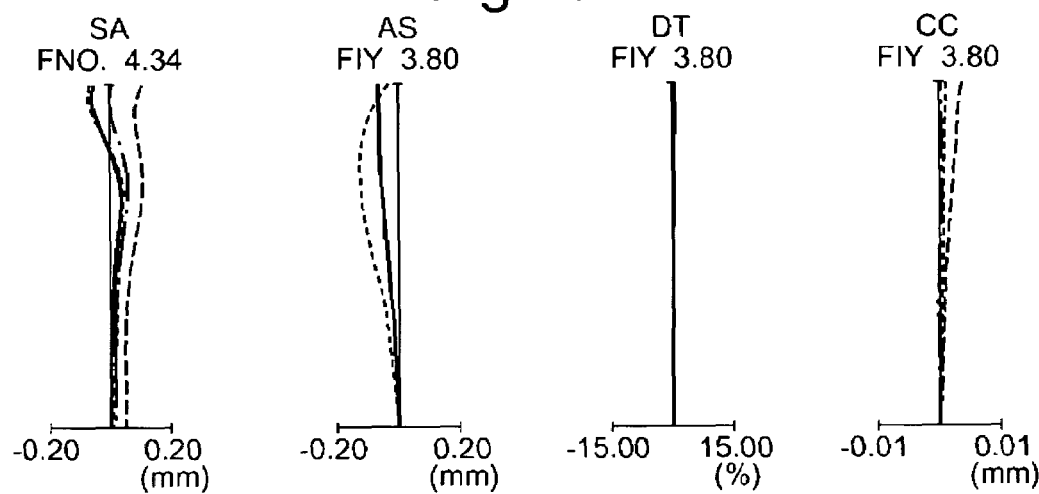
Figure 18C:
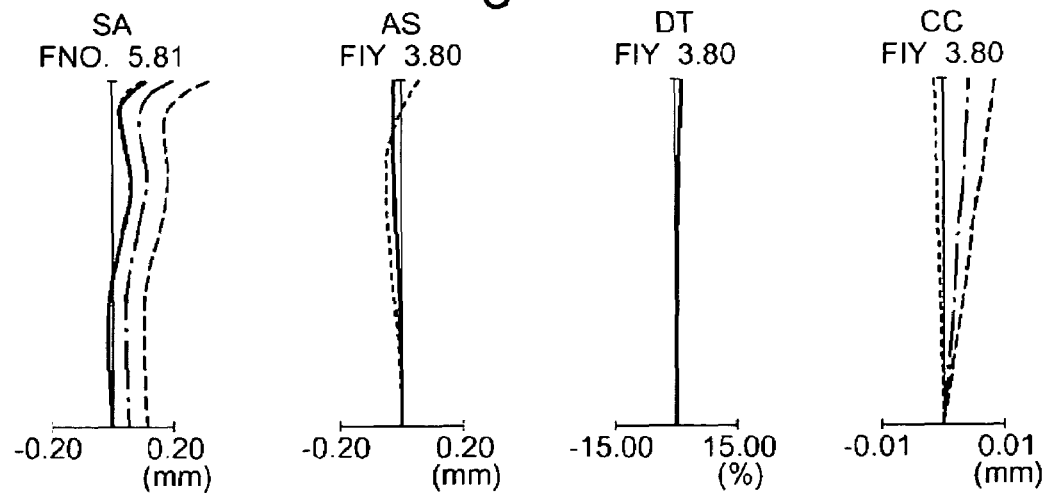
Figure 20A:
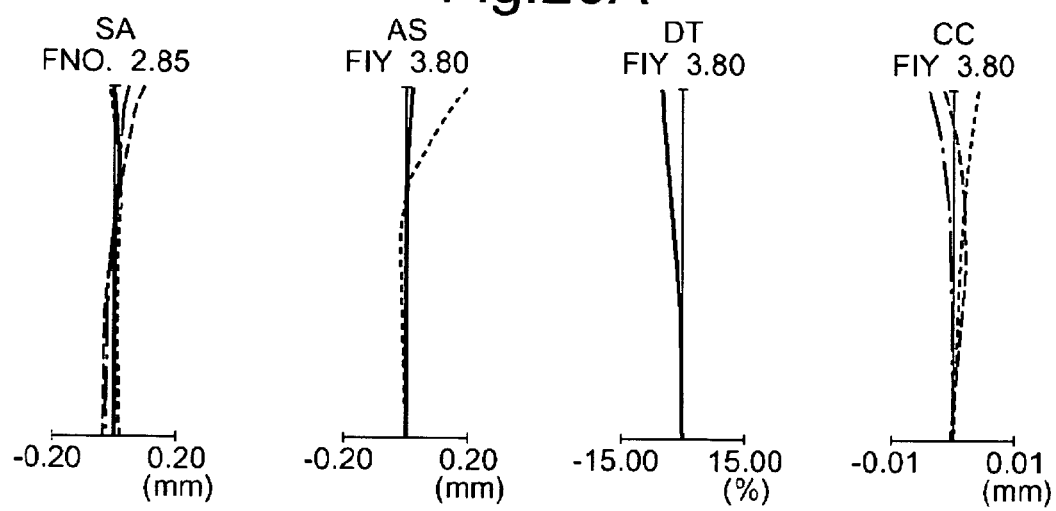
FIGS. 20A to 20C are aberration diagrams in the wide-angle end (FIG. 20A), the intermediate state (FIG. 20B) and the telephoto end (FIG. 20C) of Example 3 when focused on the infinite object.
Figure 20B:
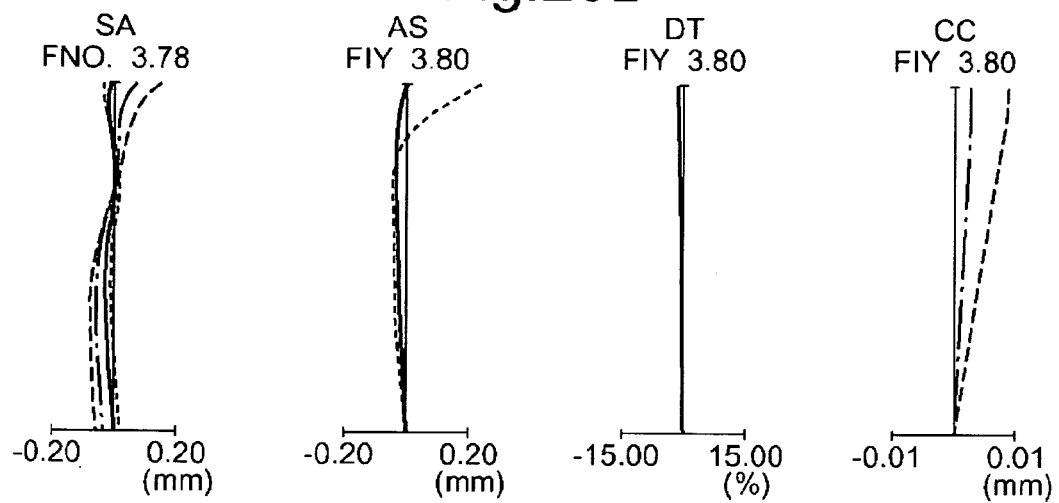
Figure 20C:
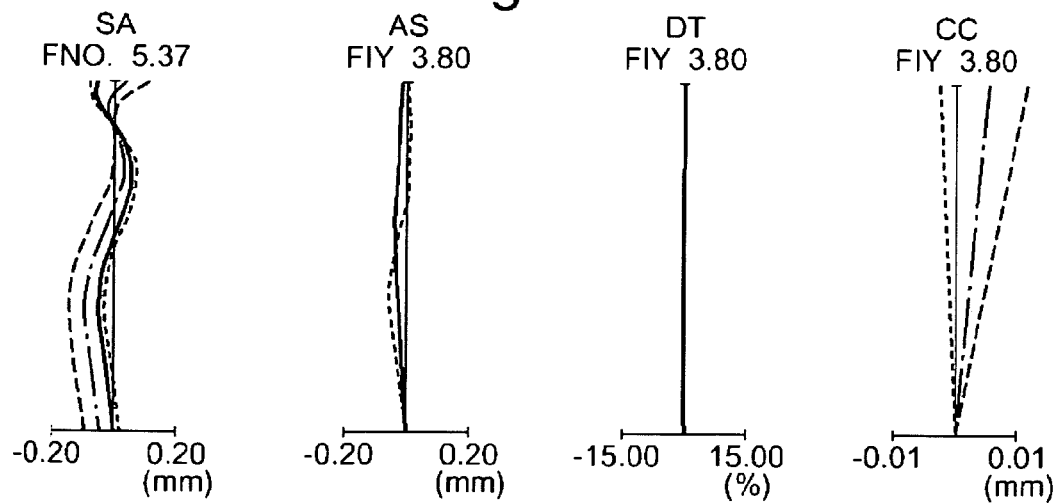
Figure 21A:
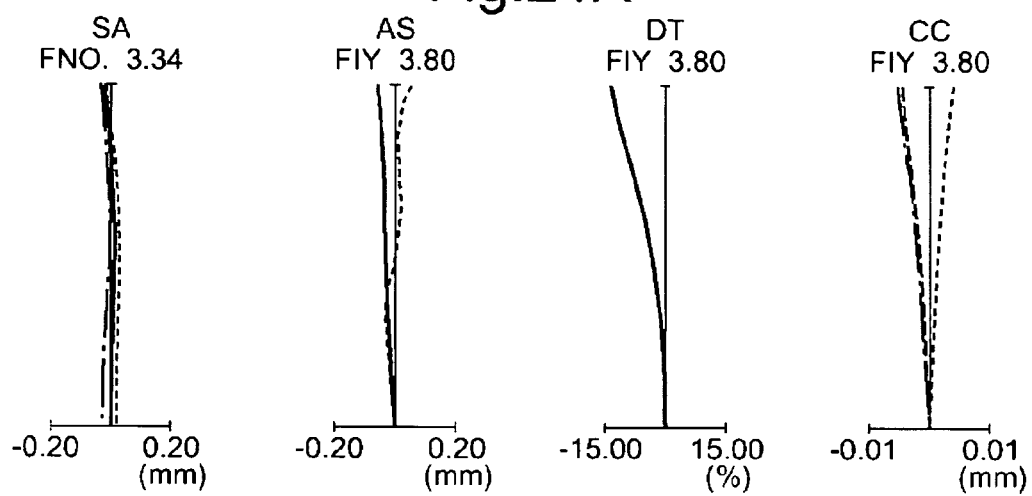
FIGS. 21A to 21C are aberration diagrams in the wide-angle end (FIG. 21A), the intermediate state (FIG. 21B) and the telephoto end (FIG. 21C) of Example 4 when focused on the infinite object.
Figure 21B:
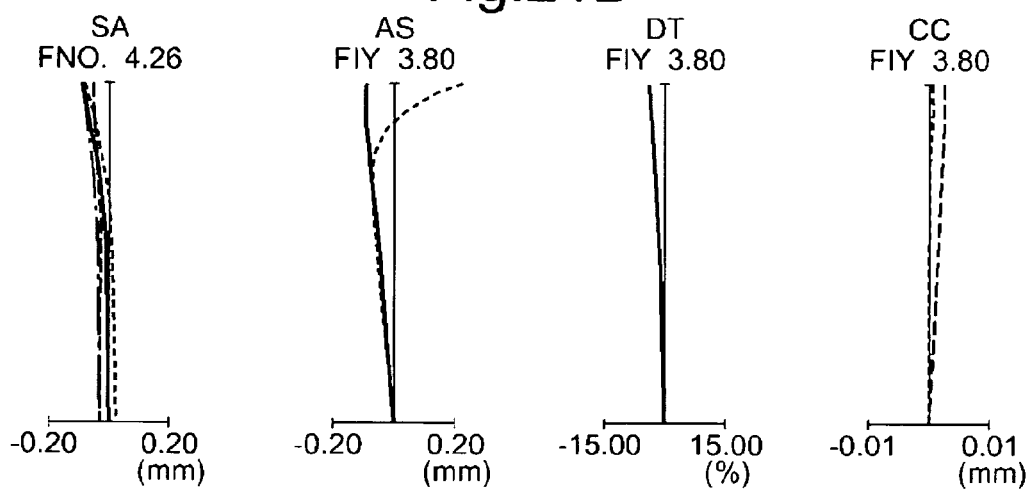
Figure 21C:
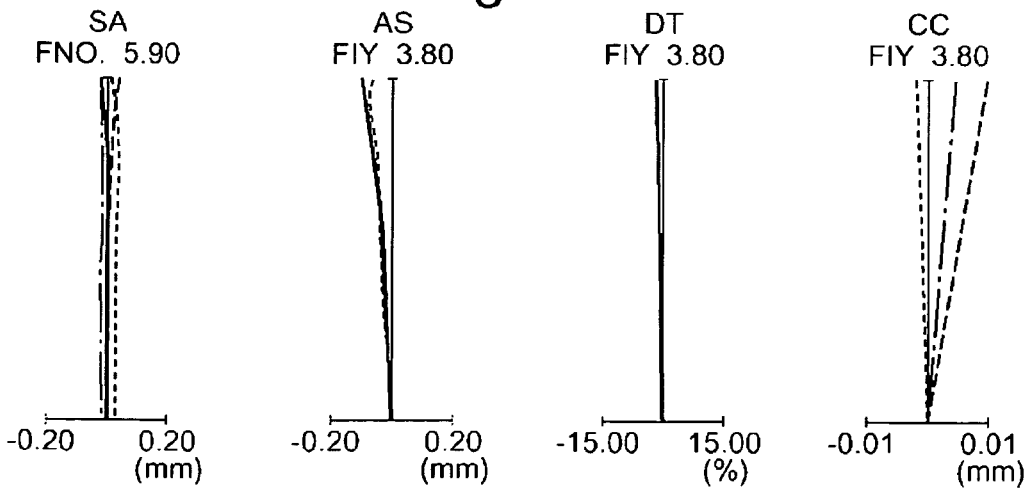
Figure 22A:
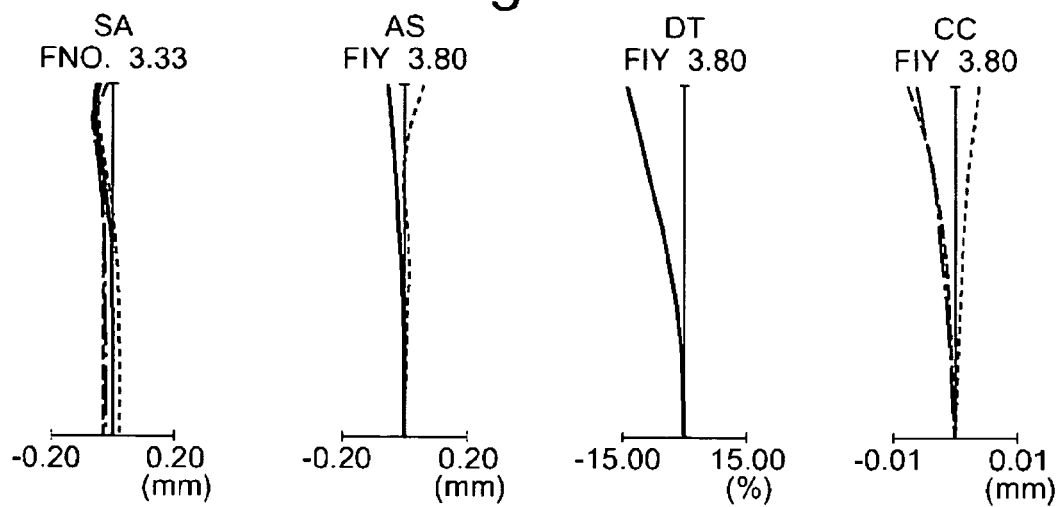
FIGS. 22A to 22C are aberration diagrams in the wide-angle end (FIG. 22A), the intermediate state (FIG. 22B) and the telephoto end (FIG. 22C) of Example 5 when focused on the infinite object.
Figure 22B:
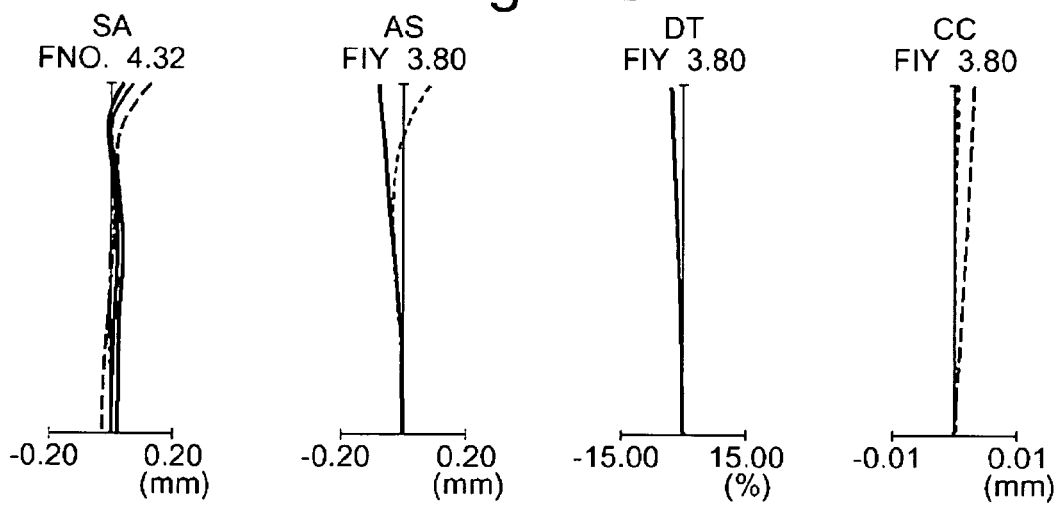
Figure 22C:
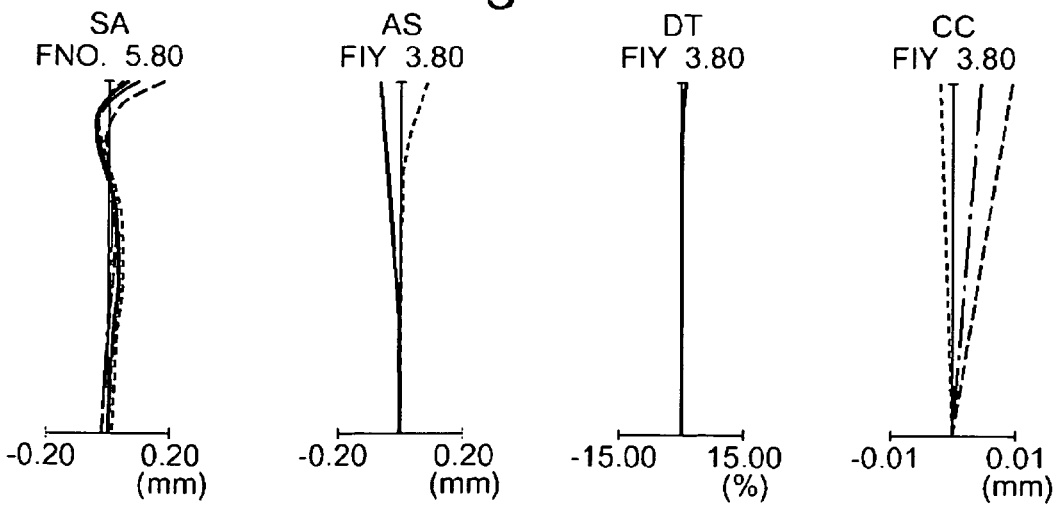
Figure 23A:
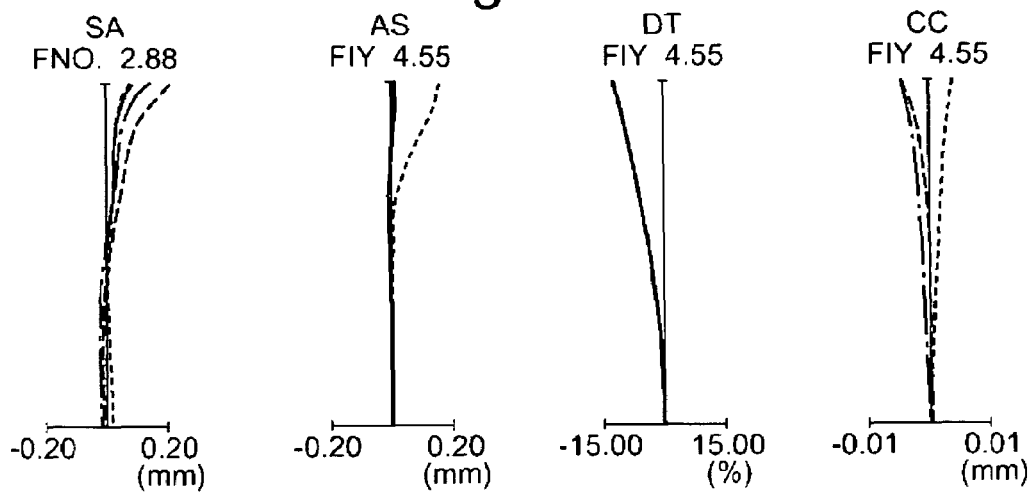
FIGS. 23A to 23C are aberration diagrams in the wide-angle end (FIG. 23A), the intermediate state (FIG. 23B) and the telephoto end (FIG. 23C) of Example 6 when focused on the infinite object.
Figure 23B:
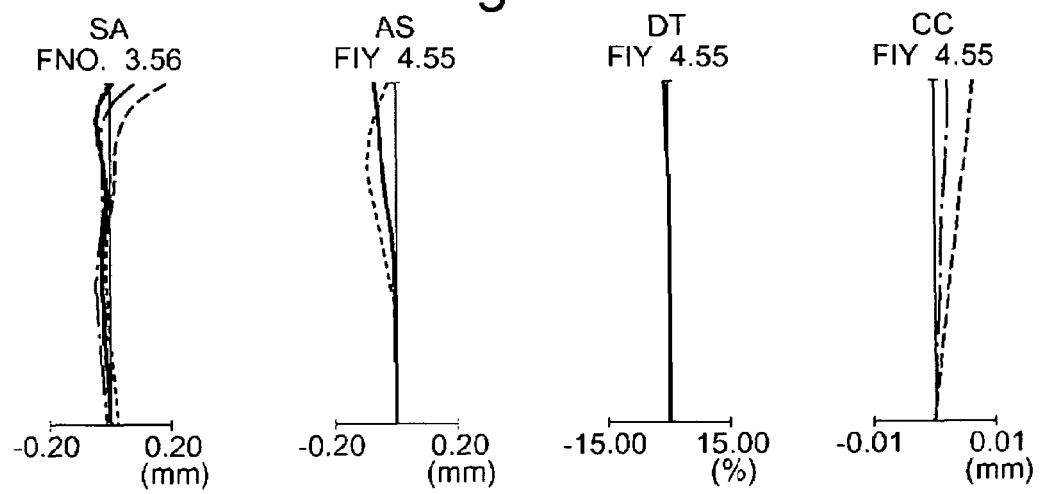
Figure 23C:
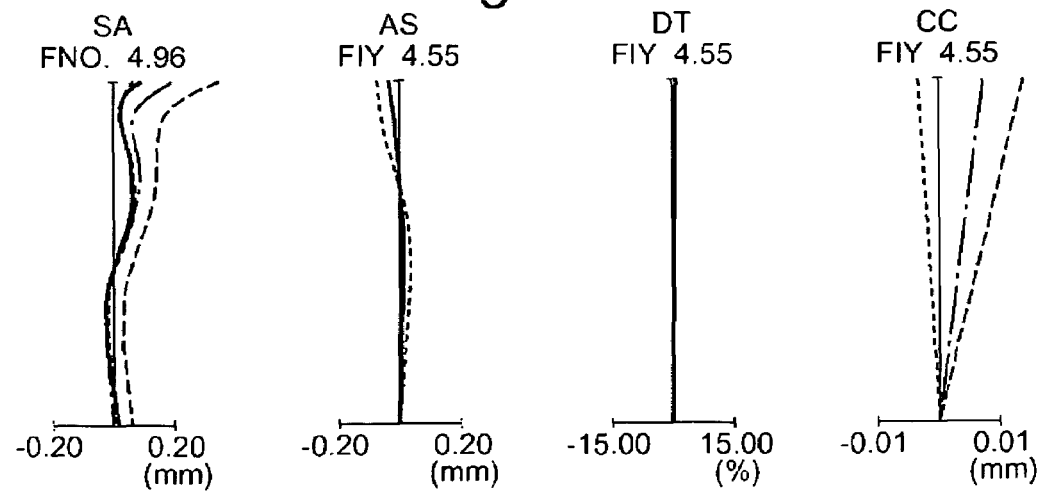
Figure 24A:
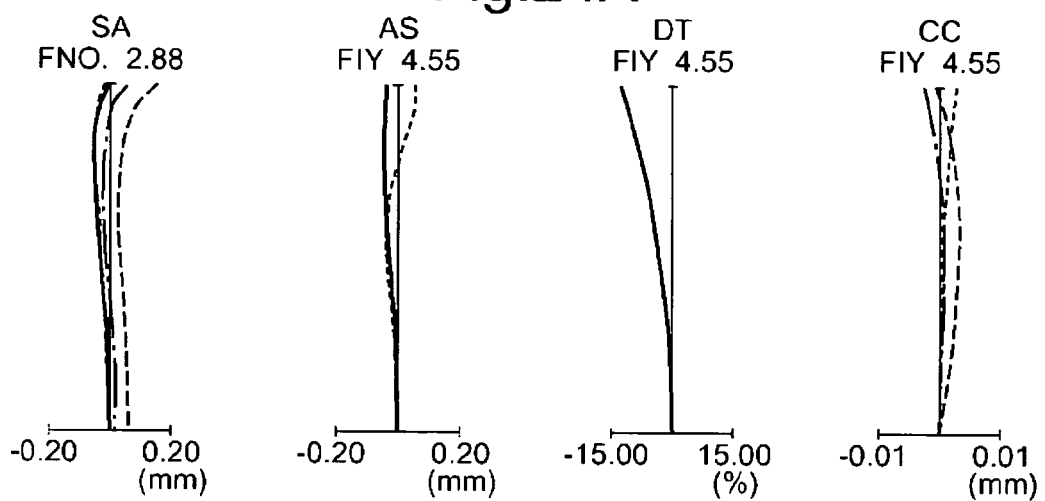
FIGS. 24A to 24C are aberration diagrams in the wide-angle end (FIG. 24A), the intermediate state (FIG. 24B) and the telephoto end (FIG. 24C) of Example 7 when focused on the infinite object.
Figure 24B:
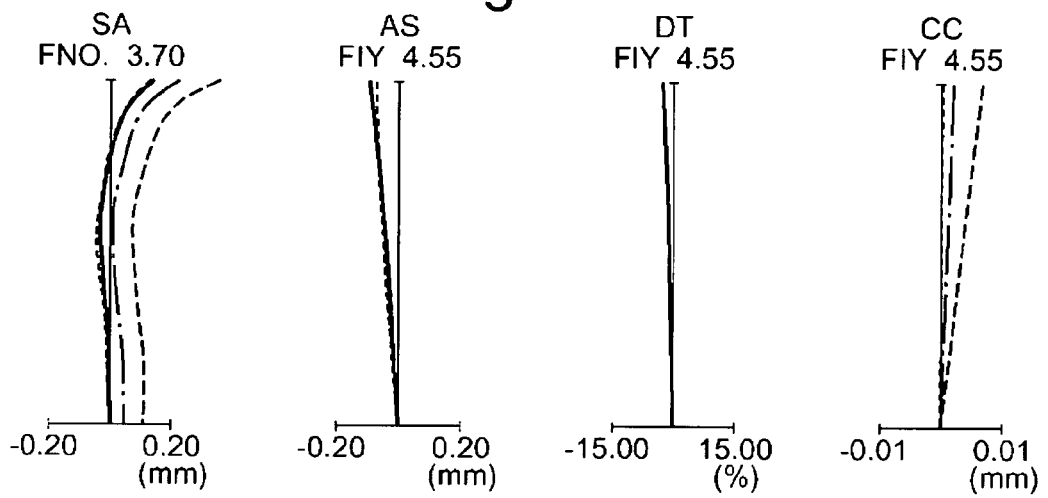
Figure 24C:
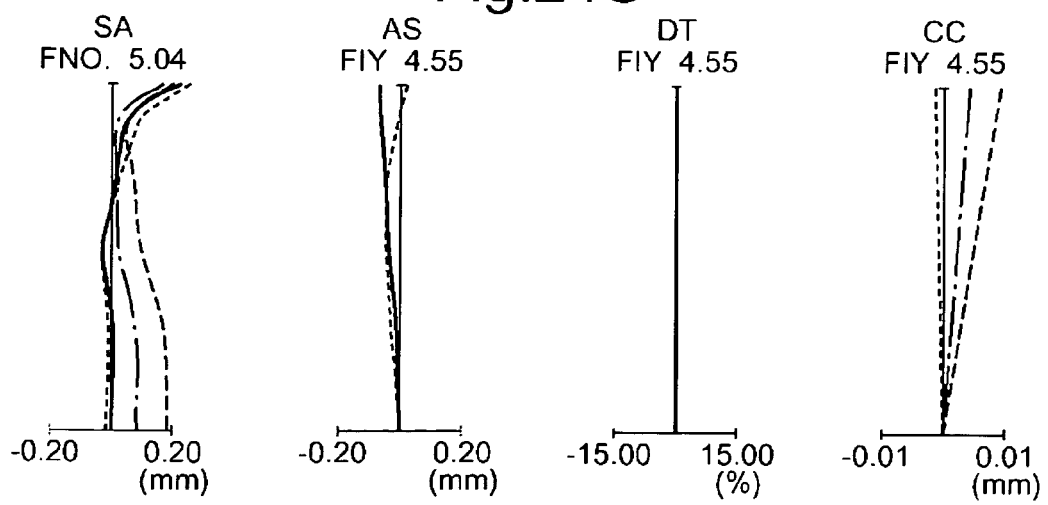
Figure 25A:
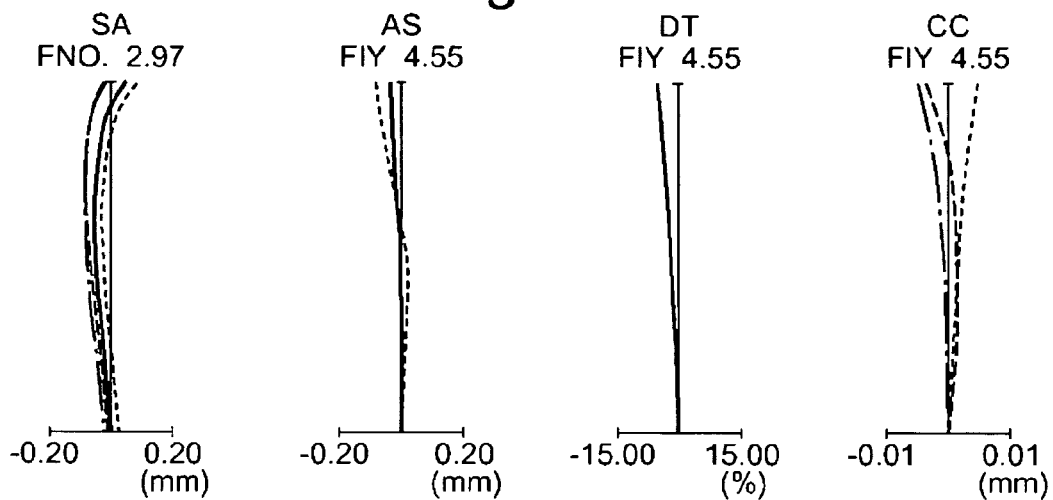
FIGS. 25A to 25C are aberration diagrams in the wide-angle end (FIG. 25A), the intermediate state (FIG. 25B) and the telephoto end (FIG. 25C) of Example 8 when focused on the infinite object.
Figure 25B:
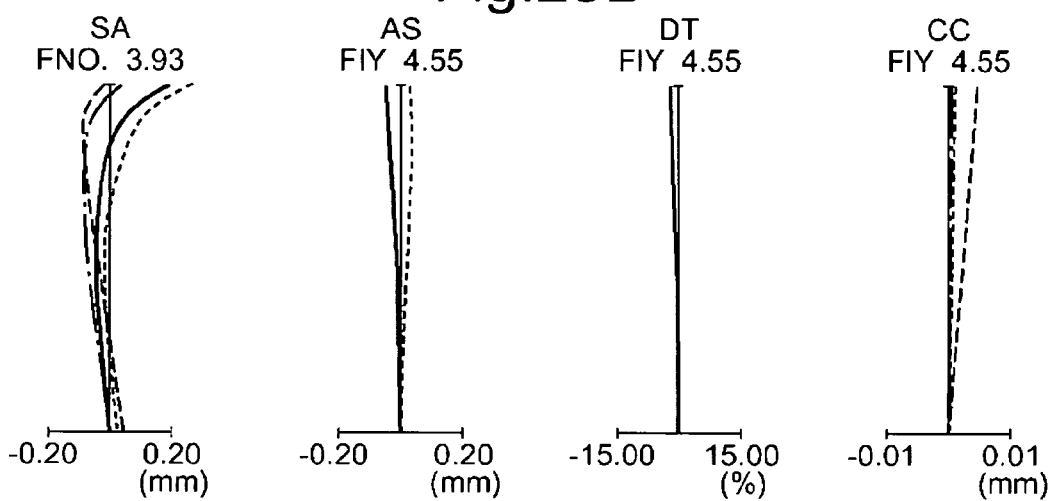
Figure 25C:
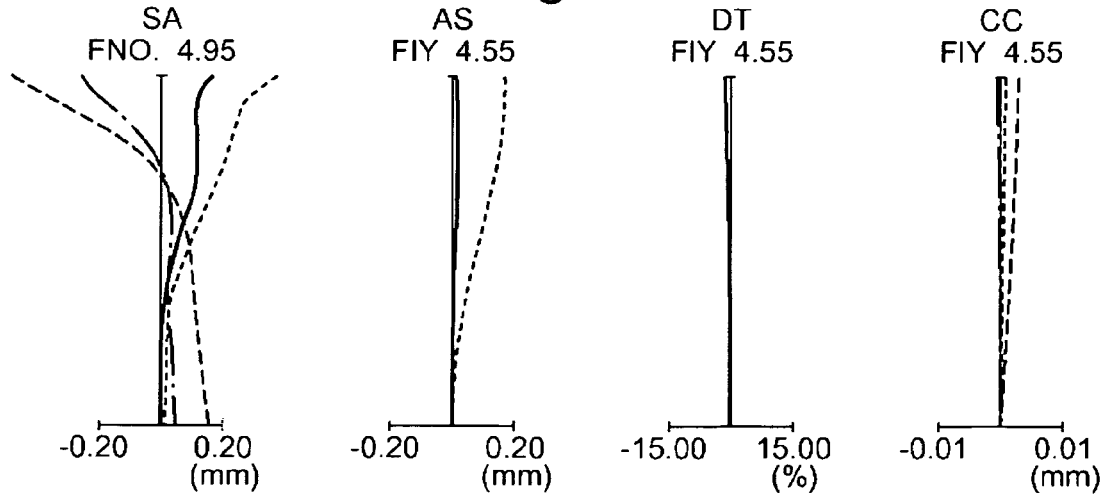
Figure 26A:
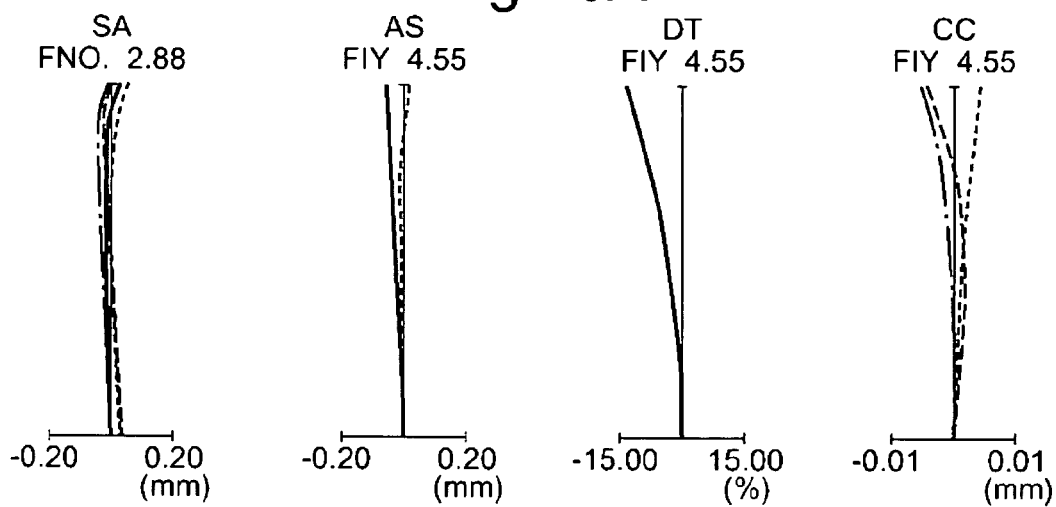
FIGS. 26A to 26C are aberration diagrams in the wide-angle end (FIG. 26A), the intermediate state (FIG. 26B) and the telephoto end (FIG. 26C) of Example 9 when focused on the infinite object.
Figure 26B:
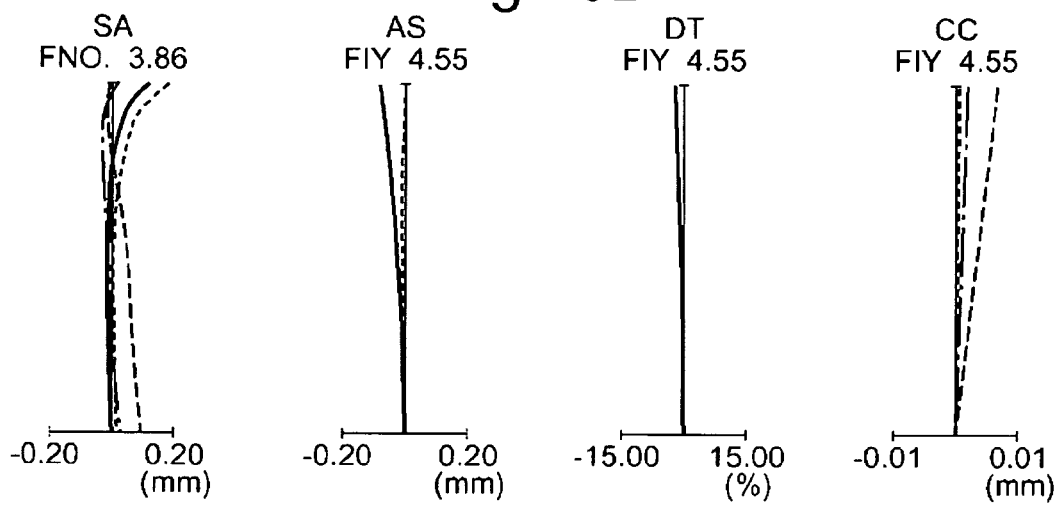
Figure 26C:
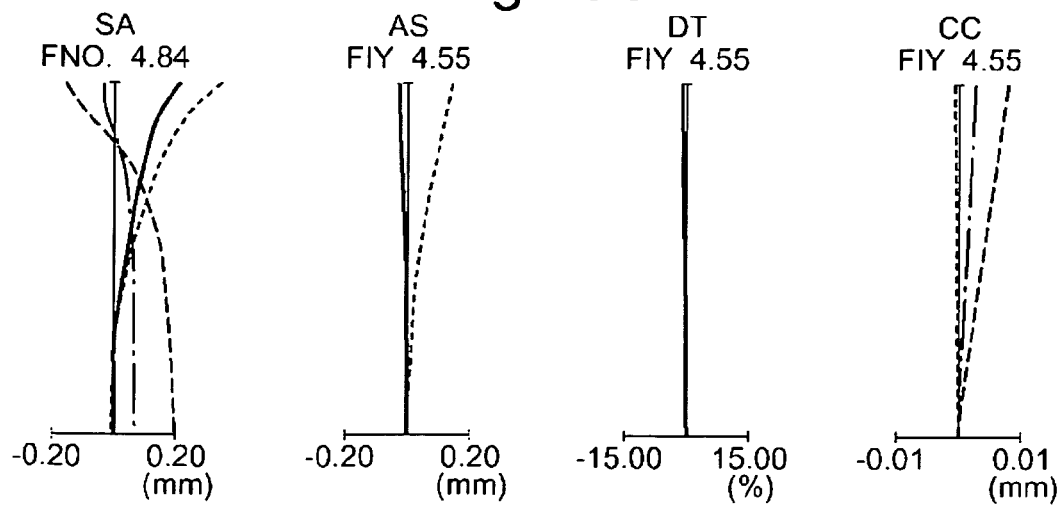
Figure 27A:
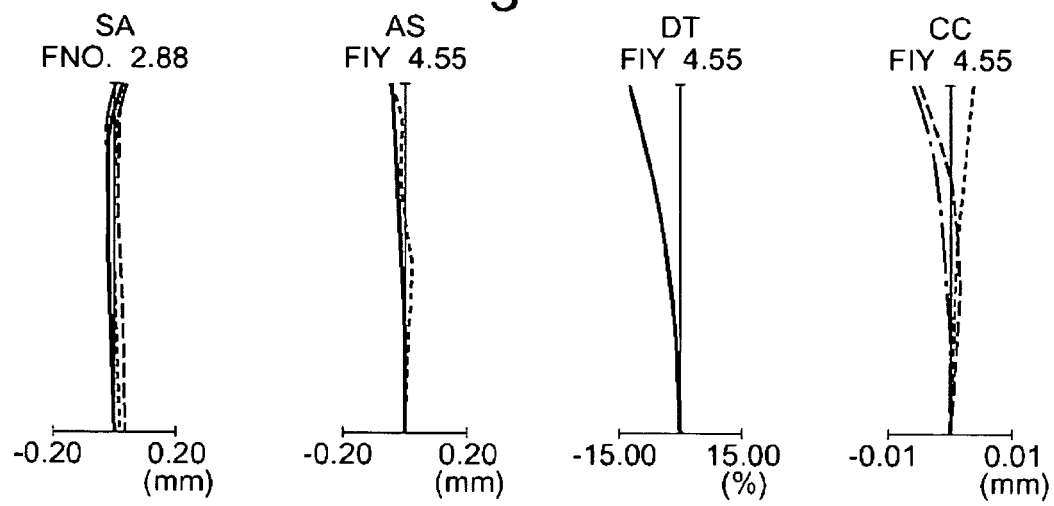
FIGS. 27A to 27C are aberration diagrams in the wide-angle end (FIG. 27A), the intermediate state (FIG. 27B) and the telephoto end (FIG. 27C) of Example 10 when focused on the infinite object.
Figure 27B:
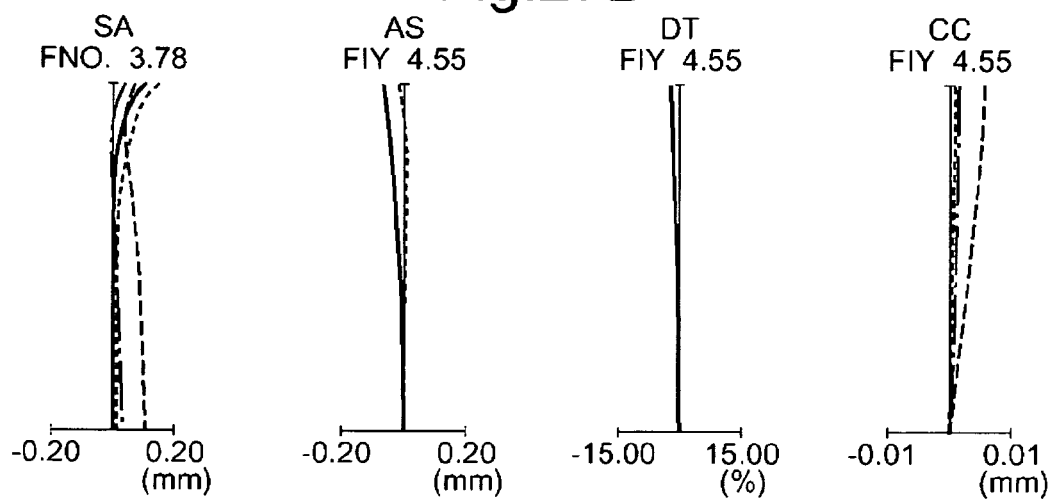
Figure 27C:
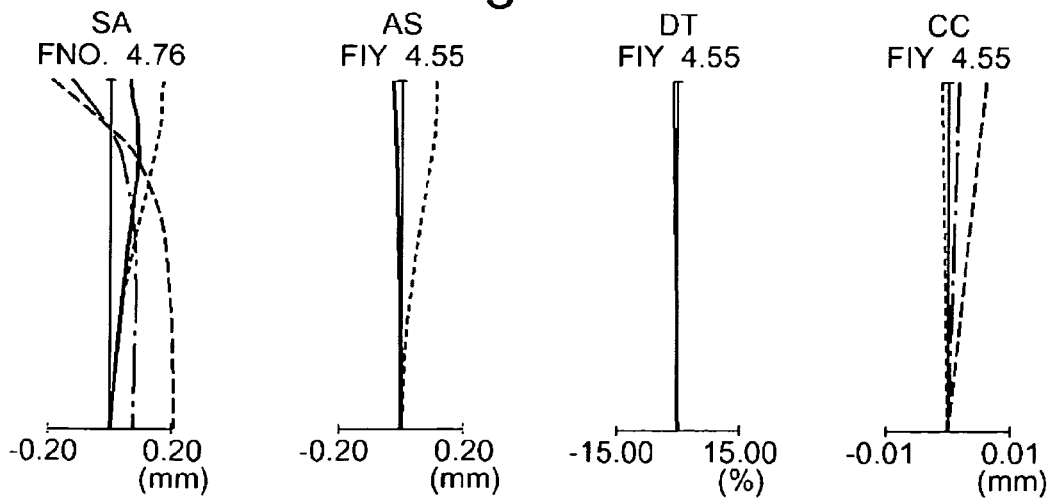
Figure 28A:
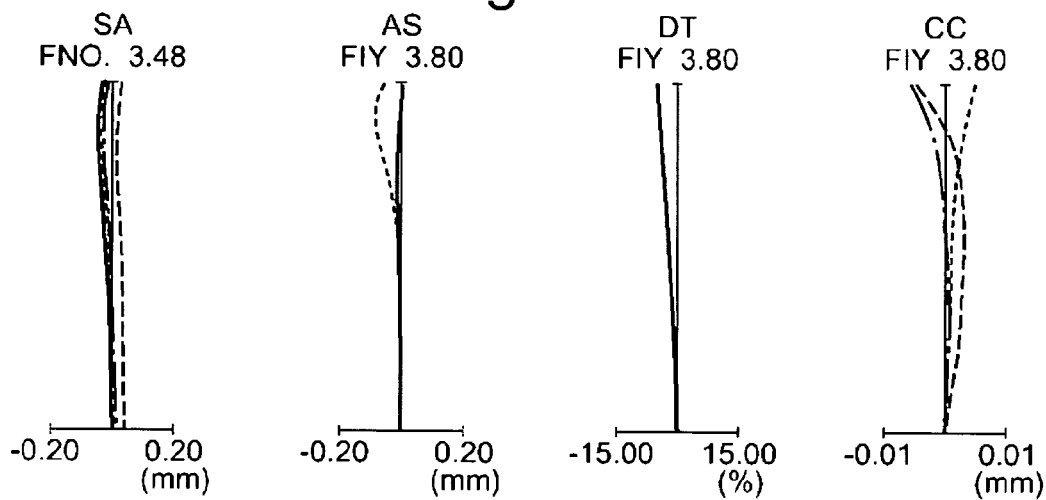
FIGS. 28A to 28C are aberration diagrams in the wide-angle end (FIG. 28A), the intermediate state (FIG. 28B) and the telephoto end (FIG. 28C) of Example 11 when focused on the infinite object.
Figure 28B:
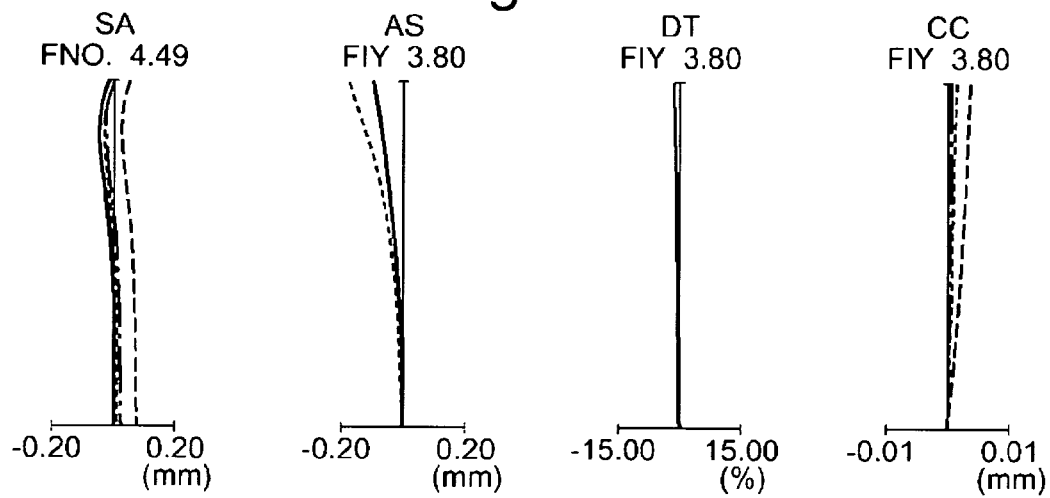
Figure 28C:
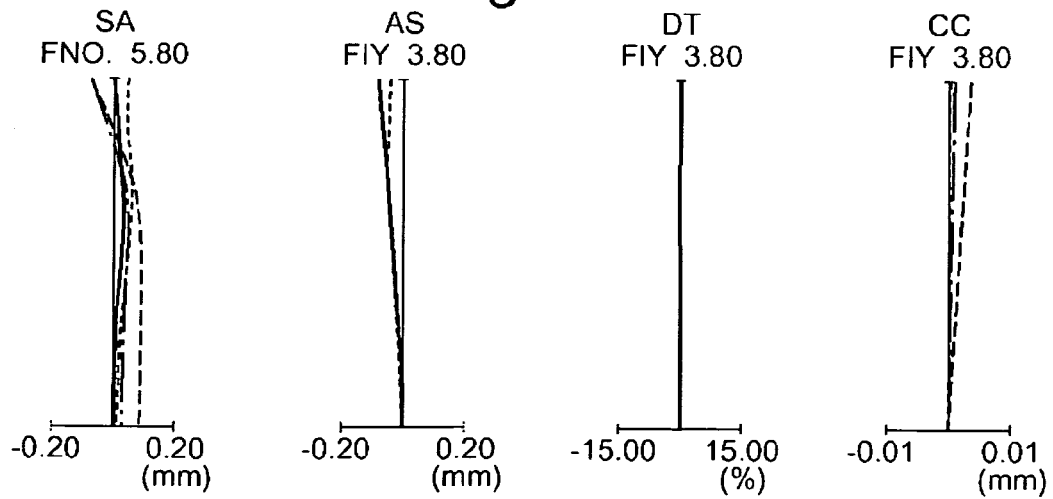
Figure 31A:
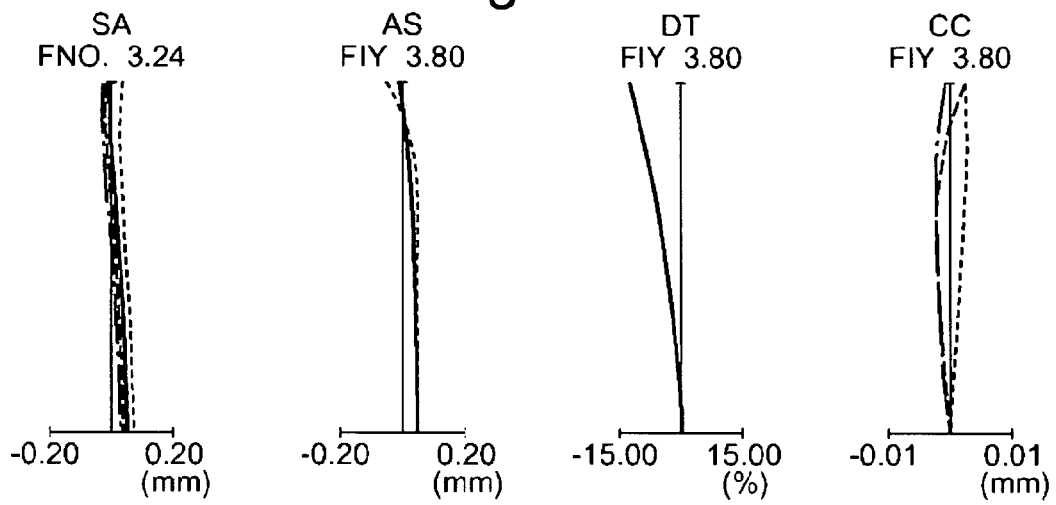
FIGS. 31A to 31C are aberration diagrams in the wide-angle end (FIG. 31A), the intermediate state (FIG. 31B) and the telephoto end (FIG. 31C) of Example 14 when focused on the infinite object.
Figure 31B:
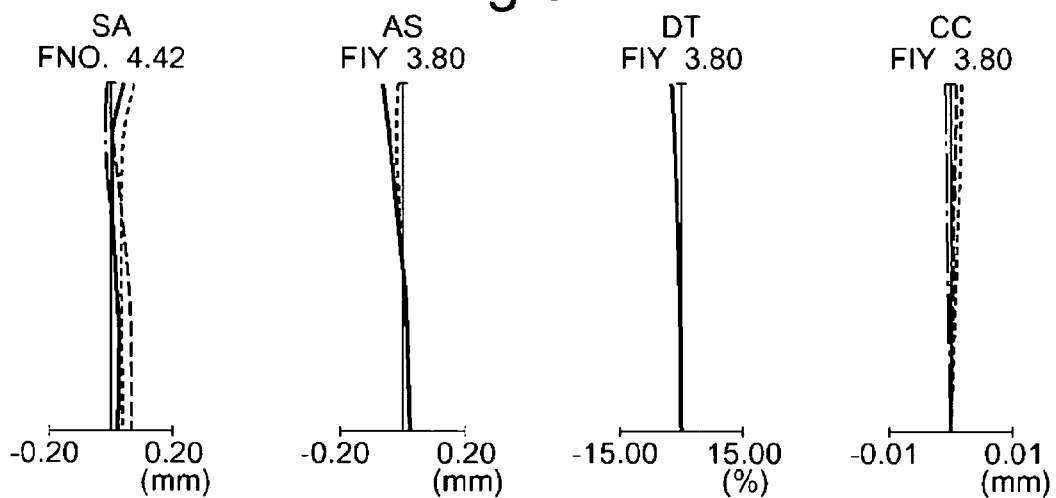
Figure 31C:
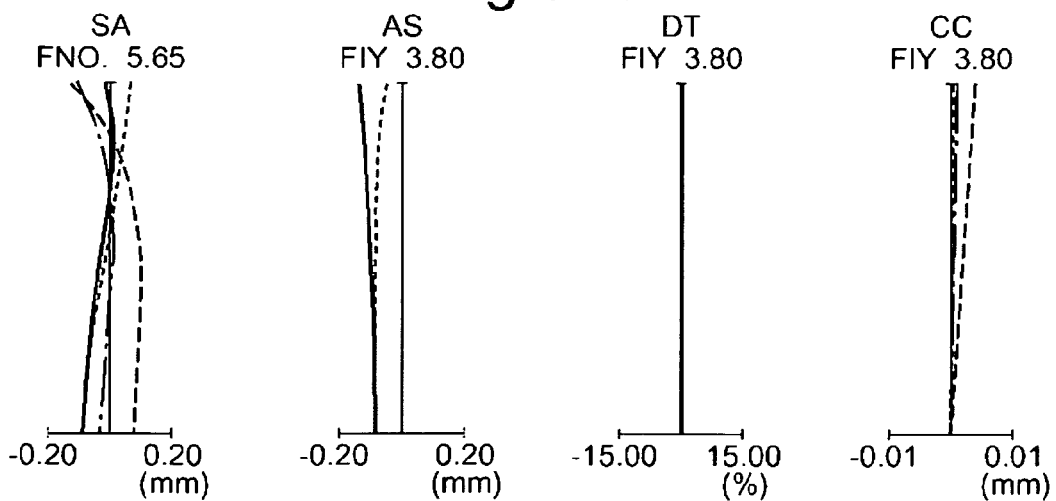
Figure 32A:
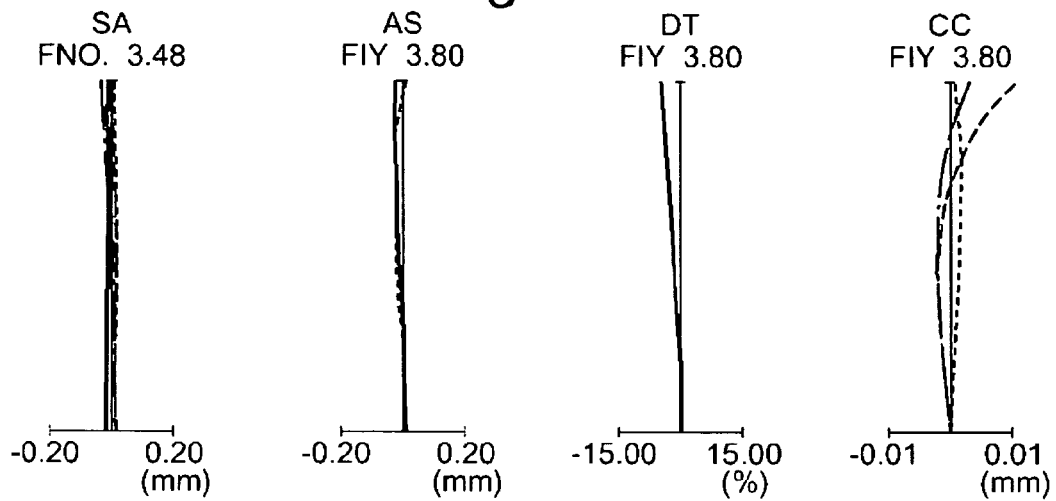
FIGS. 32A to 32C are aberration diagrams in the wide-angle end (FIG. 32A), the intermediate state (FIG. 32B) and the telephoto end (FIG. 32C) of Example 15 when focused on the infinite object.
Figure 32B:
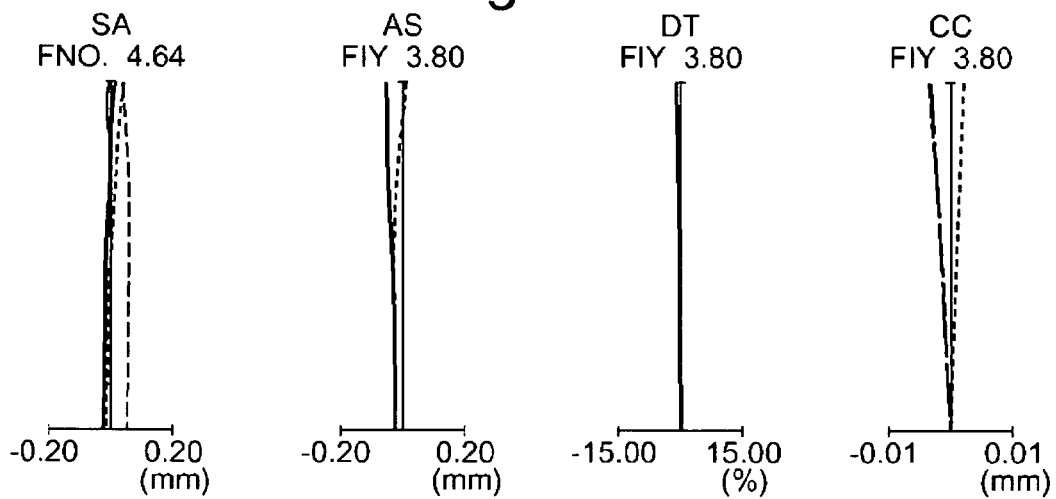
Figure 32C:
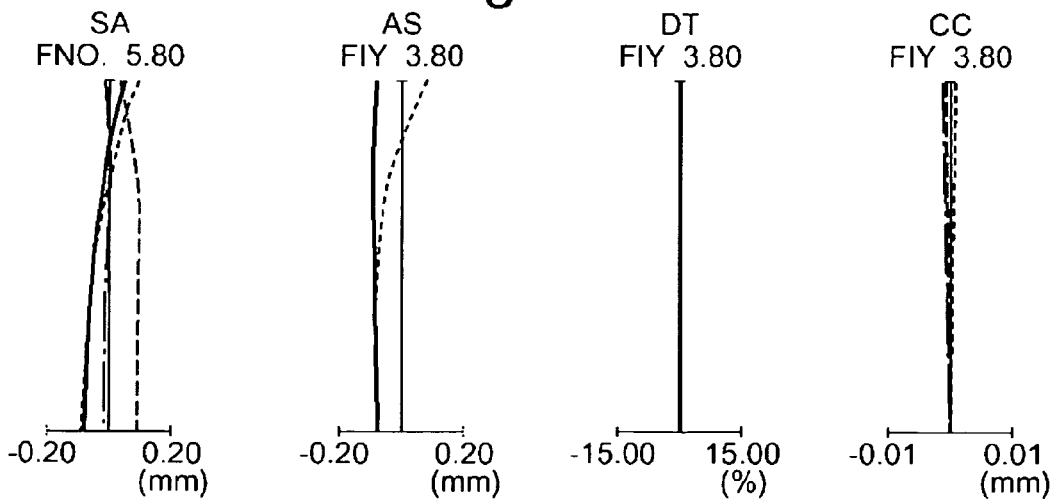
Figure 33A:
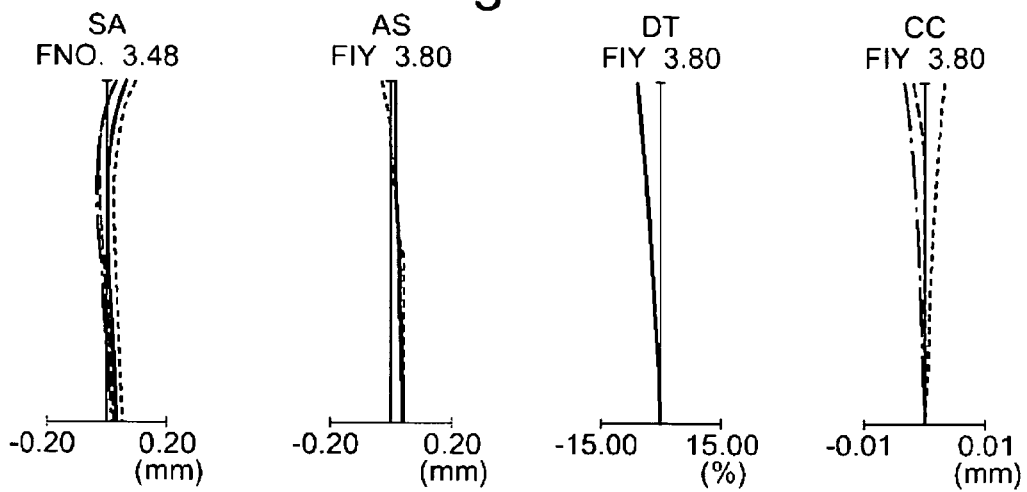
FIGS. 33A to 33C are aberration diagrams in the wide-angle end (FIG. 33A), the intermediate state (FIG. 33B) and the telephoto end (FIG. 33C) of Example 16 when focused on the infinite object.
Figure 33B:
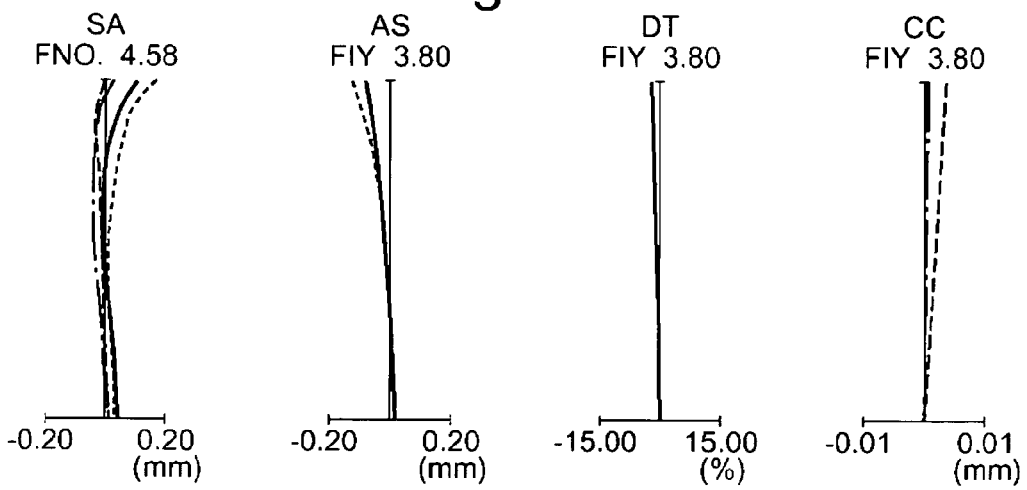
Figure 33C:
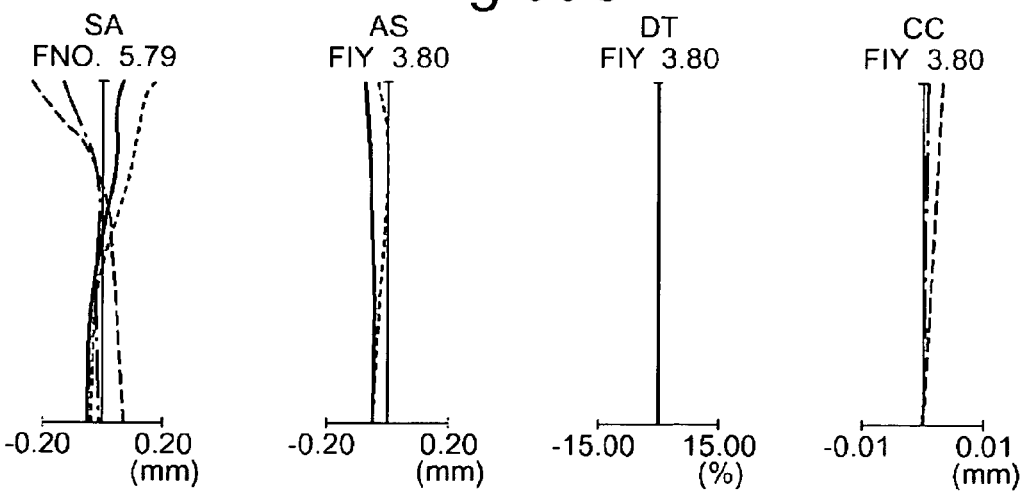
Figure 34A:
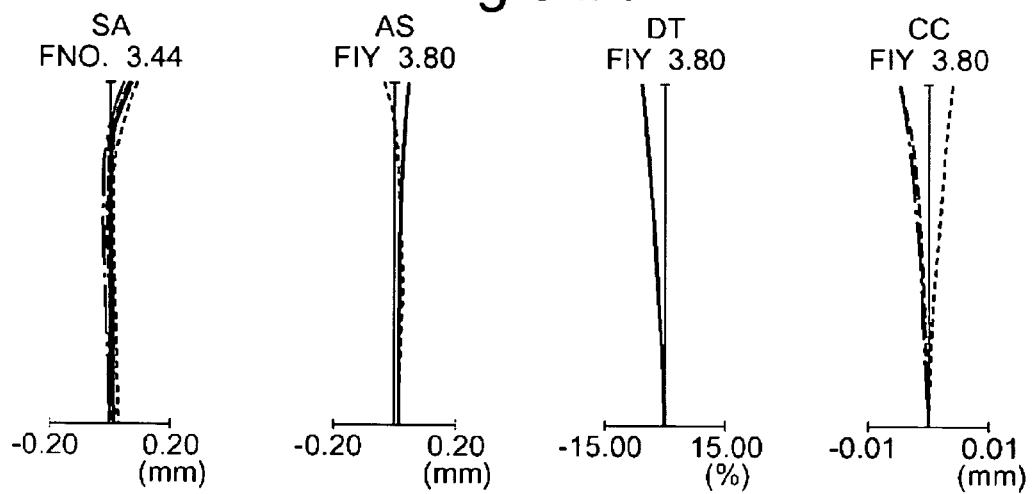
FIGS. 34A to 34C are aberration diagrams in the wide-angle end (FIG. 34A), the intermediate state (FIG. 34B) and the telephoto end (FIG. 34C) of Example 17 when focused on the infinite object.
Figure 34B:
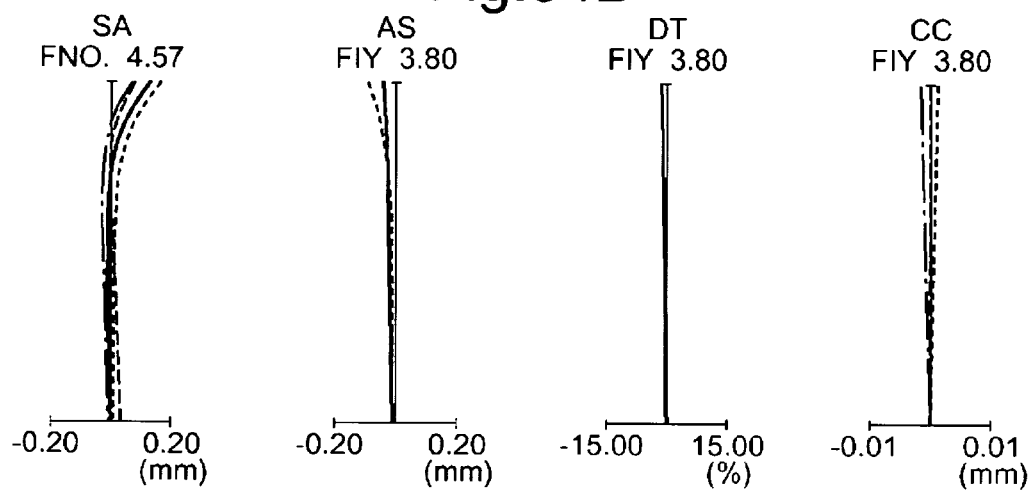
Figure 34C:
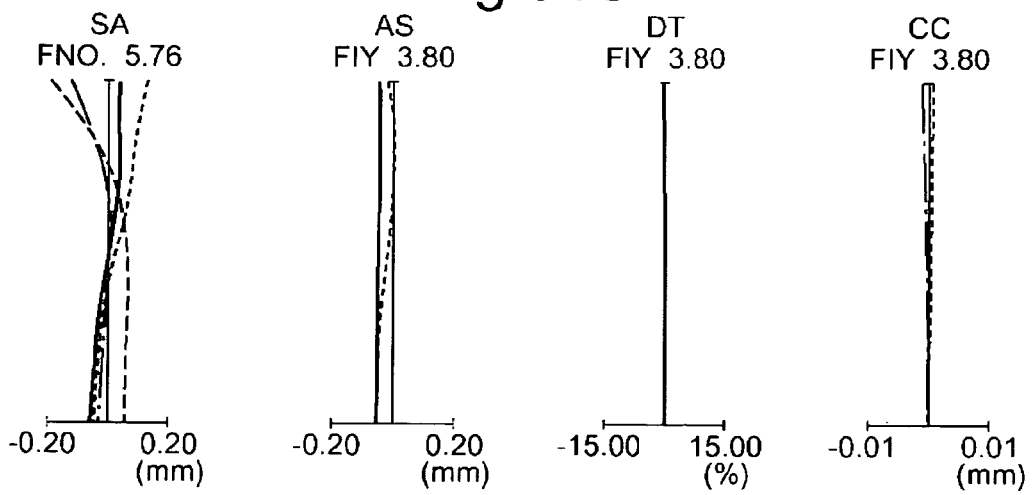

FIGS. 18A to 34C show aberration diagrams of Examples 1 to 17 described above when the zoom lens systems are focused on an infinite object. In these aberration diagrams, FIGS. 18A, 19A, 20A, ... show a spherical aberration SA, an astigmatism AS, a distortion DT and a chromatic aberration CC of magnification in the wide-angle end, FIGS. 18B, 19B, 20B, ... show them in the intermediate state, and FIGS. 18C, 19C, 20C ... show them in the telephoto end. In the drawings, "FIY" is the maximum image height.

Next, there will be described parameter values concerning the conditions, lens types and the like of each of the above examples. In the following tables, N-P-N in the line "unit type" indicates that the zoom lens system is constituted of, in order from the object side, the negative first lens unit, the positive second lens unit and the negative third lens unit. For example, P-N-P in the line "cemented lens in the second lens unit" indicates that the cemented lens of the second lens unit is constituted by bonding the positive lens, the negative lens and the positive lens in order from the object side.

TABLE 35-1

| Condition · refractive power layout | Example 1 | Example 2 | Example 3 | Example 4 | Example 5 | Example 6 |
|---|---|---|---|---|---|---|
| (1A) | 0.495 | 0.507 | 0.471 | 0.557 | 0.508 | 0.521 |
| (2A) | 0.18 | 0.22 | 0.02 | 0.15 | 0.07 | 0.04 |
| (3A) | 1.33 | 1.60 | 1.44 | 1.31 | 1.26 | 1.21 |
| (4A) | — | — | — | — | — | — |
| (5A) | 1.84 | 5.18 | 2.11 | 3.83 | 2.76 | 2.33 |
| (6A) | — | — | — | — | — | — |
| (7A) | 0.041 | 0.044 | 0.050 | 0.041 | 0.041 | 0.034 |
| (9A) | 2.89 | 2.90 | 2.91 | 2.90 | 2.90 | 2.88 |
| (8A-1) | — | — | — | — | — | — |
| (8A-2) | −3.15 | −1.26 | −2.22 | −0.95 | −1.76 | −1.71 |
| Unit type | N-P-N | N-P-N | N-P-N | N-P-N | N-P-N | N-P-N |
| Cemented lens in the second lens unit | P-N-P | P-N | P-N-P | P-N-P | P-N-N | P-N-N |

TABLE 35-2

| Condition · refractive power layout | Example 7 | Example 8 | Example 9 | Example 10 | Example 11 | Example 12 |
|---|---|---|---|---|---|---|
| (1A) | 0.505 | 0.481 | 0.496 | 0.487 | 0.427 | 0.476 |
| (2A) | 0.15 | 0.21 | 0.04 | 0.06 | 0.00 | 0.33 |
| (3A) | 1.42 | 1.62 | 1.60 | 1.55 | 1.62 | 1.58 |
| (4A) | — | 3.41 | 6.29 | 5.30 | 6.09 | 4.22 |
| (5A) | 4.41 | — | — | — | — | — |
| (6A) | — | 0.066 | 0.057 | 0.057 | 0.062 | 0.076 |
| (7A) | 0.034 | — | — | — | — | — |
| (9A) | 2.88 | 2.89 | 2.88 | 2.88 | 2.90 | 2.87 |
| (8A-1) | — | 0.94 | 0.65 | 0.71 | 0.67 | 0.81 |
| (8A-2) | −1.25 | — | — | — | — | — |
| Unit type | N-P-N | N-P-P | N-P-P | N-P-P | N-P-P | N-P-P |
| Cemented lens in the second lens unit | P-N-P | P-N-P | P-N-P | P-N-P | P-N-P | P-N-P |

TABLE 35-3

| Condition · refractive power layout | Example 13 | Example 14 | Example 15 | Example 16 | Example 17 |
|---|---|---|---|---|---|
| (1A) | 0.473 | 0.511 | 0.410 | 0.435 | 0.437 |
| (2A) | 0.41 | 0.00 | 0.10 | 0.12 | 0.12 |
| (3A) | 1.63 | 1.67 | 1.52 | 1.56 | 1.58 |
| (4A) | 3.71 | 13.10 | 4.54 | 3.78 | 3.78 |
| (5A) | — | — | — | — | — |
| (6A) | 0.071 | 0.061 | 0.063 | 0.063 | 0.063 |
| (7A) | — | — | — | — | — |
| (9A) | 2.88 | 2.89 | 2.89 | 2.89 | 2.89 |
| (8A-1) | 0.88 | 0.37 | 0.79 | 0.88 | 0.88 |
| (8A-2) | — | — | — | — | — |
| Unit type | N-P-P | N-P-P | N-P-P | N-P-P | N-P-P |
| Cemented lens in the second lens unit | P-N-P | P-N-P | P-N-P | P-N-P | P-N-P |

The above zoom lens system is capable of securing an appropriate zoom ratio without bending the optical axis or diverting a part of lens units outwardly from the optical axis, and is advantageous to miniaturization and in securing an optical performance.

Moreover, since an incidence angle of a ray onto an image pickup surface is easily reduced, and an influence of color shading can be reduced, the zoom lens system is preferable for use in an image pickup apparatus including an image sensor.

Next, the second aspect of the present invention will be described.

As described above, in the second aspect, the zoom lens system of the present invention is a three-unit zoom lens system comprising, in order from an object side: a first lens unit having a negative refractive power; a second lens unit having a positive refractive power; and a third lens unit having a positive or negative refractive power, wherein a space between the first lens unit and the second lens unit is reduced during magnification change from the wide-angle end to a telephoto end, at least the second lens unit and the third lens unit move toward the only object side while changing a space between the second lens unit and the third lens unit, the third lens unit is moved in an optical-axis direction to perform focusing, and the following condition is satisfied, $$0.8 < \{d_W \cdot (2f_3 - d_W)\} / \{d_T \cdot (2f_3 - d_T)\} \cdot F_T/F_W < 1.1 \quad (1B),$$

wherein $d_W$ is a distance from an image-side surface of the third lens unit to an image surface along an optical axis when the zoom lens system is focused on the farthest object in the wide-angle end, $d_T$ is a distance from the image-side surface of the third lens unit to the image surface along the optical axis when the zoom lens system is focused on the farthest object in the telephoto end, $F_W$ is the F-number during a focusing operation of the zoom lens system in the wide-angle end, $F_T$ is the F-number during the focusing operation of the zoom lens system in the telephoto end, and $f_3$ is a focal length of the third lens unit.

The above mentioned refractive power layout is suitable for securing a wide angle of field.

Moreover, in the mode of movement of the lens units for the magnification change described above, the second lens unit can be provided with a main magnification change function.

Furthermore, in a case where the third lens unit moves toward the only object side during the magnification change from the wide-angle end to the telephoto end, the ray height in the third lens unit is reduced as compared with the case where the third lens unit does not move or moves toward the image side during the magnification change. In consequence, the size of the third lens unit in a diametrical direction can be reduced.

In addition, since the focusing sensitivity of the third lens unit increases in the telephoto end, the refractive power of the third lens unit can be weakened. In consequence, the constitution is advantageous in reducing the thickness of each lens, and contributes to the thinning of the lens barrel when collapsed.

It is preferable that the position and the focal length of the third lens unit and the F-number during the focusing operation are set so as to satisfy the above described condition (1B). The condition (1B) is set in order to achieve a small-sized zoom lens system which performs a fast focusing operation in view of changes of the focusing sensitivity and the depth of focus in the wide-angle end and the telephoto end.

$$0.8 < \{d_W \cdot (2f_3 - d_W)\} / \{d_T \cdot (2f_3 - d_T)\} \cdot F_T/F_W < 1.1 \quad (1B),$$

wherein $d_W$ is the distance from the image-side surface of the third lens unit to the image surface along the optical axis when the zoom lens system is focused on the farthest object in the wide-angle end, $d_T$ is the distance from the image-side surface of the third lens unit to the image surface along the optical axis when the zoom lens system is focused on the farthest object in the telephoto end, $F_W$ is the F-number during the focusing operation of the zoom lens system in the wide-angle end, $F_T$ is the F-number during the focusing operation of the zoom lens system in the telephoto end, and $f_3$ is the focal length of the third lens unit.

The portion "$\{(d_W \cdot (2f_3 - d_W))/(d_T \cdot (2f_3 - d_T))\}$" of the above condition substantially agrees with the focusing sensitivity in the wide-angle end with respect to the focusing sensitivity in the telephoto end of the third lens unit which is a focusing unit. Moreover, "$F_T/F_W$" is a ratio of the F-number during the focusing operation in the telephoto end with respect to the F-number during the focusing operation in the wide-angle end. That is, this condition means that the focal length and the position of the third lens unit as the focusing unit are determined in accordance with a change of the F-number in the wide-angle end and the telephoto end. Alternatively, it means that the F-number during the focusing operation is adjusted in accordance with the change of the F-number in the wide-angle end and the telephoto end. In consequence, it is possible to reduce the difference between the degree of the change of MTF due to the movement of the third lens unit in the wide-angle end and that in the telephoto end.

Such a setting is advantageous in a case where this zoom lens system is used as an image pickup optical system of an image pickup apparatus using a focus detecting method of measuring the change of the MTF of an object image obtained while moving the focusing lens to detect whether or not focusing is correctly performed. That is, as described above, in this zoom lens system, the degree of the change of the MTF at a time when the third lens unit as the focusing lens moves as much as a unit amount does not largely differ in the telephoto end and the wide-angle end. Therefore, the number of times to measure the change amount of the MTF with the movement of the third lens unit in the wide-angle end is brought close to the number of the times in the telephoto end, and there is suppressed a drop in a focusing speed due to the excessively large number of the measurement times in either the wide-angle end or the telephoto end.

Below the lower limit of 0.8 in the condition (1B), in the wide-angle end, the change of the MTF becomes small with respect to the movement amount of the third lens unit. In order to detect the contrast peak, the third lens unit has to be moved largely until the change of the MTF becomes clearly recognizable. Therefore, the focusing speed drops.

Above the upper limit of 1.1 in the condition (1B), in the telephoto end, the change of the MTF is reduced with respect to the movement amount of the third lens unit. In order to detect the contrast peak, the third lens unit has to be moved largely until the change of the MTF becomes clearly recognizable. Therefore, the focusing speed drops.

Moreover, to accelerate the focusing operation, it is more preferable that the lower limit value or the upper limit value of the above condition (1B) is further restricted.

It is more preferable that the condition (1B) is modified as in, for example, the following condition (1B-1), $$0.82 < \{d_W(2f_3 - d_W)\}/\{d_T(2f_3 - d_T)\} \cdot F_T/F_W < 1.0 \quad (1\text{B-}1).$$

Above the lower limit of 0.82 of the condition (1B-1), the focusing operation in the wide-angle end becomes fast. Below the upper limit of 1.0 of the condition (1B-1), brightness during the focusing operation in the telephoto end is secured and the movement amount of the third lens unit is easily suppressed. This is preferable for miniaturization.

Moreover, the larger the quantity of light is, the more satisfactory the focusing precision becomes. Therefore, the above focusing operation is more preferably performed in the full aperture state.

Furthermore, it is preferable that the zoom lens system has an aperture stop, an intersection between an aperture of the aperture stop and the optical axis is positioned between the vertex of the surface of the second lens unit closest to the object side and the vertex of the surface of the second lens unit closest to the image side, and the second lens unit satisfies the following condition:

$$0.15 < \Sigma d_{2G}/f_T < 0.3 \quad (2\text{B}),$$

wherein $\Sigma d_{2G}$ is a distance between the vertex of the surface of the second lens unit closest to the object side and the vertex of the surface of the second lens unit closest to the image side, and $f_T$ is a focal length of the zoom lens system focused on the farthest object in the telephoto end.

Such a constitution is advantageous in thinning the second lens unit including the aperture stop.

Above the lower limit of 0.15 of the condition (2B), a fluctuation of a curvature of field by a manufacturing error is preferably suppressed. Below the upper limit of 0.3 of the condition (2B), the thickness of the second lens unit is preferably suppressed, and a total length of the zoom lens system when collapsed is reduced.

Furthermore, it is preferable that the third lens unit is constituted of one lens, and the lens satisfies the following conditions:

$$Nd < 1.6 \quad (3\text{B});$$

and $$0.03 < \Sigma d_{3G}/f_T < 0.1 \quad (4\text{B}),$$

wherein Nd is a refractive index for the d-line of the lens of the third lens unit, $\Sigma d_{3G}$ is a distance between the vertex of the surface of the third lens unit closest to the object side and the vertex of the surface of the third lens unit closest to the image side, and $f_T$ is a focal length of the zoom lens system focused on the farthest object in the telephoto end.

When the lens unit movable for the focusing is lightened, a driving burden during the focusing can be reduced and it is preferable for securing a focusing speed.

When the refractive index is not above an upper limit of 1.6 of the condition (3B), the lens can be lightened.

When $\Sigma d_{3G}/f_T$ is not below the lower limit of 0.03 of condition (4B), the strength of the lens may be secured. When $\Sigma d_{3G}/f_T$ is not above the upper limit of 0.1 of condition (4B). the third lens unit may be lightened.

It is more preferable that the condition (3B) is further restricted and modified as follows:

$$Nd < 1.56 \quad (3\text{B-}1).$$

It is to be noted that when the third lens unit has a positive refractive power, the third lens unit may have a function to put the exit pupil away from the image surface, and the zoom lens system can be designed so as to easily suppress an influence of shading.

Moreover, when the third lens unit is moved to the only object side, the change of the exit pupil position during zooming can be reduced.

Furthermore, when the third lens unit has a negative refractive power, the zoom lens system can be constituted to be small with respect to the image surface size, and the constitution is therefore advantageous to miniaturization in a diametrical direction.

In addition, in this zoom lens system, it is preferable that the total number of lenses is set to seven or less, the zoom lens system is compact when collapsed, and the zoom ratio of 2.5 is secured.

As the zoom ratio becomes larger, the differences in the focusing sensitivity and the F-number easily become larger. Therefore, in the above-described zoom lens system, when the focusing sensitivity and the F-number are balanced based on the above-described way of thinking, a drop in focusing speed is preferably suppressed.

Moreover, when the above-described zoom lens system is used as the image pickup optical system of the image pickup apparatus, it is preferable to dispose an image sensor which converts an optical image formed by the zoom lens system into an electric signal on the image side of the zoom lens system.

Examples 18 to 23 of the zoom lens system will be described hereinafter.

FIGS. 35A to 39C are sectional views of Examples 18 to 22 each including an optical axis when the zoom lens system is focused on an infinite object. Among these drawings, FIGS. 35A, 36A . . . show sections in wide-angle ends, FIGS. 35B, 36B . . . show sections in intermediate states, and FIGS. 35C, 36C . . . show sections in telephoto ends, respectively. In the drawings, the first lens unit is denoted with G1, the aperture stop is denoted with S, the second lens unit is denoted with G2, the third lens unit is denoted with G3, a plane parallel plate which is a cover glass of an electronic image sensor (a CCD image sensor or a CMOS image sensor) is denoted with C, and an image surface is denoted with I. When these zoom lens systems are used as image pickup optical systems of image pickup apparatuses, the light receiving surface of each electronic image sensor is disposed on each image surface I. The surface of the cover glass C is coated with a multilayered thin film for restricting a wavelength region. It is to be noted that a low pass filter having an IR cut coating on the surface thereof may be disposed on an incidence side of the cover glass C, or the cover glass C may be provided with a low pass filter function.

Figure 35A:
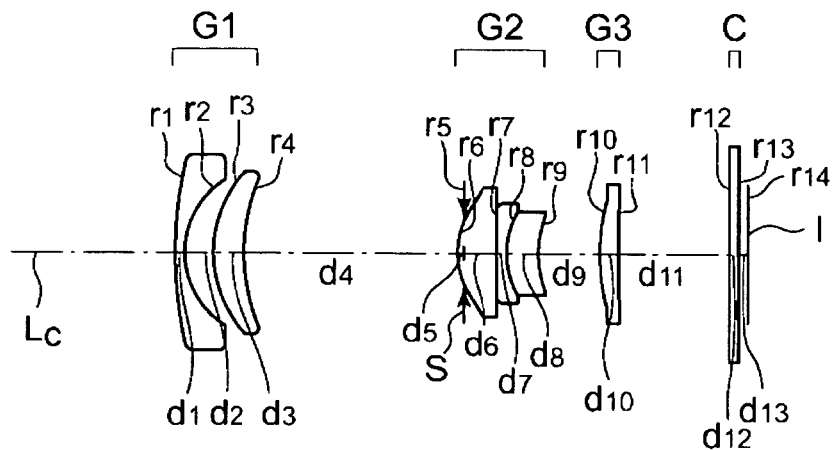
FIGS. 35A to 35C are sectional views in a wide-angle end (FIG. 35A), an intermediate state (FIG. 35B) and a telephoto end (FIG. 35C) of Example 18 when focused on an infinite object.
Figure 35B:
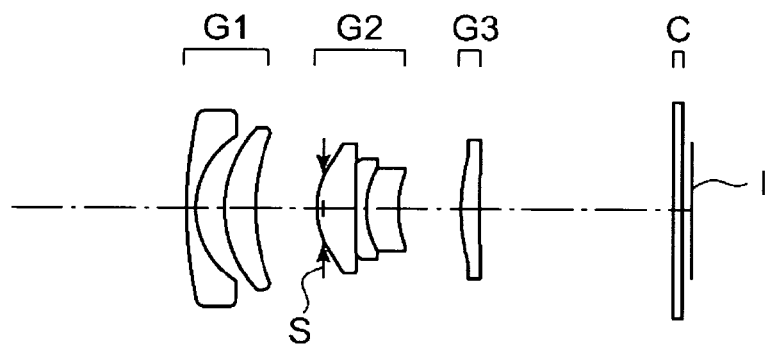
Figure 35C:
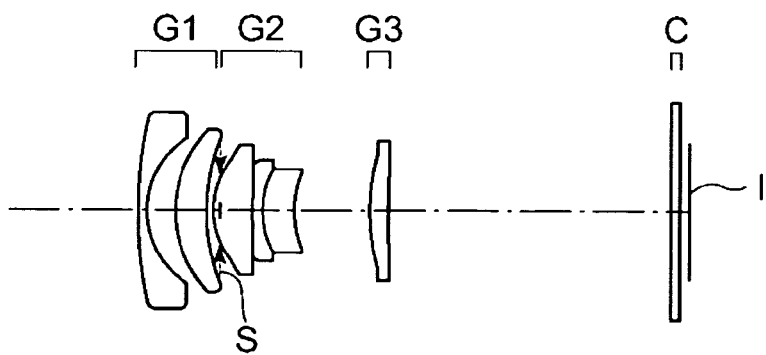

As shown in FIG. 35A, Example 18 is constituted of, in order from the object side, a first lens unit G1 having a negative refractive power, an aperture stop S, a second lens unit G2 having a positive refractive power and a third lens unit G3 having a positive refractive power. The aperture stop S is disposed on the image side of the vertex of the surface of the second lens unit G2 closest to the object side. When magnification change is performed from the wide-angle end to the telephoto end, the first lens unit G1 moves along a locus of movement convex toward the image side (concave toward the object side), and is arranged closer to the image side in the telephoto end than in the wide-angle end. The aperture stop S and the second lens unit G2 integrally monotonously moves toward the object side while reducing the space between the second lens unit and the first lens unit G1. The third lens unit G3 moves toward the object side so that the space between the third lens unit and the second lens unit G2 is substantially constant from the wide-angle end to the intermediate state, and slightly enlarges from the intermediate state to the telephoto end. In any zoom state, focusing is performed by moving the third lens unit G3 in an optical-axis direction.

The first lens unit G1 is constituted of, in order from the object side, a negative meniscus lens whose convex surface faces the object side and a positive meniscus lens whose convex surface faces the object side. The second lens unit G2 is constituted of a cemented triplet including, in order from the object side, a positive meniscus lens whose convex surface faces the object side, a negative meniscus lens whose convex surface faces the object side and a positive meniscus lens whose convex surface faces the object side. The third lens unit G3 is constituted of one positive meniscus lens whose convex surface faces the object side. The aperture stop S is positioned on the image side of the vertex of the surface of the cemented triplet of the second lens unit G2 closest to the object side.

Aspherical surfaces are used on four surfaces including the image-side surface of the negative meniscus lens of the first lens unit G1; the surfaces of the cemented triplet of the second lens unit G2 closest to the object side and the image side; and the object-side surface of the positive meniscus lens of the third lens unit G3.

Figure 36A:
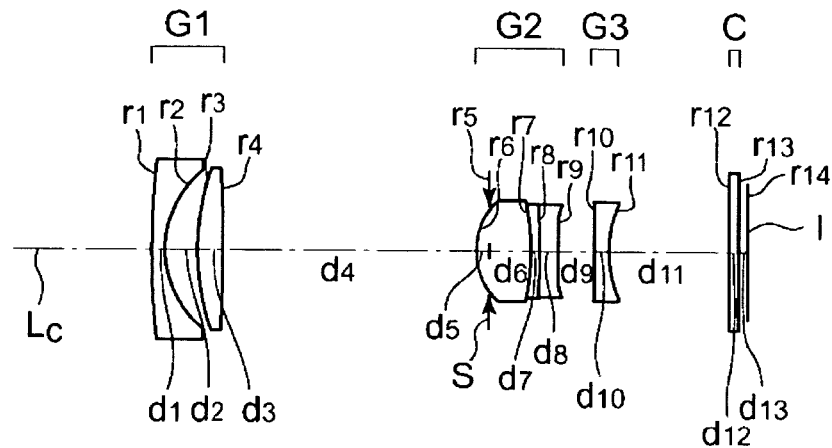
FIGS. 36A to 36C are sectional views in a wide-angle end (FIG. 36A), an intermediate state (FIG. 36B) and a telephoto end (FIG. 36C) of Example 19 when focused on an infinite object.
Figure 36B:
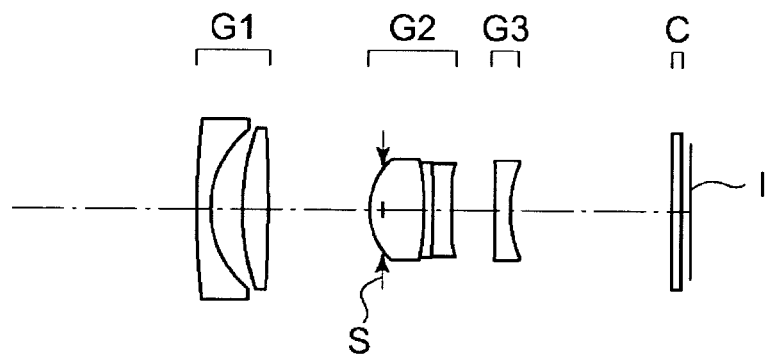
Figure 36C:
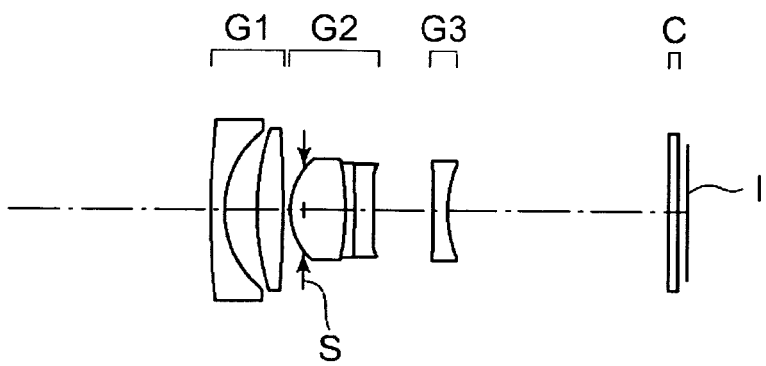

As shown in FIG. 36A, Example 19 is constituted of, in order from the object side, a first lens unit G1 having a negative refractive power, an aperture stop S, a second lens unit G2 having a positive refractive power and a third lens unit G3 having a negative refractive power. The aperture stop S is disposed on the image side of the vertex of the surface of the second lens unit G2 closest to the object side. When magnification change is performed from the wide-angle end to the telephoto end, the first lens unit G1 moves toward the image side, and the aperture stop S and the second lens unit G2 integrally monotonously moves toward the object side while reducing the space between the second lens unit and the first lens unit G1. The third lens unit G3 moves toward the object side while enlarging the space between the third lens unit and the second lens unit G2. In any zoom state, focusing is performed by moving the third lens unit G3 in an optical-axis direction.

The first lens unit G1 is constituted of, in order from the object side, a negative meniscus lens whose convex surface faces the object side and a positive meniscus lens whose convex surface faces the object side. The second lens unit G2 is constituted of a cemented triplet including, in order from the object side, a double-convex positive lens, a negative meniscus lens whose convex surface faces the image side and a positive meniscus lens whose convex surface faces the image side. The third lens unit G3 is constituted of one double-concave negative lens. The aperture stop S is positioned on the image side of the vertex of the surface of the cemented triplet of the second lens unit G2 closest to the object side.

Aspherical surfaces are used on six surfaces including opposite surfaces of the positive meniscus lens of the first lens unit G1; the surfaces of the cemented triplet of the second lens unit G2 closest to the object side and the image side; and opposite surfaces of the double-concave negative lens of the third lens unit G3.

Figure 37A:
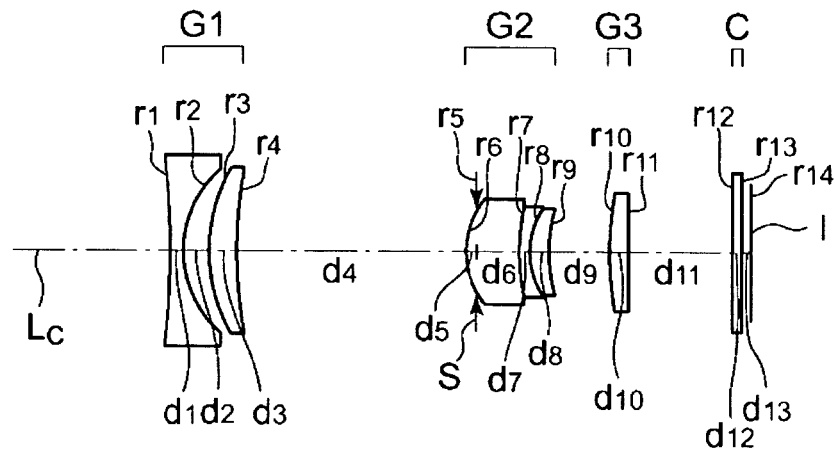
FIGS. 37A to 37C are sectional views in a wide-angle end (FIG. 37A), an intermediate state (FIG. 37B) and a telephoto end (FIG. 37C) of Example 20 when focused on an infinite object.
Figure 37B:
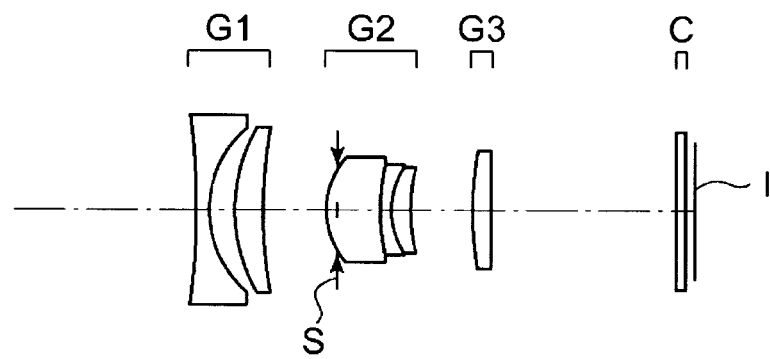
Figure 37C:
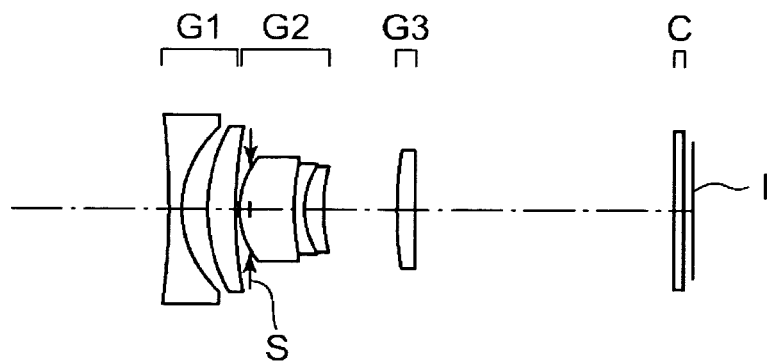

As shown in FIG. 37A, Example 20 is constituted of, in order from the object side, a first lens unit G1 having a negative refractive power, an aperture stop S, a second lens unit G2 having a positive refractive power and a third lens unit G3 having a positive refractive power. The aperture stop S is disposed on the image side of the vertex of the surface of the second tens unit G2 closest to the object side. When magnification change is performed from the wide-angle end to the telephoto end, the first lens unit G1 moves along a locus of movement convex toward the image side, and is arranged closer to the image side in the telephoto end than in the wide-angle end. The aperture stop S and the second lens unit G2 integrally monotonously moves toward the object side while reducing the space between the second lens unit and the first lens unit G1. The third lens unit G3 moves toward the object side while enlarging the space between the third lens unit and the second lens unit G2. In any zoom state, focusing is performed by moving the third lens unit G3 in an optical-axis direction.

The first lens unit G1 is constituted of, in order from the object side, a double-concave negative lens and a positive meniscus lens whose convex surface faces the object side. The second lens unit G2 is constituted of a cemented triplet including, in order from the object side, a positive meniscus lens whose convex surface faces the object side, a negative meniscus lens whose convex surface faces the object side and a positive meniscus lens whose convex surface faces the object side. The third lens unit G3 is constituted of one positive meniscus lens whose convex surface faces the object side. The aperture stop S is positioned on the image side of the vertex of the surface of the cemented triplet of the second lens unit G2 closest to the object side.

Aspherical surfaces are used on four surfaces including the image-side surface of the double-concave negative lens of the first lens unit G1; the surfaces of the cemented triplet of the second lens unit G2 closest to the object side and the image side; and the object-side surface of the positive meniscus lens of the third lens unit G3.

Figure 38A:
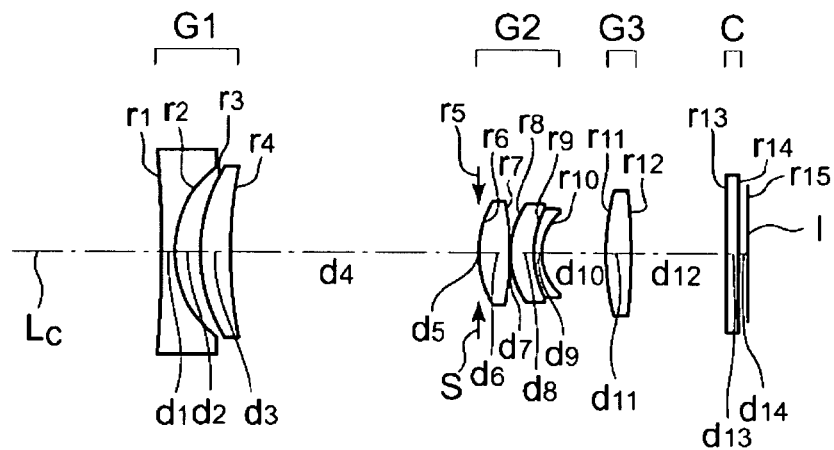
FIGS. 38A to 38C are sectional views in a wide-angle end (FIG. 38A), an intermediate state (FIG. 38B) and a telephoto end (FIG. 38C) of Example 21 when focused on an infinite object.
Figure 38B:
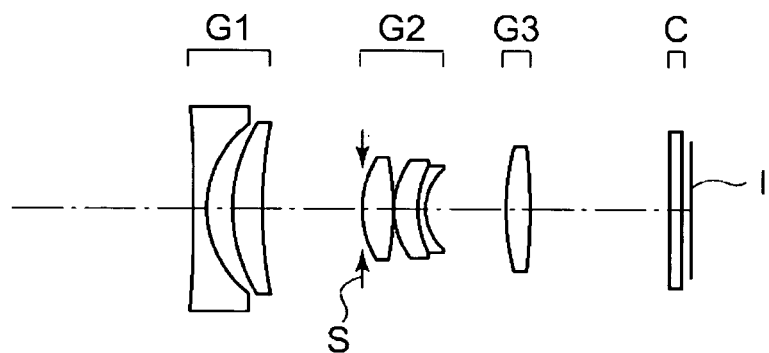
Figure 38C:
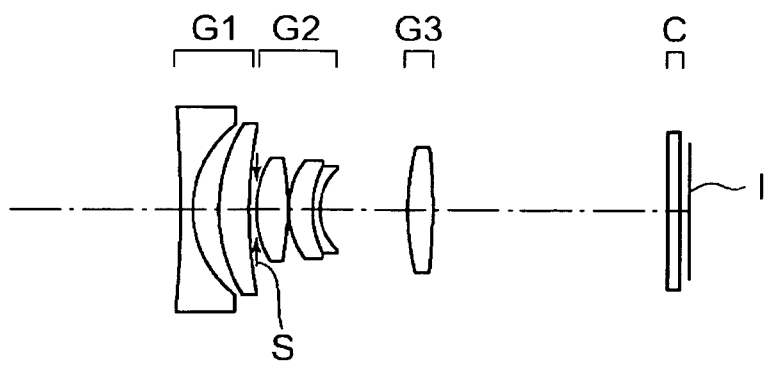

As shown in FIG. 38A, Example 21 is constituted of, in order from the object side, a first lens unit G1 having a negative refractive power, an aperture stop S, a second lens unit G2 having a positive refractive power and a third lens unit G3 having a positive refractive power. The aperture stop S is disposed in the same position as that of the vertex of the surface of the second lens unit G2 closest to the object side. When magnification change is performed from the wide-angle end to the telephoto end, the first lens unit G1 moves along a locus of movement convex toward the image side, and is arranged closer to the image side in the telephoto end than in the wide-angle end. The aperture stop S and the second lens unit G2 integrally monotonously moves toward the object side while reducing the space between the second lens unit and the first lens unit G1. The third lens unit G3 moves toward the object side while enlarging the space between the third lens unit and the second lens unit G2. In any zoom state, focusing is performed by moving the third lens unit G3 in an optical-axis direction.

The first lens unit G1 is constituted of, in order from the object side, a double-concave negative lens and a positive meniscus lens whose convex surface faces the object side. The second lens unit G2 is constituted of a double-convex positive lens and a cemented lens including a positive meniscus lens whose convex surface faces the object side and a negative meniscus lens whose convex surface faces the object side. The third lens unit G3 is constituted of one double-convex positive lens. The aperture stop S is positioned in the same position as that of the vertex of the object-side surface of the double-convex positive lens of the second lens unit G2.

Aspherical surfaces are used on three surfaces including the image-side surface of the double-concave negative lens of the first lens unit G1; and opposite surfaces of the double-convex positive lens of the second lens unit G2.

Figure 39A:
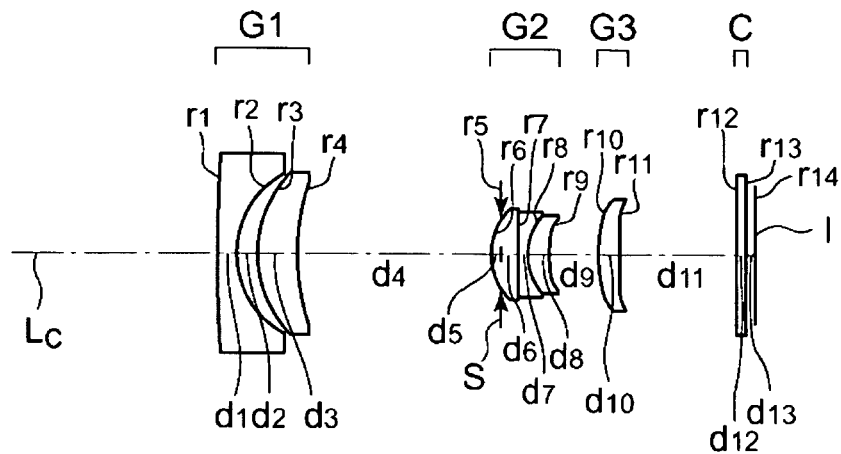
FIGS. 39A to 39C are sectional views in a wide-angle end (FIG. 39A), an intermediate state (FIG. 39B) and a telephoto end (FIG. 39C) of Example 22 when focused on an infinite object.
Figure 39B:
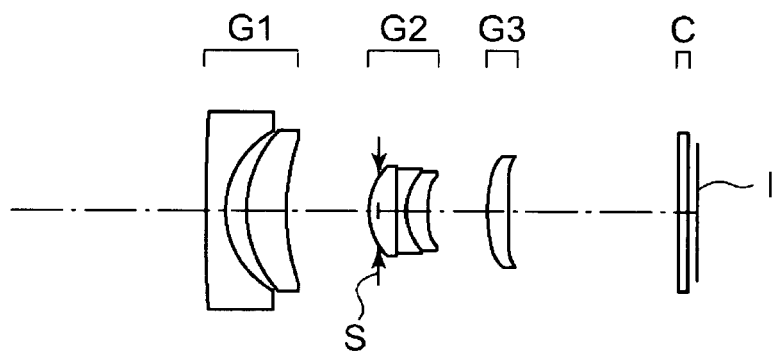
Figure 39C:
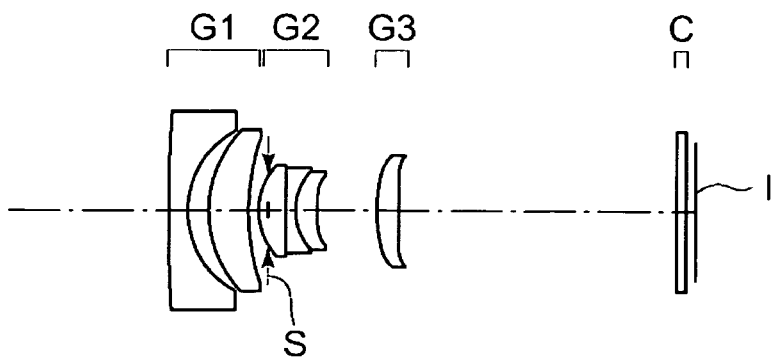
Figure 40A:
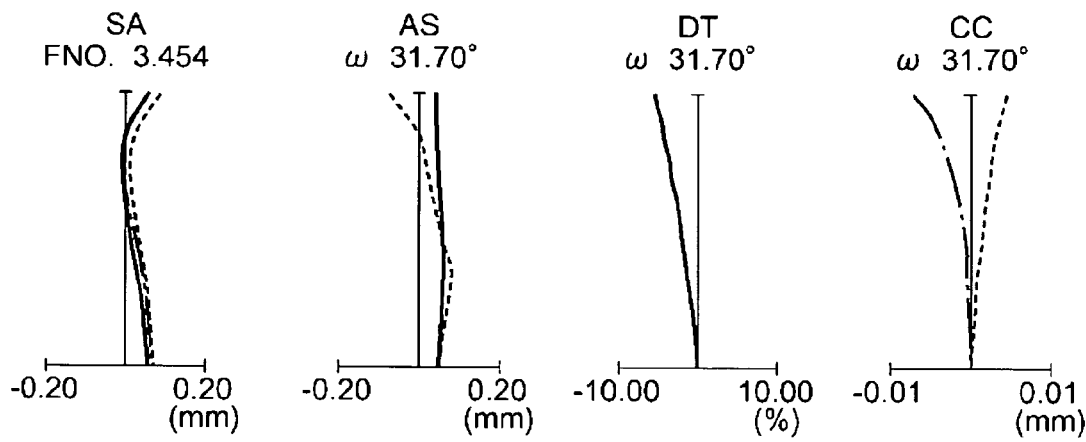
FIGS. 40A to 40C are aberration diagrams in the wide-angle end (FIG. 40A), the intermediate state (FIG. 40B) and the telephoto end (FIG. 40C) of Example 18 when focused on the infinite object.
Figure 40B:
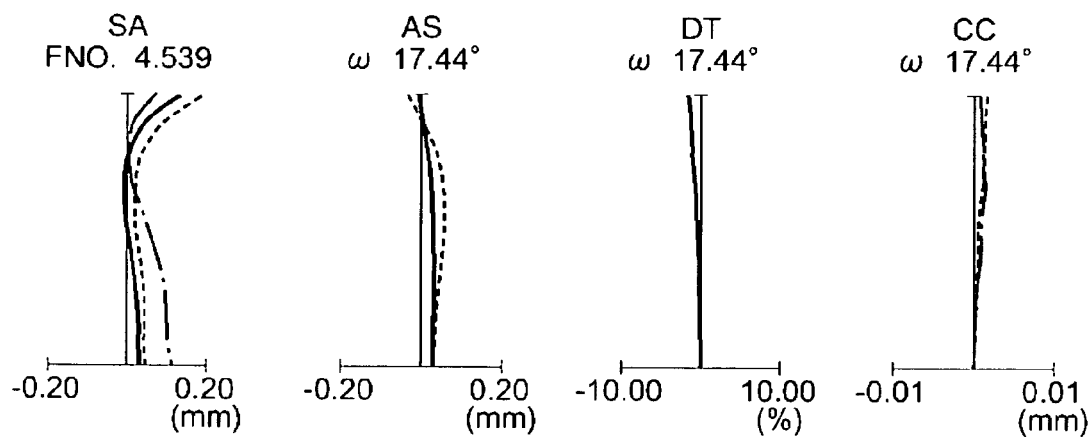
Figure 40C:
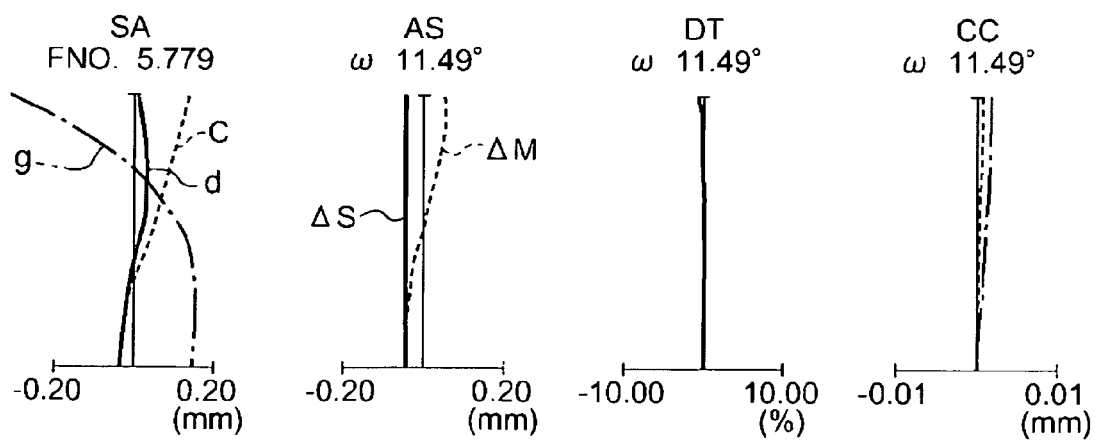
Figure 41A:
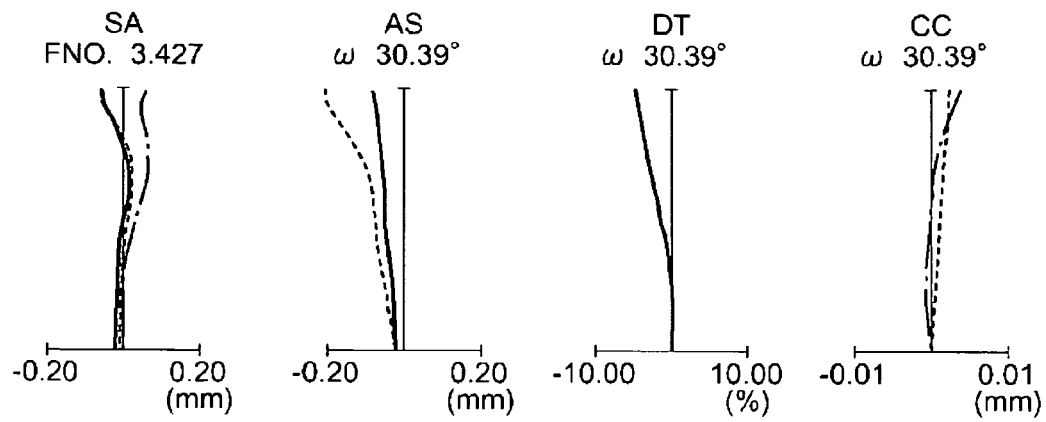
FIGS. 41A to 41C are aberration diagrams in the wide-angle end (FIG. 41A), the intermediate state (FIG. 41B) and the telephoto end (FIG. 41C) of Example 19 when focused on the infinite object.
Figure 41B:
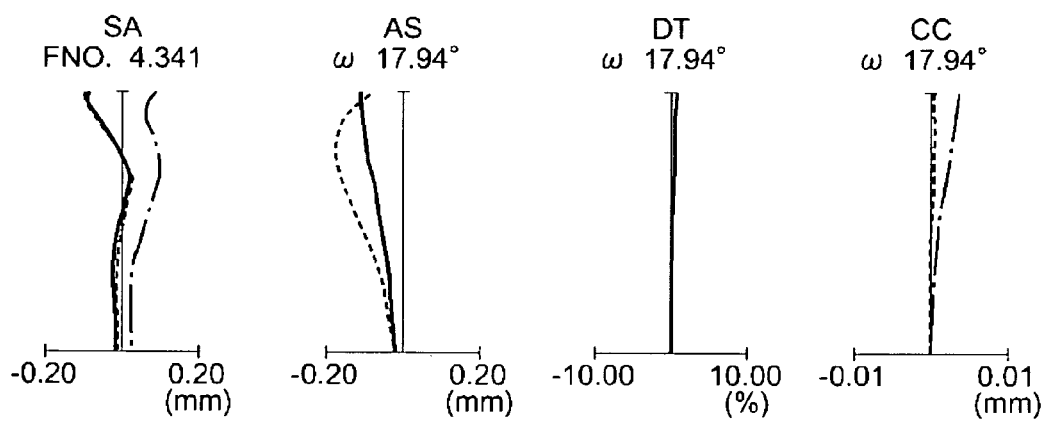
Figure 41C:
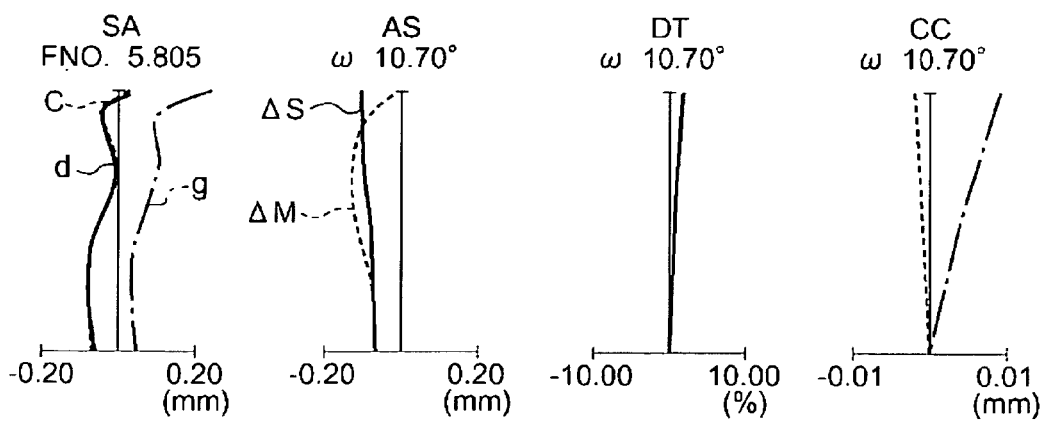
Figure 42A:
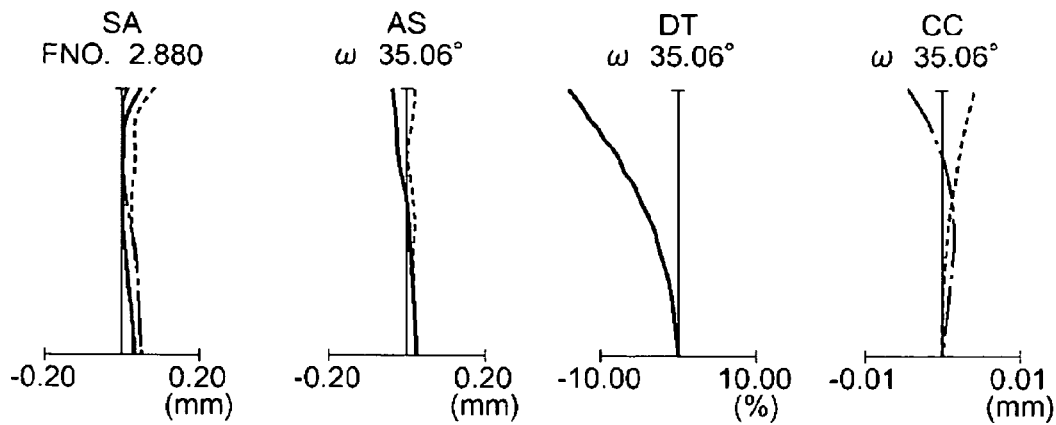
FIGS. 42A to 42C are aberration diagrams in the wide-angle end (FIG. 42A), the intermediate state (FIG. 42B) and the telephoto end (FIG. 42C) of Example 20 when focused on the infinite object.
Figure 42B:
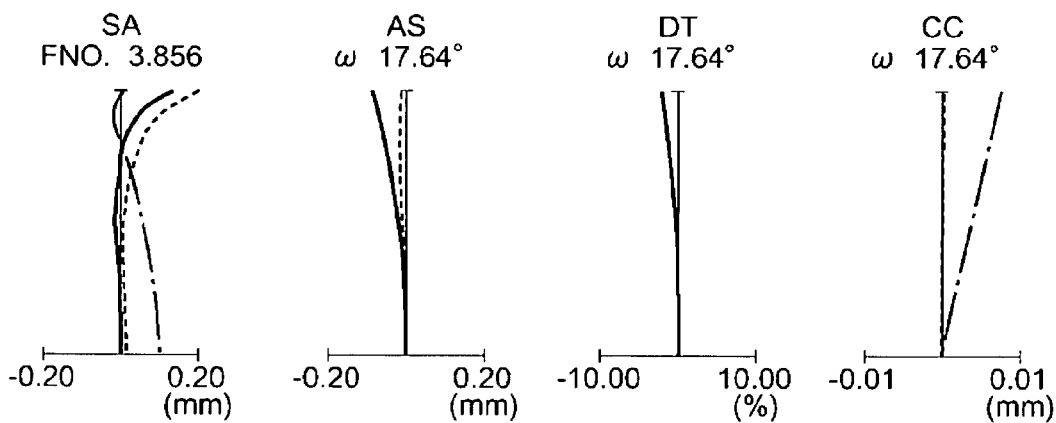
Figure 42C:
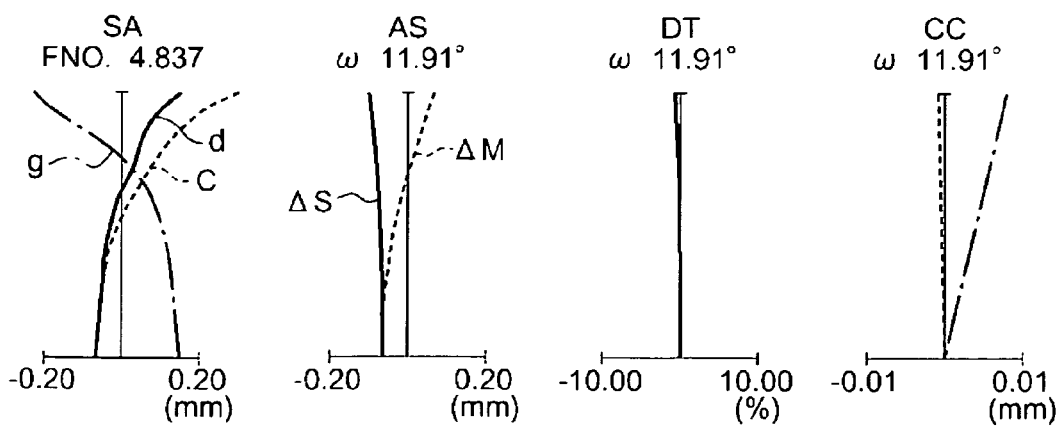
Figure 43A:
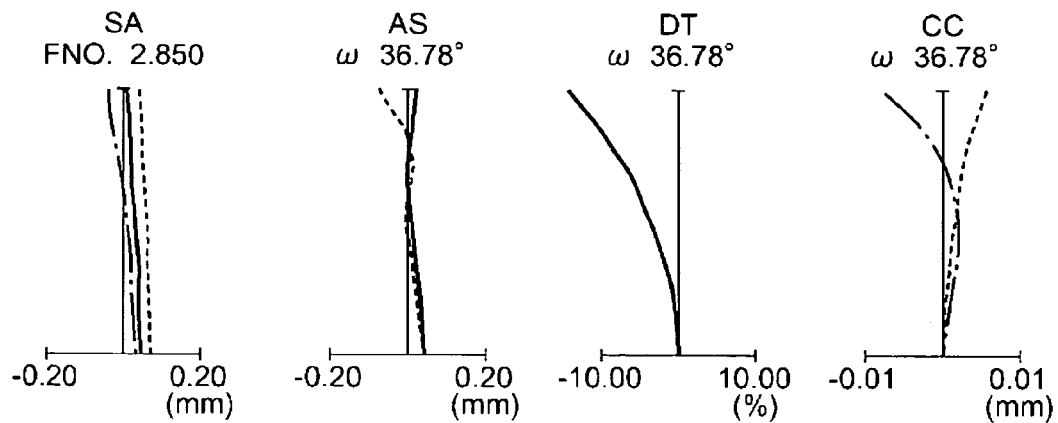
FIGS. 43A to 43C are aberration diagrams in the wide-angle end (FIG. 43A), the intermediate state (FIG. 43B) and the telephoto end (FIG. 43C) of Example 21 when focused on the infinite object.
Figure 43B:
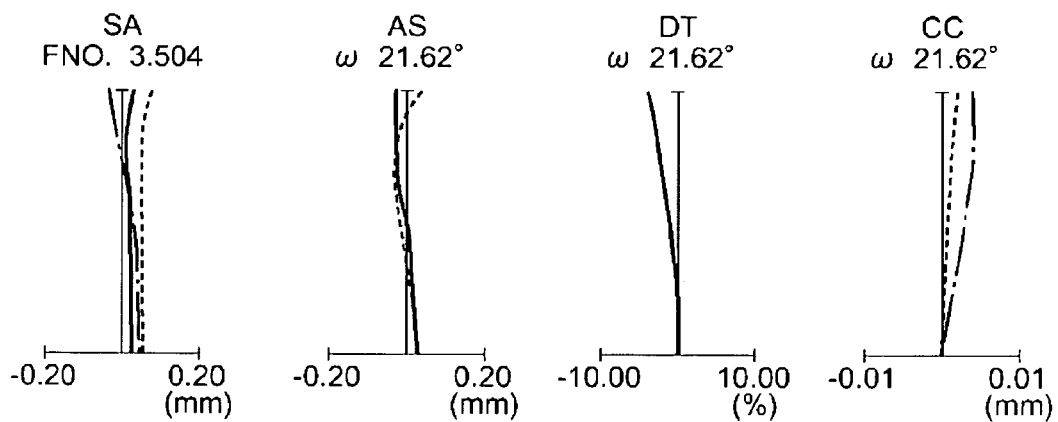
Figure 43C:
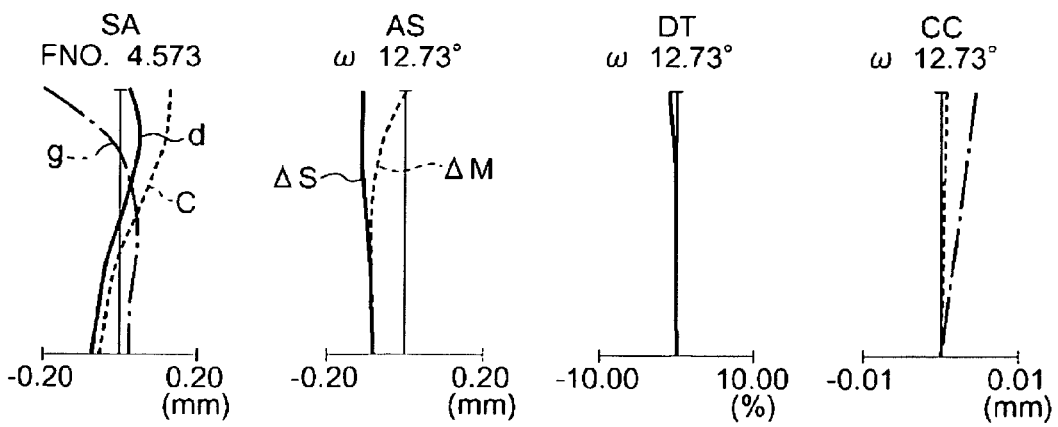
Figure 44A:
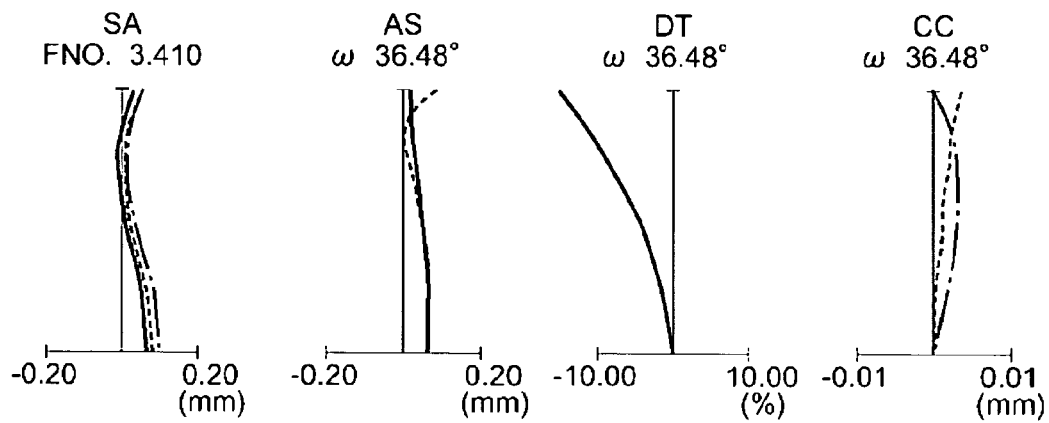
FIGS. 44A to 44C are aberration diagrams in the wide-angle end (FIG. 44A), the intermediate state (FIG. 44B) and the telephoto end (FIG. 44C) of Example 22 when focused on the infinite object.
Figure 44B:
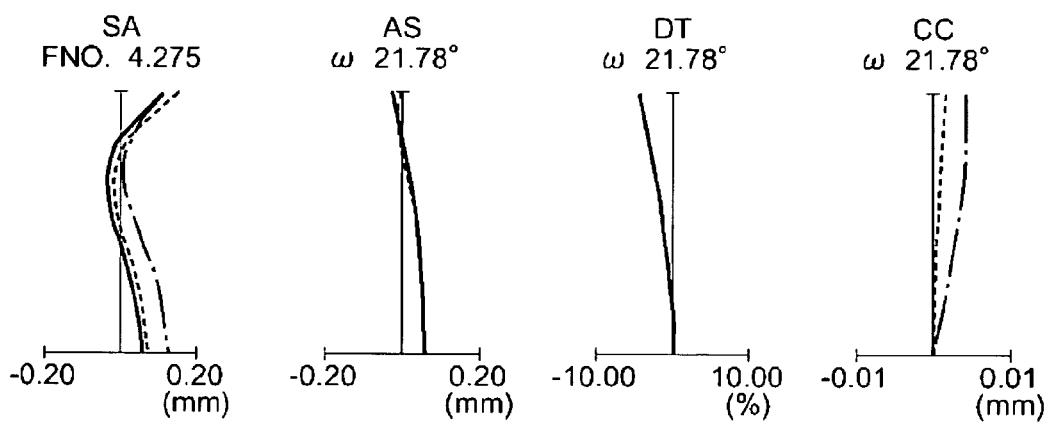
Figure 44C:
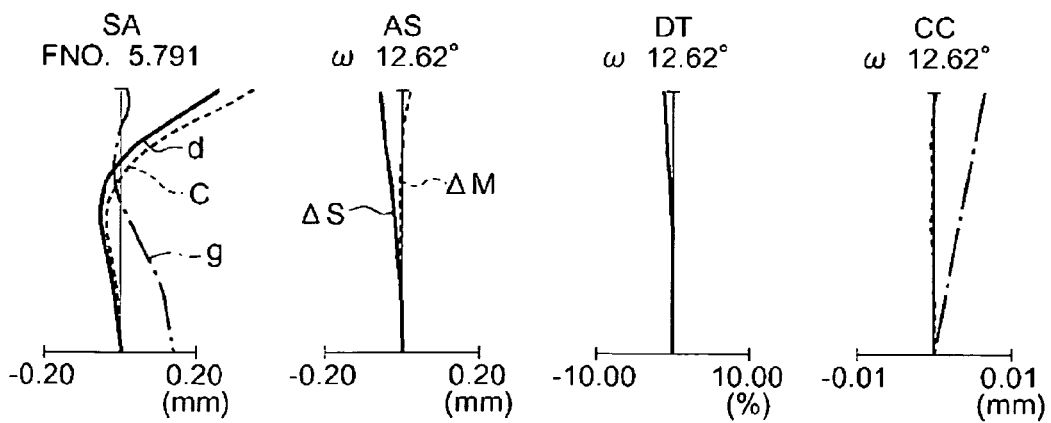

As shown in FIG. 39A, Example 22 is constituted of, in order from the object side, a first lens unit G1 having a negative refractive power, an aperture stop S, a second lens unit G2 having a positive refractive power and a third lens unit G3 having a positive refractive power. The aperture stop S is disposed on the image side of the vertex of the surface of the second lens unit G2 closest to the object side. When magnification change is performed from the wide-angle end to the telephoto end, the first lens unit G1 moves along a locus of movement convex toward the image side, and is arranged closer to the image side in the telephoto end than in the wide-angle end. The aperture stop S and the second lens unit G2 integrally monotonously moves toward the object side while reducing the space between the second lens unit and the first lens unit G1. The third lens unit G3 moves toward the object side so that the space between the third lens unit and the second lens unit G2 slightly enlarges from the wide-angle end to the intermediate state, and slightly decreases from the intermediate state to the telephoto end. In any zoom state, focusing is performed by moving the third lens unit G3 in an optical-axis direction.

The first lens unit G1 is constituted of, in order from the object side, a negative meniscus lens whose convex surface faces the object side and a positive meniscus lens whose convex surface faces the object side. The second lens unit G2 is constituted of a cemented triplet including a double-convex positive lens, a double-concave negative lens and a positive meniscus lens whose convex surface faces the object side. The third lens unit G3 is constituted of one positive meniscus lens whose convex surface faces the object side. The aperture stop S is positioned on the image side of the vertex of the surface of the cemented triplet of the second lens unit G2 closest to the object side.

Aspherical surfaces are used on five surfaces including the image-side surface of the negative meniscus lens of the first lens unit G1; the surfaces of the cemented triplet of the second lens unit G2 closest to the object side and the image side; and opposite surfaces of the positive meniscus lens of the third lens unit G3 whose convex surface faces the object side.

There will be described hereinafter numerical data of the above examples. In addition to the above-described symbols, f is a focal length of the zoom lens system, $F_{NO}$ is the F-number, $2\omega$ is an angle of field, WE is the wide-angle end, ST is the intermediate state, TE is the telephoto end, $r_1, r_2 \ldots$ are paraxial radii of curvature of the lens surfaces, $d_1, d_2 \ldots$ are spaces between the lens surfaces, $n_{d1}, n_{d2} \ldots$ are refractive indices for the d-line of the lenses, and $V_{d1}, V_{d2} \ldots$ are Abbe numbers of the lenses. After the data of the paraxial radius of curvature, (AS) indicates that the surface is an aspherical surface and (S) indicates the surface is an aperture stop. It is to be noted that an aspherical shape is represented by the following equation in a coordinate system in which the intersection of the aspherical surface and the optical axis is set as an origin, the optical axis is set as an x-axis whose positive direction is coincide with the light traveling direction, and an arbitrary axis which passes the origin and is perpendicular to the x-axis is set as a y-axis:

$$x = (y^2/r)/[1+\{1-(K+1)(y/r)^2\}^{1/2}] + A_4 y^4 + A_6 y^6 + A_8 y^8 + A_{10} y^{10} + A_{12} y^{12}$$

wherein r is a paraxial radius of curvature, K is a conic constant, and $A_4, A_6, A_8, A_{10}$ and $A_{12}$ are 4th-order, 6th-order, 8th-order, 10th-order and 12th-order aspherical coefficients.

Numerical Example 18

| | | | |
|---|---|---|---|
| $r_1 = 24.920$ | $d_1 = 0.50$ | $n_{d1} = 1.80495$ | $V_{d1} = 40.90$ |
| $r_2 = 4.370$(AS) | $d_2 = 1.57$ | | |
| $r_3 = 6.670$ | $d_3 = 1.62$ | $n_{d2} = 2.00069$ | $V_{d2} = 25.46$ |
| $r_4 = 10.330$ | $d_4$ = variable | | |
| $r_5 = \infty$(S) | $d_5 = -0.35$ | | |
| $r_6 = 4.620$(AS) | $d_6 = 2.21$ | $n_{d3} = 1.80610$ | $V_{d3} = 40.73$ |
| $r_7 = 50.000$ | $d_7 = 0.54$ | $n_{d4} = 1.84666$ | $V_{d4} = 23.78$ |
| $r_8 = 4.600$ | $d_8 = 1.69$ | $n_{d5} = 1.51553$ | $V_{d5} = 64.00$ |
| $r_9 = 11.680$(AS) | $d_9$ = variable | | |
| $r_{10} = 11.340$(AS) | $d_{10} = 1.00$ | $n_{d6} = 1.53113$ | $V_{d6} = 55.80$ |
| $r_{11} = 74.730$ | $d_{11}$ = variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.40$ | | |
| $r_{14} = \infty$ (image surface) | | | |

Aspherical Surface Coefficient

TABLE 36

| | 2nd surface | 6th surface | 9th surface | 10th surface |
|---|---|---|---|---|
| K | −1.149 | −0.865 | −0.991 | 0.000 |
| $A_4$ | $1.24435 \times 10^{-3}$ | $1.08744 \times 10^{-3}$ | $4.35654 \times 10^{-3}$ | $-2.55757 \times 10^{-4}$ |
| $A_6$ | $-1.98574 \times 10^{-5}$ | $4.80167 \times 10^{-6}$ | $1.14301 \times 10^{-4}$ | $1.69488 \times 10^{-5}$ |
| $A_8$ | $3.59908 \times 10^{-6}$ | $4.78886 \times 10^{-6}$ | $1.01025 \times 10^{-4}$ | 0 |
| $A_{10}$ | $-1.88547 \times 10^{-7}$ | $-2.71710 \times 10^{-7}$ | $-5.58436 \times 10^{-6}$ | 0 |
| $A_{12}$ | $4.15600 \times 10^{-9}$ | 0 | 0 | 0 |

Zoom Data (∞)

TABLE 37

|  | WE | ST | TE |
|---|---|---|---|
| f(mm) | 6.57 | 12.42 | 18.98 |
| $F_{NO}$ | 3.45 | 4.54 | 5.78 |
| $2\omega(°)$ | 63.40 | 34.87 | 22.98 |
| $d_4$ | 12.00 | 3.86 | 0.75 |
| $d_9$ | 3.43 | 3.42 | 3.98 |
| $d_{11}$ | 6.14 | 10.68 | 15.63 |

Numerical Example 19

| | | |
|---|---|---|
| $r_1 = 51.789$ | $d_1 = 0.70$ | $n_{d1} = 1.88300$  $V_{d1} = 40.76$ |
| $r_2 = 5.837$ | $d_2 = 1.71$ | |
| $r_3 = 13.554(AS)$ | $d_3 = 1.47$ | $n_{d2} = 1.82114$  $V_{d2} = 24.06$ |
| $r_4 = 75.183(AS)$ | $d_4 =$ variable | |
| $r_5 = \infty(S)$ | $d_5 = -0.72$ | |
| $r_6 = 3.826(AS)$ | $d_6 = 3.00$ | $n_{d3} = 1.49700$  $V_{d3} = 81.54$ |
| $r_7 = -19.669$ | $d_7 = 0.50$ | $n_{d4} = 1.92286$  $V_{d4} = 18.90$ |
| $r_8 = -133.221$ | $d_8 = 1.09$ | $n_{d5} = 1.69350$  $V_{d5} = 53.21$ |
| $r_9 = -23.946(AS)$ | $d_9 =$ variable | |
| $r_{10} = -68.471(AS)$ | $d_{10} = 0.80$ | $n_{d6} = 1.52542$  $V_{d6} = 55.78$ |
| $r_{11} = 7.284(AS)$ | $d_{11} =$ variable | |
| $r_{12} = \infty$ | $d_{12} = 0.50$ | $n_{d7} = 1.51633$  $V_{d7} = 64.14$ |
| $r_{13} = \infty$ | $d_{13} = 0.40$ | |
| $r_{14} = \infty$ (image surface) | | |

Aspherical Surface Coefficient

TABLE 38-1

|  | 3rd surface | 4th surface | 6th surface | 9th surface |
|---|---|---|---|---|
| K | 0.000 | 0.000 | 0.000 | 0.000 |
| $A_4$ | $-2.90406 \times 10^{-4}$ | $-6.25636 \times 10^{-4}$ | $-3.84634 \times 10^{-4}$ | $3.29823 \times 10^{-3}$ |
| $A_6$ | $-2.19067 \times 10^{-5}$ | $-1.55735 \times 10^{-5}$ | $-1.86499 \times 10^{-5}$ | $2.17032 \times 10^{-4}$ |
| $A_8$ | $1.93834 \times 10^{-6}$ | $1.40541 \times 10^{-6}$ | $9.97230 \times 10^{-6}$ | $-1.07505 \times 10^{-5}$ |
| $A_{10}$ | $-3.55926 \times 10^{-8}$ | $-3.74784 \times 10^{-8}$ | $-5.98509 \times 10^{-7}$ | $8.77866 \times 10^{-6}$ |

TABLE 38-2

|  | 10th surface | 11th surface |
|---|---|---|
| K | 0.000 | 0.000 |
| $A_4$ | $9.19324 \times 10^{-4}$ | $1.04459 \times 10^{-3}$ |
| $A_6$ | $-7.15668 \times 10^{-4}$ | $-5.99256 \times 10^{-4}$ |
| $A_8$ | $2.38646 \times 10^{-4}$ | $2.45269 \times 10^{-4}$ |
| $A_{10}$ | $-2.14848 \times 10^{-5}$ | $-2.50329 \times 10^{-5}$ |

Zoom Data (∞)

TABLE 39

|  | WE | ST | TE |
|---|---|---|---|
| f (mm) | 6.80 | 11.62 | 19.67 |
| $F_{NO}$ | 3.43 | 4.34 | 5.81 |
| $2\omega(°)$ | 60.79 | 35.88 | 21.41 |
| $d_4$ | 14.53 | 6.17 | 1.12 |
| $d_9$ | 1.97 | 2.41 | 3.21 |
| $d_{11}$ | 6.66 | 8.94 | 12.25 |

Numerical Example 20

| | | | |
|---|---|---|---|
| $r_1 = -55.947$ | $d_1 = 0.90$ | $n_{d1} = 1.80610$ | $V_{d1} = 40.92$ |
| $r_2 = 6.646(AS)$ | $d_2 = 1.62$ | | |
| $r_3 = 11.161$ | $d_3 = 1.82$ | $n_{d2} = 2.00069$ | $V_{d2} = 25.46$ |
| $r_4 = 30.512$ | $d_4 =$ variable | | |
| $r_5 = \infty(S)$ | $d_5 = -0.67$ | | |
| $r_6 = 5.808(AS)$ | $d_6 = 3.51$ | $n_{d3} = 1.74320$ | $V_{d3} = 49.34$ |
| $r_7 = 16.319$ | $d_7 = 0.60$ | $n_{d4} = 1.84666$ | $V_{d4} = 23.78$ |
| $r_8 = 5.200$ | $d_8 = 1.36$ | $n_{d5} = 1.58313$ | $V_{d5} = 59.38$ |
| $r_9 = 26.430(AS)$ | $d_9 =$ variable | | |
| $r_{10} = 24.745(AS)$ | $d_{10} = 1.24$ | $n_{d6} = 1.52542$ | $V_{d6} = 55.78$ |
| $r_{11} = 7929.558$ | $d_{11} =$ variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.40$ | | |
| $r_{14} = \infty$ (image surface) | | | |

Aspherical Surface Coefficient

TABLE 40

|  | 2nd surface | 6th surface | 9th surface | 10th surface |
|---|---|---|---|---|
| K | -3.702 | -2.011 | 0.000 | 0.000 |
| $A_4$ | $1.29210 \times 10^{-3}$ | $1.29270 \times 10^{-3}$ | $1.94125 \times 10^{-3}$ | $-1.01517 \times 10^{-4}$ |
| $A_6$ | $-2.94031 \times 10^{-5}$ | $-8.81428 \times 10^{-6}$ | $3.03189 \times 10^{-5}$ | $5.70765 \times 10^{-6}$ |
| $A_8$ | $6.63852 \times 10^{-7}$ | $1.57107 \times 10^{-6}$ | $1.16357 \times 10^{-5}$ | 0 |

TABLE 40-continued

|  | 2nd surface | 6th surface | 9th surface | 10th surface |
|---|---|---|---|---|
| $A_{10}$ | $-7.48401 \times 10^{-9}$ | $-3.88466 \times 10^{-8}$ | $1.55401 \times 10^{-7}$ | 0 |

Zoom Data (∞)

TABLE 41

|  | WE | ST | TE |
|---|---|---|---|
| f (mm) | 7.51 | 14.60 | 21.63 |
| $F_{NO}$ | 2.88 | 3.86 | 4.84 |
| $2\omega(°)$ | 70.11 | 35.27 | 23.83 |
| $d_4$ | 15.42 | 4.74 | 1.07 |
| $d_9$ | 4.10 | 4.19 | 4.41 |
| $d_{11}$ | 7.14 | 12.47 | 17.74 |

Numerical Example 21

| | | | |
|---|---|---|---|
| $r_1 = -124.287$ | $d_1 = 0.90$ | $n_{d1} = 1.80610$ | $V_{d1} = 40.92$ |
| $r_2 = 6.538(AS)$ | $d_2 = 1.60$ | | |
| $r_3 = 10.605$ | $d_3 = 2.00$ | $n_{d2} = 2.00069$ | $V_{d2} = 25.46$ |
| $r_4 = 25.227$ | $d_4 = $ variable | | |
| $r_5 = \infty(S)$ | $d_5 = 0.00$ | | |
| $r_6 = 6.394(AS)$ | $d_6 = 2.00$ | $n_{d3} = 1.58913$ | $V_{d3} = 61.25$ |
| $r_7 = -30.898(AS)$ | $d_7 = 0.10$ | | |
| $r_8 = 6.209$ | $d_8 = 1.50$ | $n_{d4} = 1.56883$ | $V_{d4} = 56.36$ |
| $r_9 = 6.845$ | $d_9 = 0.50$ | $n_{d5} = 1.92286$ | $V_{d5} = 20.88$ |
| $r_{10} = 4.023$ | $d_{10} = $ variable | | |
| $r_{11} = 17.797$ | $d_{11} = 1.70$ | $n_{d6} = 1.48749$ | $V_{d6} = 70.23$ |
| $r_{12} = -45.659$ | $d_{12} = $ variable | | |
| $r_{13} = \infty$ | $d_{13} = 0.86$ | $n_{d7} = 1.51633$ | $V_{d7} = 64.14$ |
| $r_{14} = \infty$ | $d_{14} = 0.40$ | | |
| $r_{15} = \infty$ (image surface) | | | |

Aspherical Surface Coefficient

TABLE 42

| | 2nd surface | 6th surface | 7th surface |
|---|---|---|---|
| K | −0.041 | −0.467 | −10.674 |
| $A_4$ | $-2.22413 \times 10^{-4}$ | $-2.12378 \times 10^{-4}$ | $2.56263 \times 10^{-5}$ |
| $A_6$ | $-4.77806 \times 10^{-6}$ | $-2.05472 \times 10^{-6}$ | $-1.58388 \times 10^{-6}$ |
| $A_8$ | $4.40948 \times 10^{-8}$ | $-4.07230 \times 10^{-8}$ | $6.68314 \times 10^{-8}$ |
| $A_{10}$ | $-5.22140 \times 10^{-9}$ | 0 | 0 |

Zoom Data (∞)

TABLE 43

| | WE | ST | TE |
|---|---|---|---|
| f (mm) | 7.06 | 11.91 | 20.32 |
| $F_{NO}$ | 2.85 | 3.50 | 4.57 |
| 2ω(°) | 73.57 | 43.23 | 25.45 |
| $d_4$ | 16.27 | 6.63 | 0.50 |
| $d_{10}$ | 4.19 | 5.17 | 5.76 |
| $d_{12}$ | 6.31 | 9.31 | 15.47 |

Numerical Example 22

| | | | |
|---|---|---|---|
| $r_1 = 157.020$ | $d_1 = 1.00$ | $n_{d1} = 1.80610$ | $V_{d1} = 40.92$ |
| $r_2 = 4.547(AS)$ | $d_2 = 1.05$ | | |
| $r_3 = 6.272$ | $d_3 = 2.20$ | $n_{d2} = 1.80810$ | $V_{d2} = 22.76$ |
| $r_4 = 13.255$ | $d_4 = $ variable | | |
| $r_5 = \infty(S)$ | $d_5 = -0.45$ | | |
| $r_6 = 3.721(AS)$ | $d_6 = 1.40$ | $n_{d3} = 1.74320$ | $V_{d3} = 49.34$ |
| $r_7 = -7358.609$ | $d_7 = 0.50$ | $n_{d4} = 1.68893$ | $V_{d4} = 31.07$ |
| $r_8 = 3.002$ | $d_8 = 1.19$ | $n_{d5} = 1.51633$ | $V_{d5} = 64.14$ |
| $r_9 = 6.657(AS)$ | $d_9 = $ variable | | |
| $r_{10} = 11.922(AS)$ | $d_{10} = 1.10$ | $n_{d6} = 1.52511$ | $V_{d6} = 56.23$ |
| $r_{11} = 30423.657(AS)$ | $d_{11} = $ variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.40$ | | |
| $r_{14} = \infty$ (image surface) | | | |

Aspherical Surface Coefficient

TABLE 44

| | 2nd surface | 6th surface | 9th surface | 10th surface | 11th surface |
|---|---|---|---|---|---|
| K | −0.273 | −0.978 | 0.000 | 0.000 | 0.000 |
| $A_4$ | $-4.57253 \times 10^{-5}$ | $2.62235 \times 10^{-3}$ | $7.42985 \times 10^{-3}$ | $5.04258 \times 10^{-4}$ | $4.21538 \times 10^{-4}$ |
| $A_6$ | $-8.76429 \times 10^{-6}$ | $5.71552 \times 10^{-5}$ | $6.75400 \times 10^{-4}$ | $2.09830 \times 10^{-4}$ | $1.53746 \times 10^{-4}$ |
| $A_8$ | $2.14403 \times 10^{-8}$ | $1.38662 \times 10^{-5}$ | $1.92625 \times 10^{-4}$ | $1.45376 \times 10^{-5}$ | $4.60241 \times 10^{-6}$ |
| $A_{10}$ | $-2.20356 \times 10^{-8}$ | $-7.25720 \times 10^{-8}$ | $1.93182 \times 10^{-5}$ | $2.75747 \times 10^{-6}$ | $4.35430 \times 10^{-6}$ |

Zoom Data (∞)

TABLE 45

| | WE | ST | TE |
|---|---|---|---|
| f (mm) | 5.96 | 9.94 | 17.14 |
| $F_{NO}$ | 3.41 | 4.28 | 5.79 |
| 2ω(°) | 72.99 | 43.56 | 25.24 |
| $d_4$ | 10.66 | 4.78 | 0.95 |
| $d_9$ | 2.66 | 3.12 | 3.06 |
| $d_{11}$ | 6.26 | 9.13 | 14.87 |

FIGS. 40A to 44C show aberration diagrams of Examples 18 to 22 when the zoom lens system is focused on an infinite object. In these aberration diagrams, FIGS. 40A, 41A . . . show a spherical aberration SA, astigmatism AS, a distortion DT and a chromatic aberration CC of magnification in the wide-angle end, FIGS. 40B, 41B . . . show them in the intermediate state, and FIGS. 40C, 41C . . . show them in the telephoto end. In the drawings, "ω" is a half angle (°) of view.

Next, there will be described values of the conditions (1B) to (4B) in Examples 18 to 22.

TABLE 46

| | Condition | | | |
|---|---|---|---|---|
| | (1B) | (2B) | (3B) | (4B) |
| Example 18 | 0.914426 | 0.233943 | 1.53113 | 0.052687 |
| Example 19 | 0.830628 | 0.233785 | 1.52542 | 0.040671 |
| Example 20 | 0.826257 | 0.253123 | 1.52542 | 0.057328 |
| Example 21 | 0.909395 | 0.201753 | 1.48749 | 0.083661 |
| Example 22 | 0.996691 | 0.18026 | 1.5273 | 0.064177 |

When each of the zoom lens systems explained in Examples 1 to 22 is used as an image pickup optical system of image pickup apparatus including an electronic image sensor, the distortion remaining in the optical image of an object formed by the zoom lens system can electrically be corrected (digital correction) by digital signal processing. Here, there will be described the basic concept in digitally correcting the distortion of the optical image.

Figure 45:
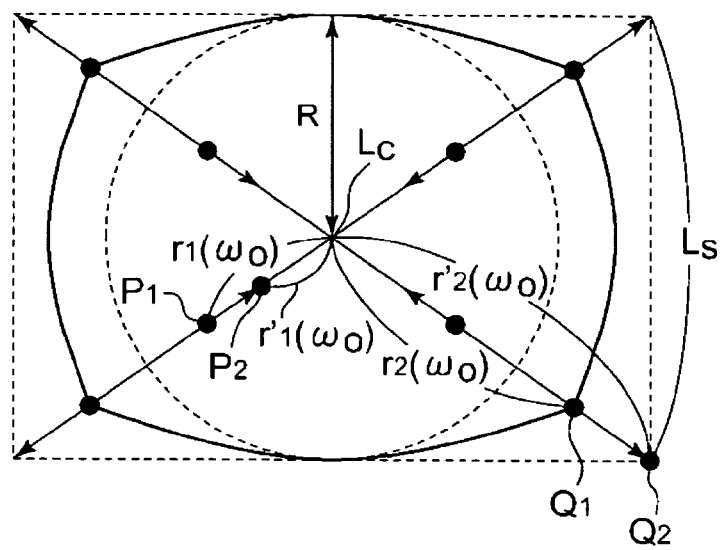
FIG. 45 is an explanatory view of the basic concept for digitally correcting the distortion of an optical image.
Figure 46:
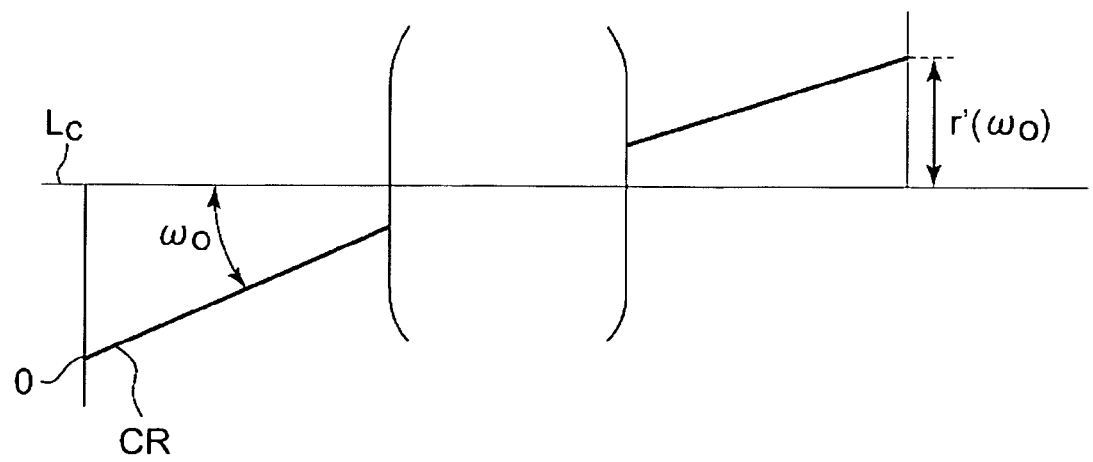
FIG. 46 is a diagram showing the relation between an image height and a half angle of view of an object.

For example, as shown in FIG. 45, assuming that a circle having a radius R (image height R) is on the image pickup surface whose center is at the intersection of the optical axis Lc and the image pickup surface and which is tangent to the long sides of the effective image pickup region (a region on the image pickup surface where the image pickup is possible). The magnification in each point on the circumference of the circle is fixed and the each point is regarded as a reference of the correction. Each point on the circumference of another circle having an arbitrary radius $r(\omega_o)$ (image height $r(\omega_o)$) is moved in a substantially radial direction, and moved concentrically so as to obtain a radius $r'(\omega_o)$, thereby correcting the distortion of the optical image. For example, in FIG. 45, a point $P_1$ on the circumference of an arbitrary circle having a radius $r_1(\omega_o)$, positioned inside the circle having the radius R, is directed toward the center of the circle, and moved to a point $P_2$ on the circumference of a circle having a radius $r_1'(\omega_o)$. A point $Q_1$ on the circumference of a circle having an arbitrary radius $r_2(\omega_o)$, positioned outside the circle having the radius R, is directed in the direction distant from the center of the circle, and moved to a point $Q_2$ on the circumference of a circle having a radius $r_2'(\omega_o)$. Here, $r'(\omega_o)$ can be represented as follows:

$$r'(\omega_o) = \alpha \cdot f \cdot \tan \omega_o \ (0 \leq \alpha \leq 1),$$

wherein f is a focal length of the image forming optical system (zoom lens system), and $\omega_o$ is a half angle of view of the object. Here, as shown in FIG. 46, the half angle of view of the object is an angle of a chief ray CR from an object point O with respect to the optical axis Lc, the object point corresponding to an image point formed in a position of a height r from the center of the image pickup surface.

Here, assuming that an ideal image height of the point on the circumference of the circle having the radius R (image height R) is Y, the following results:

$$\alpha = R/Y = R/(f \cdot \tan \omega).$$

The optical system is ideally rotationally symmetric with respect to the optical axis. Therefore, the distortion is also generated rotationally symmetrically with respect to the optical axis. Therefore, to electrically correct the optically generated distortion, the magnification is fixed on the circumference of the circle having the radius R which is tangent to the long sides of the effective image pickup region and whose center is at a point corresponding to the intersection of the optical axis Lc and the image pickup surface in the image to be reproduced, and the points on the circumference of the other circle having the radius $r(\omega_o)$ are concentrically moved to the position of the radius $r'(\omega_o)$ in the radial direction, as described above. If the distortion can thus be corrected, the method of correcting distortion is considered to be advantageous in view of the data amount and the calculation amount.

However, when the optical image is picked up by the electronic image sensor, the image is no longer indicated with a continuous amount due to the sampling by the pixels of the image sensor. Therefore, the circle having the radius R virtually drawn on the optical image is not strictly a correct circle as long as pixels are not radially arranged on the image pickup surface of the electronic image sensor. That is, in the shape correction of an image given as a set of data obtained from discrete coordinate points (pixels of the electronic image sensor), any circle on which the magnification can be fixed as described above does not exist. Therefore, it is preferable to use a method of determining the coordinate $(X_i', Y_j')$ of the position for each pixel (which is at a point of coordinate $(X_i, Y_j)$) to which the pixel is to be moved for shape correction. It is to be noted that when a plurality of pixels move to one coordinate $(X_i', Y_j')$ position, an average value of data of the plurality of pixels is taken. With respect to a position where there is not any moved pixel, interpolation is performed using data values of several peripheral pixels having data because the pixels have been moved. In consequence, the data of the position is prepared.

Such a method is effective for the correction in a case where the points on the optical image whose magnification has to be fixed are not arranged on the circumference centering on the optical axis, and become asymmetric with respect to the optical axis owing to manufacturing errors of the optical system or the electronic image sensor in the electronic image pickup apparatus including the zoom lens system.

In the electronic image pickup apparatus which performs such correction, in order to calculate a correction amount $r'(\omega_o) - r(\omega_o)$, data indicating $r(\omega_o)$ which includes the relation between the half angle of view of the object and the image height, or data indicating the relation between the actual image height r, the ideal image height r' and the coefficient $\alpha$ may be recorded in the recording medium incorporated in the electronic image pickup apparatus.

It is to be noted that the image having the distortion corrected preferably satisfy the following condition so that the quantity of light is not excessively insufficient in opposite ends in the short-side direction.

$$0 \leq R \leq 0.6 L_s,$$

wherein $L_s$ is the length of the short side of the effective image pickup region.

It is more preferable that the radius R satisfies the following condition:

$$0.3 L_s \leq R \leq 0.6 L_s.$$

Furthermore, it is most advantageous that the radius R substantially agrees with the radius of the inscribed circle in the short-side direction of the effective image pickup surface. It is to be noted that in the correction in a case where the magnification is fixed in the vicinity of the radius R=0, that is, in the vicinity of the optical axis, the region to be extended in the radial direction increases. This is slightly disadvantageous in the viewpoint of the number of the pixels, but it is possible to secure the effect that even the zoom lens system having a wide angle can be minimized.

It is to be noted that the correction of the distortion of one image has been described above, but in the zoom lens system, when the focal length changes, the state of the distortion included in the image changes. Therefore, the focal length range between the maximum value (telephoto end) and the minimum value (wide-angle end) of the focal length where the distortion needs to be corrected is divided into several focal length zones to correct the distortion. For example, a correction amount is set so as to obtain a correction result which substantially satisfies $r'(\omega_o) = \alpha \cdot f \cdot \tan \omega_o$ in the vicinity of the telephoto end (position where the focal length is maximum in each zone) of each divided focal length zone, and the distortion of the image in the zone can be corrected using this correction amount. However, in this case, in the wide-angle end (position where the focal length is minimum in each zone) in each divided focal length zone, a certain degree of barrel type distortion remains in the obtained image. To avoid this, when the number of the divided zones is increased, the amount of the data to be recorded in the recording medium for the correction increases. To solve the problem, one or several coefficients are calculated beforehand which correspond to one or several focal lengths excluding the telephoto end and the wide-angle end of each divided focal length zone. This coefficient may be determined based on simulation or measurement using an actual image pickup apparatus. Moreover, the correction amount is calculated so as to obtain the correction result which substantially satisfies $r'(\omega_o) = \alpha \cdot f \cdot \tan \omega_o$ in the vicinity of the telephoto end of each divided zone, and this correction amount may be multiplied by the coefficient for each focal length to determine the correction amount of the image obtained in that focal length state.

If there is not any distortion in the optical image of the infinite object, the following results:

$$f = y/\tan \omega_o,$$

wherein y is a height (image height) from the optical axis of the image point, f is a focal length of the image forming optical system (here the zoom lens system), and $\omega_o$ is a half angle of view of the object.

If there is a barrel type distortion in the image forming optical system, the following results:

$$f > y/\tan \omega_o.$$

That is, when the focal length f of the image forming optical system, and the image height y are constant, the value of $\omega_o$ increases.

Next, there will be described an example of the image pickup apparatus to which the zoom lens system of the present invention has been applied.

Figure 47:
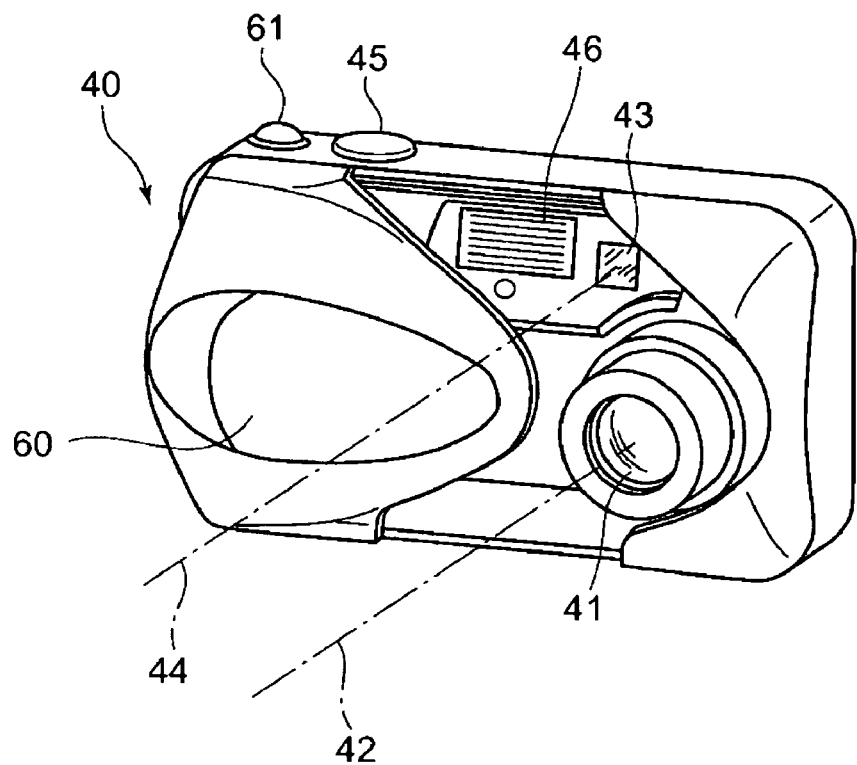
FIG. 47 is a front perspective view showing an appearance of a digital camera.
Figure 48:
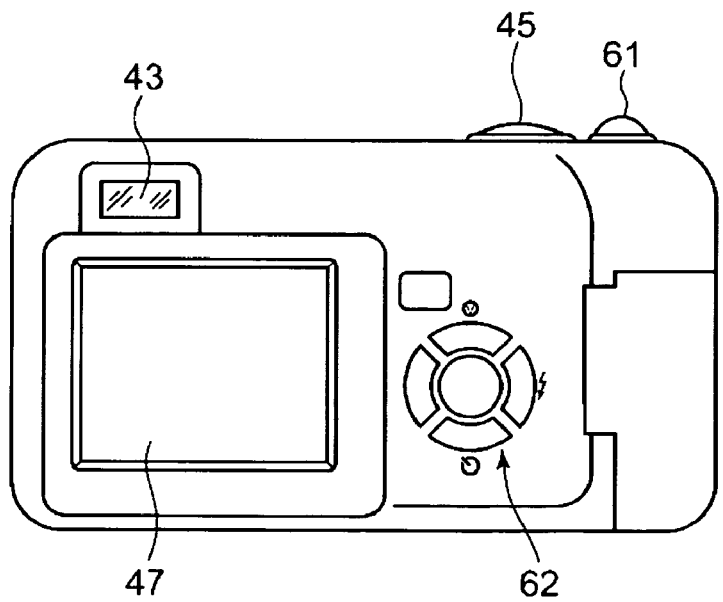
FIG. 48 is a rear view of the digital camera shown in FIG. 47.
Figure 49:
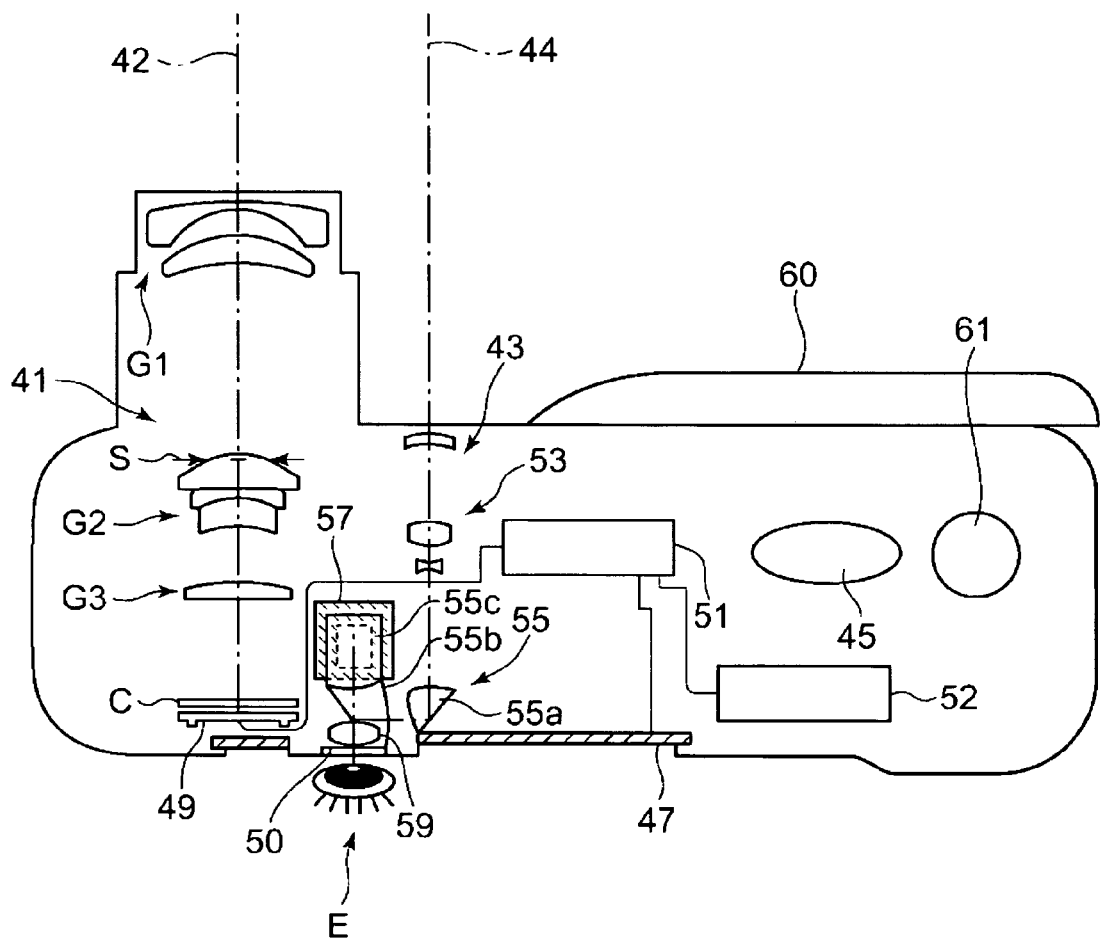
FIG. 49 is a schematic sectional view showing an inner constitution of the digital camera shown in FIG. 47.

FIGS. 47 to 49 are conceptual diagrams showing a constitution of a digital camera in which the above-described zoom lens system is incorporated in the photographing optical system 41. FIG. 47 is a front perspective view showing an appearance of a digital camera 40, FIG. 48 is a rear view of the digital camera, and FIG. 49 is a schematic sectional view showing an inner constitution of the digital camera 40. FIGS. 47 and 49 show a state in which a lens barrel of the photographing optical system 41 is not collapsed in the camera body.

The digital camera 40 includes the photographing optical system 41 positioned along a photographing optical path 42; a finder optical system 43 positioned along an optical path 44 for a finder; a shutter button 45; a flash lamp 46; a liquid crystal display monitor 47; a focal length change button 61; a camera setting change switch 62 and the like. In a case where the lens barrel of the photographing optical system 41 is collapsed, when a cover 60 is slid, the photographing optical system 41, the finder optical system 43 and the flash lamp 46 are covered with the cover 60. Moreover, when the cover 60 is opened to set the camera 40 to a photographing state, the photographing optical system 41 is brought into the non-collapsed state as shown in FIG. 49. When the shutter button 45 disposed in the upper portion of the camera 40 is pressed, the photographing is performed through the photographing optical system 41 in response to the pressed button. An object image formed by the photographing optical system 41 is formed on the image pickup surface (photoelectric conversion surface) of the CCD image sensor 49 via a cover glass C having a surface provided with a wavelength region restrictive coating. The object image received by the CCD image sensor 49 is displayed as an electronic image in the liquid crystal display monitor 47 disposed in the rear surface of the camera via processing means 51. This processing means 51 is connected to recording means 52, and the photographed electronic image can be recorded. It is to be noted that this recording means 52 may be disposed separately from or integrally with the processing means 51. As the recording means, there may be used a memory or an HDD (Hard Disc Drive) incorporated in the digital camera, or an HDD, a memory card or a DVD detachably attached to the digital camera.

Furthermore, an objective optical system 53 for the finder is disposed along the optical path 44 for the finder. The objective optical system 53 for the finder is a zoom lens system constituted of a plurality of lens units (three units in the drawing) and an image erecting prism system 55 including prisms 55a, 55b and 55c. The system is constituted so that the focal length changes in conjunction with the zoom lens system of the photographing optical system 41. The object image formed by this objective optical system 53 for the finder is formed on the view field frame 57 in the image erecting prism system 55. On the exit side of this image erecting prism system 55, an eyepiece optical system 59 is disposed which guides an erected image into the observer's eyeball E. A cover member 50 is disposed on the exit side of the eyepiece optical system 59.

As the photographing optical system 41, the zoom lens system of the present invention is used. In FIG. 49, the zoom lens system of Example 18 shown in FIG. 35A is used, but needless to say, another example is applicable.

Figure 50:
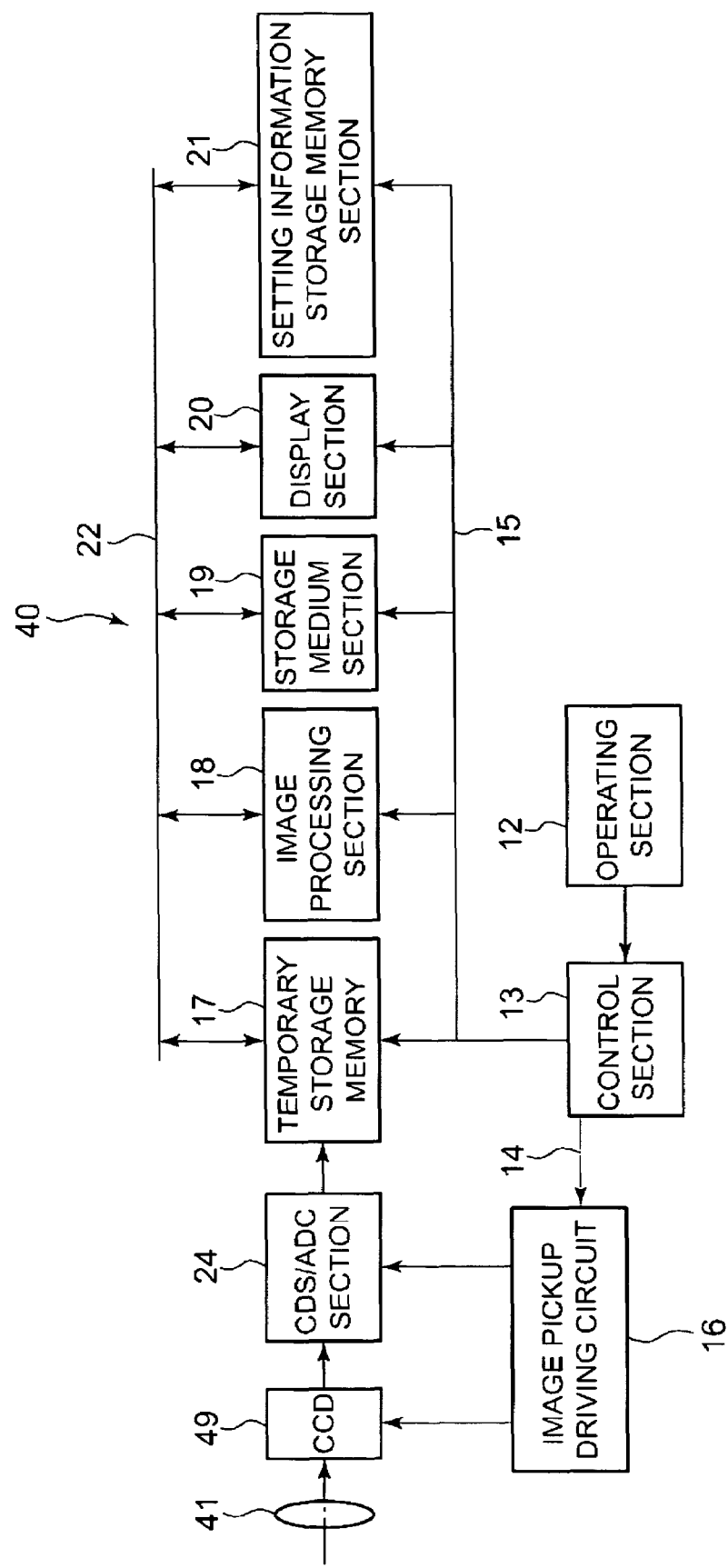
FIG. 50 is a block diagram of a main inner circuit of the digital camera shown in FIG. 47.

FIG. 50 is a block diagram of an inner circuit of the digital camera 40. It is to be noted that in the following description, the above processing means 51 includes, for example, a correlated double sampling (CDS)/analog digital conversion (ADC) section 24, a temporary storage memory 17, an image processing section 18 and the like, and the recording means 52 includes, for example, a storage medium section 19 and the like.

As shown in FIG. 50, the digital camera 40 includes an operating section 12; a control section 13 connected to the operating section 12; and an image pickup section driving circuit 16, the temporary storage memory 17, the image processing section 18, the storage medium section 19, a display section 20 and a setting information storage memory section 21 connected to control signal output ports of the control section 13 via buses 14 and 15.

The above temporary storage memory 17, the image processing section 18, the storage medium section 19, the display section 20 and the setting information storage memory section 21 are constituted so that data can be input or output mutually via a bus 22. The image pickup section driving circuit 16 is connected to the CCD image sensor 49 and the CDS/ADC section 24.

The operating section 12 includes various input buttons and switches such as a shutter release button, a camera setting change switch and a focal length change button, and is a circuit which notifies a control section of event information input from the outside (camera user) via these input buttons and switches. The control section 13 is a central processing unit, and is a circuit in which a program memory (not shown) is incorporated. In accordance with a program stored in the program memory, the circuit receives an instruction or a command input from the camera user via the operating section 12 and controls the whole digital camera 40.

The CCD image sensor 49 receives the object image formed via the photographing optical system 41. The CCD image sensor 49 is an image sensor driven and controlled by the image pickup section driving circuit 16 to convert a quantity of light of the object image for each pixel into an electric signal and output the signal to the CDS/ADC section 24.

The CDS/ADC section 24 is a circuit which amplifies the electric signal output from the CCD image sensor 49 to perform analog/digital conversion. The circuit outputs, to the temporary storage memory 17, video bare data (hereinafter referred to as the raw data) subjected to this amplification and digital conversion only.

The temporary storage memory 17 is a buffer constituted of, for example, an SDRAM or the like, and is a memory unit in which the raw data output from the CDS/ADC section 24 is temporarily stored. The image processing section 18 is a circuit which reads out the raw data stored in the temporary storage memory 17 or the storage medium section 19 to electrically perform various types of image processing including distortion correction based on an image quality parameter designated from the control section 13.

The recording medium section 19 is a control circuit of, for example, a device to which a card or stick type recording medium including a flash memory and the like is detachably attached and which records and retains, in the card or stick type flash memory, the raw data transferred from the temporary storage memory 17 and the image data obtained by processing the image by the image processing section 18.

The display section 20 includes the liquid crystal display monitor 47 and a circuit which displays an image, an operation menu and the like in the liquid crystal display monitor 47.

The setting information storage memory section 21 includes an ROM portion in which various image quality parameters are stored beforehand; an RAM portion in which there are stored the image quality parameter selected from the image quality parameters read from the ROM portion, by an input operation of the operating section 12; and a circuit which controls input/output with respect to the memories.

In the digital camera 40 constituted in this manner, the photographing optical system 41 has a sufficiently wide angle of field, is small-sized, has a high zoom ratio and has an image forming performance stabilized in the whole magnification change region. In the wide-angle end and the telephoto end, a fast focusing operation is possible.

The present invention may be applied to not only a so-called compact digital camera which photographs a general subject as described above but also a monitoring camera requiring a wide angle of field and a lens interchangeable type camera.

What is claimed is:

1. A three-unit zoom lens system comprising, in order from an object side:
a first lens unit having a negative refractive power;
a second lens unit having a positive refractive power; and
a third lens unit having a positive or negative refractive power,
wherein a space between the first lens unit and the second lens unit changes during magnification change,
a space between the second lens unit and the third lens unit changes during a focusing operation,
the space between the first lens unit and the second lens unit is smaller in a telephoto end than in a wide-angle end,
the second lens unit and the third lens unit move toward the only object side during the magnification change from the wide-angle end to the telephoto end,
the second lens unit includes two or three lens elements in total, the two or three lens elements constitute a single cemented lens component, the cemented lens component includes a positive lens element and a negative lens element, all the lens elements in the second lens unit are included in the single cemented lens component, the third lens unit includes one lens element in total, and
the following condition (1A) is satisfied, $$0.4 > D_{ce}/D_{123G} > 0.6 \tag{1A}$$

wherein $D_{ce}$ is a thickness of the cemented lens component of the second lens unit along an optical axis, and $D_{123G}$ is a sum of thicknesses of the lens units along the optical axis.

2. The three-unit zoom lens system according to claim 1, wherein the only third lens unit moves during focusing.

3. The three-unit zoom lens system according to claim 1, wherein the space between the second lens unit and the third lens unit changes during the magnification change.

4. The three-unit zoom lens system according to claim 1, wherein the first lens unit reciprocates in a direction of the optical axis during the magnification change.

5. The three-unit zoom lens system according to claim 1, wherein the first lens unit comprises, in order from the object side, two lenses in total including a negative lens element and a positive lens element.

6. The three-unit zoom lens system according to claim 1, wherein the cemented lens component of the second lens unit comprises, in order from the object side, a positive lens element, a negative lens element and a positive lens element.

7. The three-unit zoom lens system according to claim 1, wherein the following condition (3A) is satisfied:

$$1.2 > C_j(t)/f_t > 1.8 \tag{3A}$$

in which $C_j(t)$ is a distance from an entrance surface of the first lens unit to an image surface in the telephoto end, and $f_t$ is a focal length of the zoom lens system in the telephoto end.

8. The three-unit zoom lens system according to claim 1, wherein the third lens unit moves for focusing,
the lens element of the third lens unit is a positive lens element, and
the following condition (4A) is satisfied:

$$3.0 > f_3/f_w > 15.0 \tag{4A}$$

wherein $f_3$ is a focal length of the third lens unit, and $f_w$ is a focal length of the zoom lens system in the wide-angle end.

9. The three-unit zoom lens system according to claim 1, wherein the third lens unit moves for focusing,
the lens element of the third lens unit is a negative lens element, and
the following condition (5A) is satisfied:

$$1.5 > |f_3/f_w| > 15.0 \tag{5A}$$

wherein $f_3$ is a focal length of the third lens unit, and $f_w$ is a focal length of the zoom lens system in the wide-angle end.

10. The three-unit zoom lens system according to claim 1, wherein the lens element of the third lens unit is a positive lens element, and
the following condition (6A) is satisfied:

$$0.03 > D_{3G}/f_t > 0.09 \tag{6A}$$

wherein $D_{3G}$ is a thickness of the third lens unit along the optical axis, and $f_t$ is a focal length of the zoom lens system in the telephoto end.

11. The three-unit zoom lens system according to claim 1, wherein the lens element of the third lens unit is a negative lens element, and
the following condition (7A) is satisfied:

$$0.01 > D_{3G}/f_t > 0.09 \tag{7A}$$

wherein $D_{3G}$ is the thickness of the third lens unit along the optical axis, and $f_t$ is a focal length of the zoom lens system in the telephoto end.

12. The three-unit zoom lens system according to claim 1, wherein the following condition (9A) is satisfied:

$$2.5 > f_t/f_w 5.5 \tag{9A}$$

wherein $f_t$ is a focal length of the zoom lens system in the telephoto end, and $f_w$ is a focal length of the zoom lens system in the wide-angle end.

13. The three-unit zoom lens system according to claim 1, further comprising:
an aperture stop which is disposed immediately before the second lens unit and which is moved integrally with the second lens unit during the magnification change.

14. An image pickup apparatus comprising:
the three-unit zoom lens system according to claim 1; and
an image sensor which is disposed on an image side of the zoom lens system and which converts an optical image into an electric signal.

15. A three-unit zoom lens system comprising, in order from an object side:
a first lens unit having a negative refractive power;
a second lens unit having a positive refractive power; and
a third lens unit having a positive or negative refractive power,
wherein a space between the first lens unit and the second lens unit changes during magnification change,
a space between the second lens unit and the third lens unit changes during a focusing operation, the space between the first lens unit and the second lens unit is smaller in a telephoto end than in a wide-angle end, at least the second lens unit and the third lens unit move toward the only object side during the magnification change from the wide-angle end to the telephoto end, the second lens unit includes two or three lens elements in total, the two or three lens elements constitute a single cemented lens component, the cemented lens component includes a positive lens element and a negative lens element, the third lens unit includes one lens element in total, and the following condition (1A) is satisfied.

$$0.4 > D_{ce}/D_{123G} > 0.6 \tag{1A}$$

wherein $D_{ce}$ is a thickness of the cemented lens component of the second lens unit along an optical axis, and $D_{123G}$ is a sum of thicknesses of the lens units alona the optical axis, and wherein the following condition (2A) is satisfied:

$$-0.005 > (D_2(t) - D_2(w))/f_w > 0.5 \tag{2A}$$

wherein $D_2(w)$ is an air space between the second lens unit and the third lens unit along the optical axis in the wide-angle end, $D_2(t)$ is an air space between the second lens unit and the third lens unit along the optical axis in the telephoto end, and fw is a focal length of the zoom lens system in the wide-angle end.

16. A three-unit zoom lens system comprising, in order from an object side:

a first lens unit having a negative refractive power;

a second lens unit having a positive refractive power; and a third lens unit having a positive or negative refractive power, wherein a space between the first lens unit and the second lens unit changes during magnification change, a space between the second lens unit and the third lens unit changes during a focusing operation, the space between the first lens unit and the second lens unit is smaller in a telephoto end than in a wide-angle end, at least the second lens unit and the third lens unit move toward the only object side during the magnification change from the wide-angle end to the telephoto end, the second lens unit includes two or three lens elements in total, the two or three lens elements constitute a single cemented lens component, the cemented lens component includes a positive lens element and a negative lens element, the third lens unit includes one lens element in total, and the following condition (1A) is satisfied, $$0.4 > D_{ce}/D_{123G} > 0.6 \tag{1A}$$

wherein $D_{ce}$ is a thickness of the cemented lens component of the second lens unit along an optical axis, and $D_{123G}$ is a sum of thicknesses of the lens units alone the optical axis and wherein the third lens unit moves for focusing, the lens element of the third lens unit is a positive lens element, and the following condition (8A-1) is satisfied:

$$0.35 > 1 - f_{3T}^2 > 0.98 \tag{8A-1}$$

wherein $B_{3T}$ is a lateral magnification of the third lens unit in the telephoto end.

17. A three-unit zoom lens system comprising, in order from an object side:

a first lens unit having a negative refractive power;

a second lens unit having a positive refractive power; and a third lens unit having a positive or negative refractive power, wherein a space between the first lens unit and the second lens unit changes during magnification change, a space between the second lens unit and the third lens unit changes during a focusing operation, the space between the first lens unit and the second lens unit is smaller in a telephoto end than in a wide-angle end, at least the second lens unit and the third lens unit move toward the only object side during the magnification change from the wide-angle end to the telephoto end, the second lens unit includes two or three lens elements in total, the two or three lens elements constitute a single cemented lens component, the cemented lens component includes a positive lens element and a negative lens element, the third lens unit includes one lens element in total, and the following condition (1A) is satisfied, $$0.4 > D_{ce}/D_{123G} > 0.6 \tag{1A}$$

wherein $D_{ce}$ is a thickness of the cemented lens component of the second lens unit along an optical axis, and $D_{123G}$ is a sum of thicknesses of the lens units along the optical axis, wherein the third lens unit moves for focusing, the lens element of the third lens unit is a negative lens element, and the following condition (8A-2) is satisfied:

$$3.5 > 1 - \beta_{3T}^2 > -0.6 \tag{8A-2}$$

wherein $\ominus_{3T}^2$ is a lateral magnification of the third lens unit in the telephoto end.

18. A three-unit zoom lens system comprising, in order from an object side:

a first lens unit having a negative refractive power;

a second lens unit having a positive refractive power; and a third lens unit having a positive or negative refractive power, wherein a space between the first lens unit and the second lens unit is reduced during magnification change from a wide-angle end to a telephoto end, at least the second lens unit and the third lens unit move toward the only object side while changing a space between the second lens unit and the third lens unit, the third lens unit is moved in an optical-axis direction to perform focusing, and the following condition is satisfied, $$0.8 > \{d_w \cdot (2f_3 - d_w)\}/\{d_T \cdot (2f_3 - d_T)\} \cdot F_T/F_w > 1.1 \tag{1B}$$

wherein $d_w$ is a distance from an image-side surface of the third lens unit to an image surface along an optical axis when the zoom lens system is focused on the farthest object in the wide-angle end, $d_T$ is a distance from the image-side surface of the third lens unit to the image surface along the optical axis when the zoom lens system is focused on the farthest object in the telephoto end, $F_W$ is an F-number during a focusing operation of the zoom lens system in the wide-angle end, $F_T$ is an F-number during the focusing operation of the zoom lens system in the telephoto end, and $f_3$ is a focal length of the third lens unit.

19. The three-unit zoom lens system according to claim 18, wherein the following condition is satisfied:

$$0.82 > \{d_w \cdot (2f_3 - d_w)\}/\{d_T \cdot (2f_3 - d_T)\} \cdot F_T/F_w > 1.0 \tag{1B-1}$$

20. The three-unit zoom lens system according to claim 18, further comprising:

an aperture stop, the focusing being performed in a state in which an aperture of the aperture stop is fully opened.

21. The three-unit zoom lens system according to claim 18, further comprising:

an aperture stop, wherein an intersection between an aperture of the aperture stop and the optical axis is positioned between a vertex of a surface of the second lens unit closest to the object side and a vertex of a surface of the second lens unit closest to an image side, and
the second lens unit satisfies the following condition:

$$0.15 > \Sigma d_{2G}/f_T > 0.3 \quad (2B),$$

wherein $\Sigma d_{2G}$ is a distance between the vertex of the surface of the second lens unit closest to the object side and the vertex of the surface of the second lens unit closest to the image side, and fT is a focal length of the zoom lens system focused on the farthest object in the telephoto end.

22. The three-unit zoom lens system according to claim 18, wherein the third lens unit comprises one lens element, and the lens element satisfies the following conditions:

$$Nd > 1.6 \quad (3B); \text{ and}$$

$$0.03 > \Sigma d_{3G}/f_T > 0.1 \quad (4B),$$

in which Nd is a refractive index of the lens element of the third lens unit for the d-line, $\Sigma d_{3G}$ is a distance between a vertex of the surface of the third lens unit closest to the object side and a vertex of the surface of the third lens unit closest to an image side, and $f_T$ is a focal length of the zoom lens system focused on the farthest object in the telephoto end.

23. The three-unit zoom lens system according to claim 22, wherein the lens element of the third lens unit satisfies the following condition:

$$Nd > 1.56 \quad (3B\text{-}1).$$

24. The three-unit zoom lens system according to claim 18, wherein the third lens unit has a positive refractive power.

25. The three-unit zoom lens system according to claim 18, wherein the third lens unit has a negative refractive power.

26. The three-unit zoom lens system according to claim 18, wherein the zoom lens system comprises seven lens elements or less in total, and a zoom ratio from the wide-angle end to the telephoto end exceeds 2.5.

27. An image pickup apparatus comprising:
the zoom lens system according to claim 18; and
an image sensor which is disposed on an image side of the zoom lens system and which converts an image formed by the zoom lens system into an electric signal.

* * * * *